(12) United States Patent
Song et al.

(10) Patent No.: US 12,551,500 B2
(45) Date of Patent: Feb. 17, 2026

(54) C6'-SUBSTITUTED LOCKED NUCLEIC ACID-MODIFIED CAP ANALOG AND USE THEREOF

(71) Applicant: Hangzhou Tianlong Pharmaceutical Co., Ltd., Zhejiang (CN)

(72) Inventors: Gengshen Song, Zhejiang (CN); Honglei Zhang, Zhejiang (CN); Yangjian Liu, Zhejiang (CN); Kai Dong, Zhejiang (CN); Jinyu Zhang, Zhejiang (CN); Chuan Gao, Zhejiang (CN); Lijie Jin, Zhejiang (CN); Yuqing Li, Zhejiang (CN); Huajie Huang, Zhejiang (CN); Yanfen Li, Zhejiang (CN); Limin Liang, Zhejiang (CN); Xiaowen Yu, Zhejiang (CN); Dawei Huang, Zhejiang (CN)

(73) Assignee: Hangzhou Tianlong Pharmaceutical Co., Ltd., Hangzhou (CN)

( * ) Notice: Subject to any disclaimer, the term of this patent is extended or adjusted under 35 U.S.C. 154(b) by 41 days.

(21) Appl. No.: 19/008,720

(22) Filed: Jan. 3, 2025

(65) Prior Publication Data

US 2025/0222019 A1    Jul. 10, 2025

(30) Foreign Application Priority Data

Jan. 9, 2024  (CN) .......................... 202410026029.0

(51) Int. Cl.
| | | |
|---|---|---|
| *A61K 31/7105* | (2006.01) | |
| *A61K 9/1272* | (2025.01) | |
| *A61K 9/51* | (2006.01) | |
| *A61K 47/42* | (2017.01) | |
| *C07H 21/02* | (2006.01) | |
| *C12N 9/12* | (2006.01) | |
| *C12N 9/14* | (2006.01) | |

(52) U.S. Cl.
CPC ........ *A61K 31/7105* (2013.01); *A61K 9/1272* (2013.01); *A61K 9/5123* (2013.01); *A61K 47/42* (2013.01); *C07H 21/02* (2013.01); *C12N 9/1247* (2013.01); *C12N 9/14* (2013.01); *C12Y 207/07006* (2013.01); *C12Y 306/01* (2013.01)

(58) Field of Classification Search
CPC .. A61K 31/7105; A61K 9/1272; A61K 47/42; C12N 9/1247
USPC ...... 424/9.1; 435/6.1, 91.1, 91.31, 455, 458; 514/44 A, 44 R; 536/23.1
See application file for complete search history.

(56) References Cited

U.S. PATENT DOCUMENTS

2024/0252435 A1*  8/2024  Song ............... A61K 9/127
2024/0390484 A1* 11/2024  Wang ............. A61K 9/5123

FOREIGN PATENT DOCUMENTS

| | | | | |
|---|---|---|---|---|
| CN | 108366604 | A | 8/2018 | |
| CN | 112119084 | A | 12/2020 | |
| CN | 113603739 | A | 11/2021 | |
| CN | 115745820 | A | 3/2023 | |
| CN | 115803333 | A | 3/2023 | |
| CN | 116143854 | A | 5/2023 | |
| CN | 115260264 | B | 6/2023 | |
| CN | 116478226 | A | 7/2023 | |
| CN | 116987137 | A | 11/2023 | |
| EP | 4328217 | A1 | 2/2024 | |
| WO | 2017053297 | A1 | 3/2017 | |
| WO | WO-2022006368 | A2 * | 1/2022 | ......... A61K 31/7088 |
| WO | 2023025073 | A1 | 3/2023 | |
| WO | 2023133946 | A1 | 7/2023 | |
| WO | 2023147352 | A1 | 8/2023 | |
| WO | WO-2024183748 | A1 * | 9/2024 | ............... C07H 1/00 |

OTHER PUBLICATIONS

Feb. 20, 2024 1st Chinese Office Action issued in Chinese Patent Application No. 202410026029.0.
Feb. 18, 2024 1st Chinese Search Report issued in Chinese Patent Application No. 202410026029.0.
Mar. 20, 2024 2nd Chinese Office Action issued in Chinese Patent Application No. 202410026029.0.
Eygeris, Yulia et al., Chemistry of Lipid Nanoparticles for RNA Delivery, Accounts of chemical research, 2022, 55 (1): 2-12.
Annamalai Senthilvelan et al., Trinucleotide Cap Analogue Bearing a Locked Nucleic Acid Moiety: Synthesis, mRNA Modification, and Translation for Therapeutic Applications, Organic Letters, 2021, 23(11): 4133-4136.
Apr. 3, 2024 Supplementary Chinese Search Report issued in Chinese Patent Application No. 202410026029.0.
Stephen M. et al., Pharmaceutical Salts, Journal of Pharmaceutical Sciences, 1977, 66(1), 1-19.
Apr. 8, 2024 Notice of Allowance issued in Chinese Patent Application No. 202410026029.0.
Apr. 23, 2025 1st Korean Office Action issued in Korean Patent Application No. 10-2025-0001570.
May 1, 2025 1st Canadian Office Action issued in Canadian Patent Application No. 3260059.

* cited by examiner

*Primary Examiner* — Jane J Zara

(57) ABSTRACT

The present disclosure provides a C6'-substituted locked nucleic acid-modified cap analog and a use thereof, wherein the cap analog improves the stability of mRNA and/or the translation efficiency of mRNA.

20 Claims, 3 Drawing Sheets

C6'-SUBSTITUTED LOCKED NUCLEIC ACID-MODIFIED CAP ANALOG AND USE THEREOF

CROSS-REFERENCE TO RELATED APPLICATION

The present application claims priority from Chinese Patent Application No. 202410026029.0 filed on Jan. 9, 2024, the contents of which are incorporated herein by reference in their entirety.

TECHNICAL FIELD

The present disclosure relates to the technical field of chemical and biological engineering, and particularly relates to a C6'-substituted locked nucleic acid-modified cap analog and a use thereof.

BACKGROUND

The chemical nature of a cap structure is a special structure at the 5' end of mRNA formed by modification during mRNA transcription, namely an m7GPPPN structure, also known as a methylguanosine cap. It is formed under the co-catalysis of RNA triphosphatase, guanylyltransferase, mRNA (guanine-N7) methyltransferase, and mRNA (nucleoside-2') methyltransferase. Depending on the degree of methylation, three types of caps can be formed, namely CAP 0, CAP 1, and CAP 2, which are m7G5'ppp5'Np, m7G5'ppp5'NmpNp, and m7G5'ppp5'NmpNmpNp, respectively.

The cap structure is necessary for the initiation of mRNA translation, which provides a signal for the recognition of mRNA by the ribosome, assists the ribosome in binding to the mRNA, and enables translation to start from AUG. Meanwhile, the cap structure can increase the stability of mRNA and protect the mRNA from 5'→3' exonuclease attack.

To put it simply, the cap structure is like a steel helmet for mRNA, which can not only protect the mRNA from being destroyed, but also imprint the helmet through chemical modification to facilitate recognition by other members. In addition to the natural cap structure, cap structure analogs are also mostly used to improve the stability of mRNA structures during in vitro transcription, with ARCA and CAP 1 structure analogs being the common ones.

Studies have shown that the cap structure of mRNA is importantly linked to mRNA quality control and innate immunity of the organism. Therefore, the invention of a novel cap analog is of great significance for increasing the stability of mRNA and improving the translation efficiency of mRNA.

BRIEF SUMMARY OF THE INVENTION

In order to improve the stability of mRNA and/or the translation efficiency of mRNA, the present disclosure provides a novel locked nucleoside-modified mRNA cap analog and a use thereof.

Specifically, a first aspect of the present disclosure provides a compound of formula (I), or a stereoisomer, a pharmaceutically acceptable salt, or a solvate thereof:

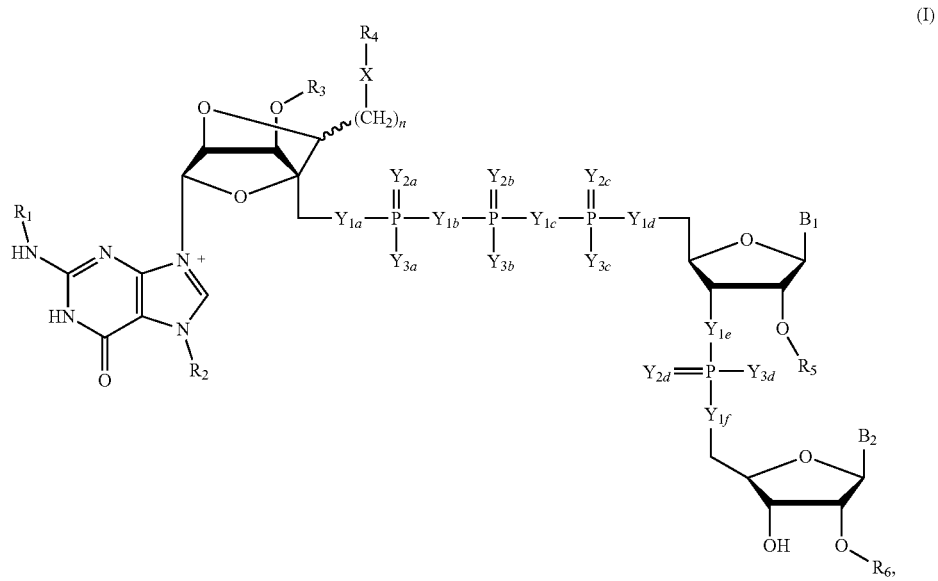

(I)

wherein X is selected from —O—, —S—, —N($R^1$)—, —C(=O)—, —C(=O)N($R^1$)—, —$NR^1$C(=O)—, —C(=O)O—, —OC(=O)—, —S(=O)$_2$—, or absent; preferably, X is selected from —O—, —S—, —NH—, —N(CH$_3$)—, —C(=O)—, —C(=O)N(CH$_3$)—, —N(CH$_3$)C(=O)—, —C(=O)NH—, —NHC(=O)—, —C(=O)O—, —OC(=O)—, —S(=O)$_2$—, or absent; more preferably, X is selected from —C(=O)—, —S(=O)$_2$—, or absent;

n is selected from an integer of 1 to 3, preferably 1 or 2;

$R_1$, $R_2$, $R_3$, $R_5$, and $R_6$ are independently selected from hydrogen, substituted or unsubstituted $C_1$-$C_6$ alkyl, $C_2$-$C_6$ alkenyl, $C_2$-$C_6$ alkynyl, $C_3$-$C_6$ cycloalkyl, or benzyl, preferably independently hydrogen or methyl;

$R_4$ is selected from halogen, —$NR^1R^2$, hydrogen, —CN, substituted or unsubstituted $C_1$-$C_6$ alkyl, $C_2$-$C_6$ alkenyl, or $C_2$-$C_6$ alkynyl; preferably, $R_4$ is selected from halogen, —N(CH₃)H, —NH₂, —N(CH₃)₂, hydrogen, —CN, —CH₃, —CF₂H, —CCl₂H, —CFH₂, —CClH₂, —CH=CH₂, or $C_2$ alkynyl; more preferably, $R_4$ is selected from —CH₃, —CF₂H, —N(CH₃)₂, or —CN;

$R^1$ and $R^2$, at each occurrence, are independently selected from hydrogen, substituted or unsubstituted $C_1$-$C_6$ alkyl, $C_2$-$C_6$ alkenyl, $C_2$-$C_6$ alkynyl, $C_3$-$C_6$ cycloalkyl, phenyl, or benzyl; preferably, $R^1$ and $R^2$, at each occurrence, are independently selected from hydrogen and methyl;

$Y_{1a}$, $Y_{1b}$, $Y_{1c}$, $Y_{1d}$, $Y_{1e}$, and $Y_{1f}$ are independently selected from —O—, —S—, —CH₂—, —CCl₂—, —CF₂—, or —NH—;

$Y_{2a}$, $Y_{2b}$, $Y_{2c}$, and $Y_{2d}$ are independently selected from =O or =S;

$Y_{3a}$, $Y_{3b}$, $Y_{3c}$, and $Y_{3d}$ are independently selected from —OH or —SH;

$B_1$ and $B_2$ are independently selected from a natural or modified pyrimidine nucleotide base, a natural or modified purine nucleotide base, or their respective pharmaceutically acceptable salts.

A second aspect of the present disclosure provides a use of the compound of formula (I), or the stereoisomer, the pharmaceutically acceptable salt, or the solvate thereof according to the first aspect of the present disclosure in the preparation of an in vitro co-transcription mRNA capping reagent.

A third aspect of the present disclosure provides an RNA molecule comprising the compound of formula (I), or the stereoisomer, the pharmaceutically acceptable salt, or the solvate thereof according to the first aspect of the present disclosure as a cap structure or a cap structure fragment.

A fourth aspect of the present disclosure provides a pharmaceutical composition comprising the RNA molecule according to the third aspect of the present disclosure.

A fifth aspect of the present disclosure provides a method for synthesizing an mRNA molecule for non-disease diagnostic and therapeutic purposes comprising the steps of: co-incubating the compound of formula (I), or the stereoisomer, the pharmaceutically acceptable salt, or the solvate thereof according to the first aspect of the present disclosure with a polynucleotide template for template transcription.

A sixth aspect of the present disclosure provides a capped mRNA transcription reaction system for non-disease diagnostic and therapeutic purposes comprising:
(1) the compound of formula (I), or the stereoisomer, the pharmaceutically acceptable salt, or the solvate thereof according to the first aspect of the present disclosure; and
(2) a polynucleotide template, NTPs, and an RNA polymerase.

A seventh aspect of the present disclosure provides a kit comprising:
(1) the compound of formula (I), or the stereoisomer, the pharmaceutically acceptable salt, or the solvate thereof according to the first aspect of the present disclosure; and
(2) a nucleotide triphosphate molecule and an RNA polymerase.

An eighth aspect of the present disclosure provides a method for improving intracellular stability of an RNA, comprising incorporating the compound of formula (I), or the stereoisomer, the pharmaceutically acceptable salt, or the solvate thereof according to the first aspect of the present disclosure into the RNA.

A ninth aspect of the present disclosure provides a method for introducing RNA into a cell, comprising contacting the cell with the pharmaceutical composition according to the fourth aspect of the present disclosure.

A tenth aspect of the present disclosure provides a method for inhibiting RNA translation in a cell, comprising contacting the cell with the pharmaceutical composition according to the fourth aspect of the present disclosure.

An eleventh aspect of the present disclosure provides a use of the pharmaceutical composition according to the fourth aspect of the present disclosure in the preparation of a vaccine.

BRIEF DESCRIPTION OF THE DRAWINGS

In order to illustrate the specific embodiments of the present disclosure or the technical solutions in the prior art more clearly, the drawings that need to be used in the description of the specific embodiments or the prior art will be briefly introduced below. It is evident that the drawings in the following description represent some embodiments of the present disclosure. For those of ordinary skill in the art, it is possible to derive other drawings based on these drawings without the need for creative effort.

DETAILED DESCRIPTION OF THE INVENTION

Figure 1:
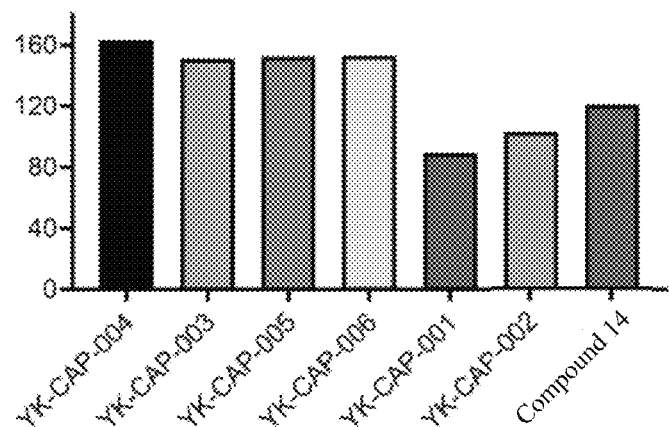
FIG. 1 shows the in vitro transcription yield of mRNA for the locked nucleoside-modified cap analogs YK-CAP-004, YK-CAP-003, YK-CAP-005, YK-CAP-006, YK-CAP-001, YK-CAP-002, and compound 14.

In order to make the purpose, technical solutions, and advantages of the examples of the present disclosure clearer, the technical solutions of the examples of the present disclosure will be clearly and completely described below in conjunction with the drawings of the examples of the present disclosure. Apparently, the described examples are some of the examples of the present disclosure, not all of them. Based on the described examples of the present disclosure, all other examples obtained by those of ordinary skill in the art without the need for creative effort shall fall within the scope of protection of the present disclosure.

The present disclosure may be embodied in other specific forms without departing from the essential attributes of the present disclosure. It should be understood that any and all embodiments of the present disclosure may be combined with technical features in any other embodiment or a plurality of other embodiments to obtain additional embodiments under the premise of no conflict. The present disclosure includes additional embodiments obtained from such combinations.

All publications and patents mentioned in the present disclosure are incorporated herein by reference in their entirety. If usage or terminology used in any publications and patents incorporated by reference conflicts with usage or terminology used in the present disclosure, the usage and terminology in the present disclosure shall prevail.

The section headings used herein are for the sole purpose of organizing the article and should not be construed as a limitation on the subject matter described.

Unless otherwise specified, all technical and scientific terms used herein have their ordinary meanings in the art to which the claimed subject matter pertains. If there are multiple definitions for a term, the definition herein shall prevail.

Except in the working examples or otherwise indicated, all numbers stating quantitative properties, such as doses, in the specification and claims should be understood as modified in all instances by the term "about". It should also be understood that any numerical range recited in the present disclosure is intended to include all sub-ranges within the range and any combination of the various endpoints of the range or sub-ranges.

Unless otherwise defined, all terms (including technical and scientific terms) used in the present disclosure have the same meaning as commonly understood by those of ordinary skill in the art to which the present disclosure pertains. Terms, such as those defined in commonly used dictionaries, should be interpreted as having a meaning consistent with their meaning in the context of the relevant art and shall not be interpreted in an idealized or overly formal sense unless expressly so defined in the present disclosure.

As used herein, the term "$C_1$-$C_6$" refers to a group having any integral number of carbon atoms within the range of 1 to 6 in the main chain, such as 1, 2, 3, 4, 5, or 6 carbon atoms. Similarly, the term "$C_2$-$C_6$" refers to a group having any integral number of carbon atoms within the range of 2 to 6 in the main chain, such as 2, 3, 4, 5, or 6 carbon atoms.

As used herein, the term "alkyl" refers to a saturated aliphatic hydrocarbon group having a linear or branched chain; non-limiting examples include methyl, ethyl, propyl, n-butyl, tert-butyl, pentyl, hexyl, etc;
as used herein, the term "alkenyl" refers to a hydrocarbon group having at least one carbon-carbon double bond at one or more sites along the carbon chain of an alkyl group; non-limiting examples include vinyl, propenyl, butenyl, etc.

As used herein, the term "alkynyl" refers to a hydrocarbon group having at least one carbon-carbon triple bond at one or more sites along the carbon chain of an alkyl group; non-limiting examples include ethynyl, propynyl, etc. As used herein, the term "aryl" refers to a group containing a carbocyclic aromatic system; non-limiting examples include phenyl, naphthyl, anthryl, phenanthryl, pyrenyl, etc; when the aryl group includes a plurality of rings, the respective rings may be fused with one another. As used herein, the term "heteroaryl" refers to a group having a carbocyclic aromatic system containing at least one heteroatom selected from N, O, Si, P, and S as a ring-forming atom; non-limiting examples include pyridinyl, pyrimidinyl, pyrazinyl, pyridazinyl, triazinyl, quinolyl, isoquinolyl, etc; when the heteroaryl group includes a plurality of rings, the respective rings may be fused with one another.

As used herein, the term "heteroalkyl" or "heteroaryl" refers to an alkyl group containing at least one heteroatom selected from N, O, Si, P, and S.

As used herein, the term "salt" refers to a corresponding salt of a modified nucleoside compound (or nucleotide compound) of the present disclosure that can be conveniently or desirably prepared, purified, and/or treated, such as a pharmaceutically acceptable salt. Unless otherwise indicated, references to a specific compound in the present disclosure also include a salt form thereof.

As used herein, "cap analog" refers to a structure at the 5' end of a mature mRNA formed by post-transcriptional modification in eukaryotes, namely an m7GPPPN structure, also known as a methylguanosine cap. The structure can prevent the degradation of mRNA at the 5' end, help RNA transcripts pass through the selective pores of the nuclear membrane and enter the cytoplasm, enhance translation, and help complete the entire splicing process. As used herein, the portion between the wavy lines in a nucleic acid polymer represents a structure embedded in a nucleic acid polymer sequence, while the portion outside the wavy lines represents other sequences in the nucleic acid polymer.

Bases, also known as nucleobases, refer to the heterocyclic base portion of a nucleoside. Nucleobases may be naturally occurring or modified, such as a natural or modified pyrimidine nucleotide base, or a natural or modified purine nucleotide base. Bases include, but are not limited to, cytosine, guanine, adenine, thymine, uracil, hypoxanthine, xanthine, 7-methylguanine, pseudouracil, thiouracil, 5,6-dihydrouracil, 5-bromouracil, 5-iodouracil, 5-methylcytosine, and 5-hydroxymethylcytosine.

The words "comprising", "including", or "containing" and similar words used in the present disclosure mean that the element appearing before the word covers the elements listed after the word and their equivalents, and does not exclude unrecited elements. The term "comprising" or "including (containing)" as used herein can be open, semi-closed, and closed. In other words, the term also includes "consisting essentially of" or "consisting of".

The term "optional" in the present disclosure means that the described situation may or may not occur. For example, "optionally substituted" means "may be substituted or unsubstituted". "Substituted" means that at least one hydrogen in a group is replaced by another chemical group, such as methyl, ethyl, methoxy, ethoxy, halogen, hydroxyl, mercapto, amino, nitro, and —CN.

The term "pharmaceutically acceptable" in the present disclosure means that a compound or composition is chemically and/or toxicologically compatible with the other ingredients making up the preparation and/or with the human or mammal in which it is used to prevent or treat a disease or condition.

The term "solvate" in the present disclosure refers to a complex formed by combining a compound of formula (I) or a pharmaceutically acceptable salt thereof with a solvent (e.g., ethanol or water). It should be understood that any solvate of a compound of formula (I) for use in the treatment of a disease or condition may provide different properties (including pharmacokinetic properties), however will result in the compound of formula (I) upon absorbed into a subject, such that the use of the compound of formula (I) encompasses the use of any solvate of the compound of formula (I) respectively.

The term "hydrate" refers to the situation where the solvent in the above term "solvate" is water.

It should be further understood that the compound of formula (I) or the pharmaceutically acceptable salt thereof may be isolated in the form of a solvate, and therefore any such solvate is included within the scope of the present disclosure. For example, the compound of formula (I) or the pharmaceutically acceptable salt thereof may exist in an unsolvated form as well as a solvated form with a pharmaceutically acceptable solvent (e.g., water, ethanol).

The present disclosure also includes a salt of the compound described herein, especially a pharmaceutically acceptable salt. The compounds of the present disclosure having sufficiently acidic or sufficiently basic functional groups can react with a wide variety of bases or acids to form salts. Alternatively, compounds that are inherently charged (e.g., compounds having a quaternary nitrogen) may form salts with appropriate counterions (e.g., halide ions such as bromide ions, chloride ions, or fluoride ions, especially bromide ions).

The term "pharmaceutically acceptable salt" refers to a relatively non-toxic addition salt of the compound of the present disclosure. For example, see S. M. Berge et al., "Pharmaceutical Salts", *J. Pharm. Sci.* 1977, 66, 1-19.

Suitable pharmaceutically acceptable salts of the compound of the present disclosure may be, for example, an acid addition salt of the compound of the present disclosure which is sufficiently basic and bears a nitrogen atom in a chain or ring, for example, an acid addition salt formed with an inorganic acid, such as hydrochloric acid, hydrobromic acid, hydroiodic acid, sulfuric acid, phosphoric acid, or nitric acid, or an acid addition salt formed with an organic acid, such as formic acid, acetic acid, acetoacetic acid, pyruvic acid, trifluoroacetic acid, propionic acid, butyric acid, hexanoic acid, heptanoic acid, undecanoic acid, lauric acid, benzoic acid, salicylic acid, 2-(4-hydroxybenzoyl) benzoic acid, camphoric acid, cinnamic acid, cyclopentylpropionic acid, 3-hydroxy-2-naphthoic acid, nicotinic acid, pamoic acid, pectinic acid, persulfuric acid, 3-phenylpropionic acid, picric acid, pivalic acid, 2-hydroxyethanesulfonic acid, itaconic acid, sulfamic acid, trifluoromethanesulfonic acid, dodecylsulfuric acid, ethanesulfonic acid, benzenesulfonic acid, p-toluenesulfonic acid, methanesulfonic acid, 2-naphthalenesulfonic acid, naphthalinedisulfonic acid, camphorsulfonic acid, citric acid, tartaric acid, stearic acid, lactic acid, oxalic acid, malonic acid, succinic acid, malic acid, adipic acid, alginic acid, maleic acid, fumaric acid, D-gluconic acid, mandelic acid, ascorbic acid, glucoheptanoic acid, glycerophosphoric acid, aspartic acid, sulfosalicylic acid, or thiocyanic acid.

Additionally, another suitable pharmaceutically acceptable salt of the compound of the present disclosure which is sufficiently acidic is an alkali metal salt such as a sodium or potassium salt, an alkaline earth metal salt such as a calcium or magnesium salt, an ammonium salt (e.g., a salt formed with $NH_3$ or ammonia water), or a salt formed with an organic base which provides a physiologically acceptable cation, for example, a salt formed with triethylamine, N-methylglucamine, dimethylglucamine, ethylglucamine, lysine, dicyclohexylamine, 1,6-hexanediamine, ethanolamine, glucosamine, sarcosine, serinol, tris(hydroxymethyl)aminomethane, aminopropanediol, 1-amino-2,3,4-butanetriol. Furthermore, basic nitrogen-containing groups can be quaternized with the following reagents: lower alkyl halides such as methyl, ethyl, propyl, and butyl chlorides, bromides, and iodides; dialkyl sulfates such as dimethyl, diethyl, dibutyl, and diamyl sulfates; long chain halides such as decyl, lauryl, myristyl, and stearyl chlorides, bromides, and iodides; aralkyl halides such as benzyl and phenethyl bromides.

It will also be recognized by those skilled in the art that acid addition salts of the claimed compound can be prepared by reacting the compound with a suitable inorganic or organic acid by any one of the known methods. Alternatively, base addition salts of the acidic compound of the present disclosure are prepared by reacting the compound with a suitable base by various known methods.

The present disclosure includes all possible salts of the compound of the present disclosure, which may be a single salt or any mixture of the salt in any ratio.

Certain compounds of the present disclosure may exist as one or more stereoisomers. Stereoisomers include geometric isomers, diastereomers, and enantiomers. Accordingly, the claimed compound of the present disclosure also includes racemic mixtures, single stereoisomers, and optically active mixtures. It should be understood by those skilled in the art that one stereoisomer may have better efficacy and/or lower side effects than other stereoisomers. Single stereoisomers and optically active mixtures can be obtained by methods such as chiral source synthesis, chiral catalysis, and chiral resolution. The racemate can be chirally resolved by chromatographic resolution or chemical resolution. For example, a chiral acid resolution reagent such as chiral tartaric acid and chiral malic acid can be added to form a salt with the compound of the present disclosure, and the physicochemical properties of the product, such as the difference in solubility, can be utilized for separation.

An alkyl (or alkylene) group may be unsubstituted or substituted in which at least one hydrogen is replaced by another chemical group, such as methyl, ethyl, methoxy, ethoxy, halogen, hydroxyl, mercapto, amino, nitro, and —CN.

In the present disclosure, when the name of a compound is inconsistent with the structural formula, the structural formula shall prevail.

The specification of the present disclosure should be construed to be consistent with the laws and principles of chemical bonding. In some instances, a hydrogen atom may be removed to accommodate a substituent at a given position.

It should be understood that the term "compound of the present disclosure" as used herein may include a compound of formula (I), a solvate thereof, a pharmaceutically acceptable salt thereof, a stereoisomer thereof, or mixtures thereof according to the context.

Locked Nucleoside-Modified mRNA Cap Analog

The present disclosure provides a compound of formula (I), or a stereoisomer, a pharmaceutically acceptable salt, or a solvate thereof:

[Structure of Formula (I) shown at top of page]

wherein
- X is selected from —O—, —S—, —N(R$^1$)—, —C(=O)—, —C(=O)N(R$^1$)—, —NR$^1$C(=O)—, —C(=O)O—, —OC(=O)—, —S(=O)$_2$—, or absent; preferably, X is selected from —O—, —S—, —NH—, —N(CH$_3$)—, —C(=O)—, —C(=O)N(CH$_3$)—, —N(CH$_3$)C(=O)—, —C(=O)NH—, —NHC(=O)—, —C(=O)O—, —OC(=O)—, —S(=O)$_2$—, or absent; more preferably, X is selected from —C(=O)—, —S(=O)$_2$—, or absent;
- n is selected from an integer of 1 to 3, preferably 1 or 2;
- R$_1$, R$_2$, R$_3$, R$_5$, and R$_6$ are independently selected from hydrogen, substituted or unsubstituted C$_1$-C$_6$ alkyl, C$_2$-C$_6$ alkenyl, C$_2$-C$_6$ alkynyl, C$_3$-C$_6$ cycloalkyl, or benzyl, preferably independently hydrogen or methyl;
- R$_4$ is selected from halogen, —NR$^1$R$_2$, hydrogen, —CN, substituted or unsubstituted C$_1$-C$_6$ alkyl, C$_2$-C$_6$ alkenyl, or C$_2$-C$_6$ alkynyl; preferably, R$_4$ is selected from halogen, —N(CH$_3$)H, —NH$_2$, —N(CH$_3$)$_2$, hydrogen, —CN, —CH$_3$, —CF$_2$H, —CCl$_2$H, —CFH$_2$, —CClH$_2$, —CH=CH$_2$, or C$_2$ alkynyl; more preferably, R$_4$ is selected from —CH$_3$, —CF$_2$H, —N(CH$_3$)$_2$, or —CN;
- R$^1$ and R$^2$, at each occurrence, are independently selected from hydrogen, substituted or unsubstituted C$_1$-C$_6$ alkyl, C$_2$-C$_6$ alkenyl, C$_2$-C$_6$ alkynyl, C$_3$-C$_6$ cycloalkyl, phenyl, or benzyl; preferably, R$^1$ and R$^2$, at each occurrence, are independently selected from hydrogen and methyl;
- Y$_{1a}$, Y$_{1b}$, Y$_{1c}$, Y$_{Yd}$, Y$_{1e}$, and Y$_{1f}$ are independently selected from —O—, —S—, —CH$_2$—, —CCl$_2$—, —CF$_2$—, or —NH—;
- Y$_{2a}$, Y$_{2b}$, Y$_{2c}$, and Y$_{2d}$ are independently selected from =O or =S;
- Y$_{3a}$, Y$_{3b}$, Y$_{3c}$, and Y$_{3d}$ are independently selected from —OH or —SH;
- B$_1$ and B$_2$ are independently selected from a natural or modified pyrimidine nucleotide base, a natural or modified purine nucleotide base, or their respective pharmaceutically acceptable salts.

In one embodiment, X is absent. When X is absent, R$_4$ is, for example, —CF$_2$H, —N(CH$_3$)$_2$, or —CN.

In one embodiment, X is —C(=O)—. When X is —C(=O)—, R$_4$ is, for example, —N(CH$_3$)$_2$.

In one embodiment, X is —S(=O)$_2$—. When X is —S(=O)$_2$—, R$_4$ is, for example, —N(CH$_3$)$_2$ or —CH$_3$.

In one embodiment, R$_1$ is hydrogen or methyl, preferably hydrogen.

In one embodiment, R$_2$ is hydrogen or methyl, preferably methyl.

In one embodiment, R$_3$ is hydrogen or methyl, preferably hydrogen.

In one embodiment, R$_5$ is hydrogen or methyl, preferably methyl.

In one embodiment, R$_6$ is hydrogen or methyl, preferably hydrogen.

In one embodiment, Y$_{1a}$ is —O—.
In one embodiment, Y$_{1b}$ is —O—.
In one embodiment, Y$_{1c}$ is —O—.
In one embodiment, Y$_{Yd}$ is —O—.
In one embodiment, Y$_{1e}$ is —O—.
In one embodiment, Y$_{1f}$ is —O—.
In one embodiment, Y$_{2a}$ is =O.
In one embodiment, Y$_{2b}$ is =O.
In one embodiment, Y$_{2c}$ is =O.
In one embodiment, Y$_{2d}$ is =O.
In one embodiment, Y$_{3a}$ is —OH.
In one embodiment, Y$_{3b}$ is —OH.
In one embodiment, Y$_{3c}$ is —OH.
In one embodiment, Y$_{3d}$ is —OH.

In one embodiment, group ~~(CH$_2$)$_n$—X—R$_4$ is in R configuration, S configuration, or (R+S) configuration, preferably R configuration.

In one embodiment, B$_1$ and B$_2$ are independently selected from substituted or unsubstituted adenine, guanine, thymine, cytosine, uracil, or their respective pharmaceutically acceptable salts. For example, B$_1$ and B$_2$ are independently selected from cytosine, guanine, adenine, thymine, uracil, hypoxanthine, xanthine, 7-methylguanine, pseudouracil, thiouracil, 5,6-dihydrouracil, 5-bromouracil, 5-iodouracil, 5-methylcytosine, 5-hydroxymethylcytosine, or their respective pharmaceutically acceptable salts.

In one embodiment, $B_1$ is adenine.
In one embodiment, $B_2$ is 7-methylguanine or guanine, preferably guanine.
For example, the compound of formula (I) is YK-CAP-001, YK-CAP-002, YK-CAP-003, YK-CAP-004, YK-CAP-005, or YK-CAP-006 having a structure as shown below:
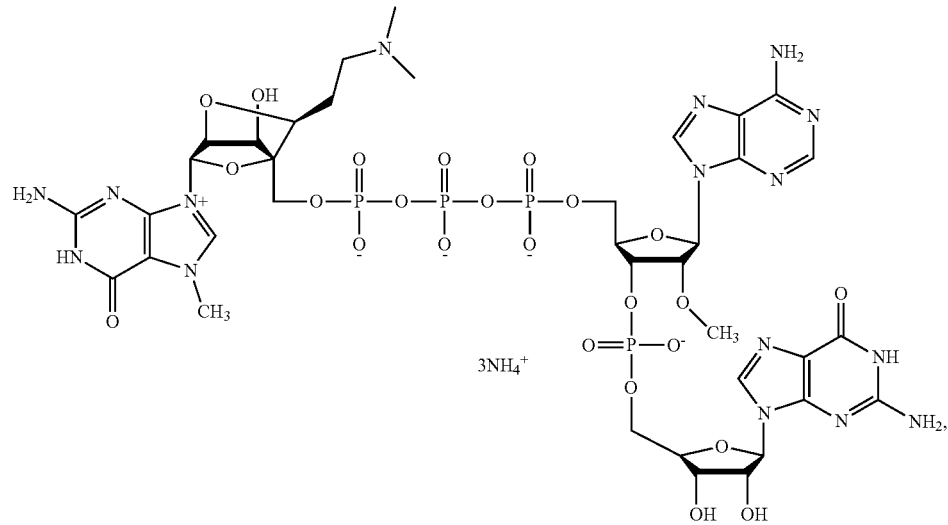
YK-CAP-001
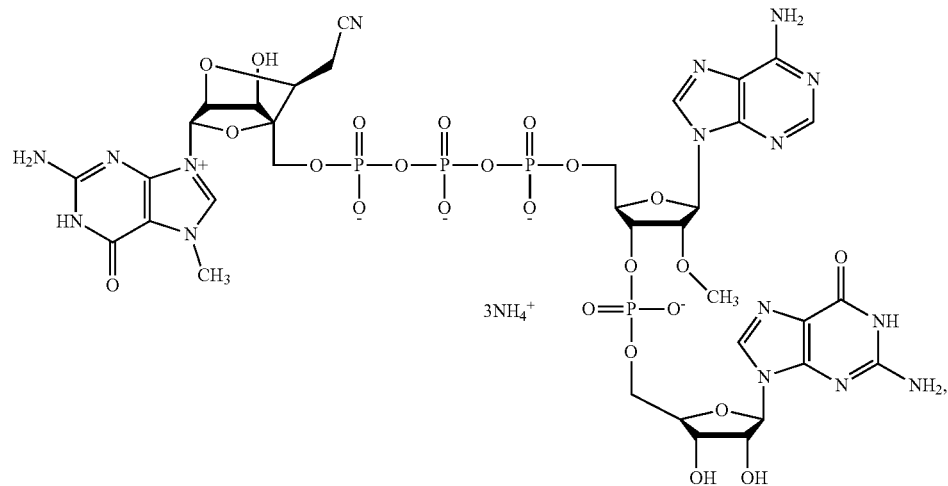
YK-CAP-002
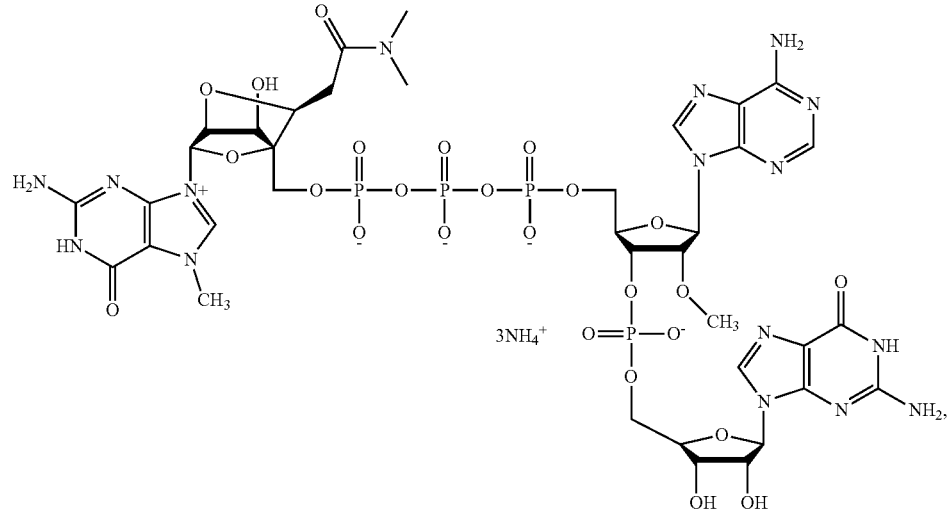
YK-CAP-003

-continued
YK-CAP-004
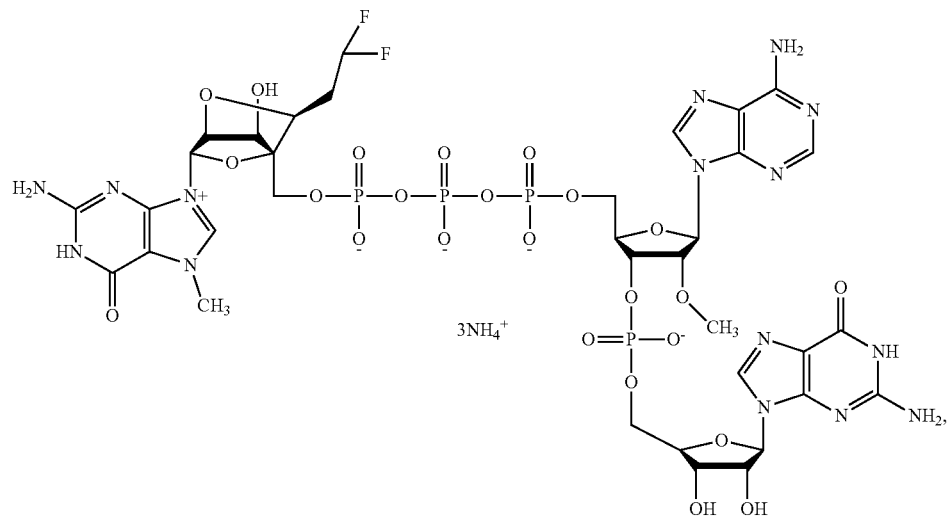
YK-CAP-005
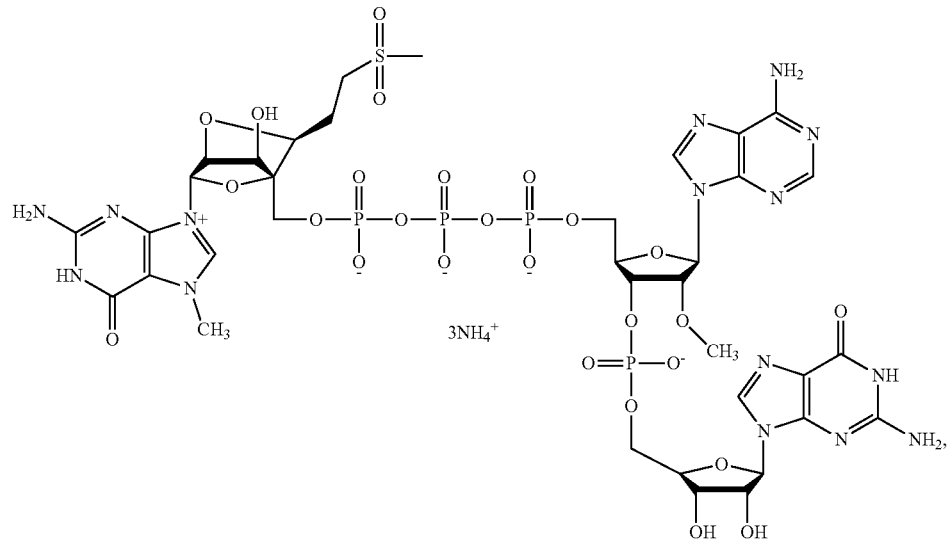
YK-CAP-006
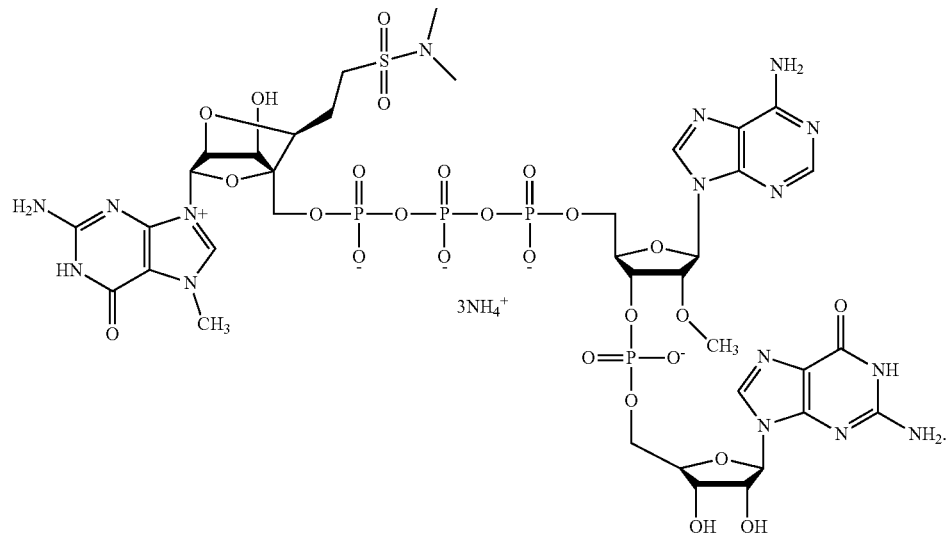

Compared to similar compounds in the prior art, the locked nucleoside-modified cap analogs of the present disclosure have the following advantages:

1) The locked nucleoside-modified cap analogs of the present disclosure are brand new compounds, which are completely different from similar compounds in the prior art in structure.

2) Compared to similar compounds in the prior art, the locked nucleoside-modified cap analogs of the present disclosure show a significant increase in the in vitro transcription yield of mRNA, a significant increase in the capping rate, a significant increase in the translation efficiency of the target mRNA, a significant decrease in the decapping rate, and a significant increase in the amount and duration of protein expression by mRNA in mice.

For example, the in vitro transcription yield of mRNA and capping rate of YK-CAP-004 are 35.0% and 18.8% higher than those of compound 14, respectively; the translation efficiency of YK-CAP-004 is 4 times that of m6A; the decapping rate of YK-CAP-004 is 38.3% lower than that of N-7413; the average radiation intensity (corresponding to the amount of protein expression) is 2.1 and 3.4 times that of m6A at 6 hours and 96 hours, respectively.

Moreover, the present disclosure has discovered that the locked nucleoside-modified cap analogs with similar structures may vary greatly in the in vitro transcription yield of mRNA, capping rate, translation efficiency of the target mRNA, decapping rate, and amount and duration of protein expression by mRNA in mice.

For example, compared to YK-CAP-001, YK-CAP-002, and compound 14, which have very similar structures, YK-CAP-004 show the following improvements: the in vitro transcription yield of mRNA is 82.8% higher than that of YK-CAP-001; the capping rate is 26.1% higher than that of YK-CAP-002, the translation efficiency of mRNA is 2.0 times that of YK-CAP-002, the decapping rate is 18.5% lower than that of compound 14; the average radiation intensity of the protein expressed by mRNA in mice is 2.6 times and 5.5 times that of YK-CAP-002 at 6 hours and 96 hours, respectively.

Therefore, it is not possible to predict the level of activity of locked nucleoside-modified cap analogs based on their structures.

The RNA delivery agent may be, for example, lipid nanoparticles (LNPs). Lipid nanoparticles are widely used in small molecule drug and nucleic acid delivery. mRNA encapsulated by LNPs can be protected from extracellular ribonucleases and facilitates intracellular delivery of mRNA. For lipid nanoparticles, please refer to the review "Chemistry of Lipid Nanoparticles for RNA Delivery. Acc Chem Res. 2022 Jan. 4; 55(1): 2-12".

Cationic Lipid

Lipid Nanoparticles Typically Include a Cationic Lipid.

The term "cationic lipid" as used herein refers to a lipid that is positively charged at a selected pH value. For example, please refer to the cationic lipids disclosed in literatures such as WO2023133946A1, CN115745820A, and "Chemistry of Lipid Nanoparticles for RNA Delivery. Acc Chem Res. 2022 Jan. 4; 55(1): 2-12".

In one embodiment, the cationic lipid is selected from one or more of the following compounds:

(1) a compound of formula (II), or an N-oxide, a solvate, a pharmaceutically acceptable salt, or a stereoisomer thereof, wherein $G_1$ is $C_{1-6}$ alkylene; $G_2$ is $C_{2-8}$ alkylene; $G_3$ is $C_{1-3}$ alkylene; $L_1$ is $C_{6-15}$ linear alkyl; $L_2$ is $C_{12-25}$ branched alkyl;

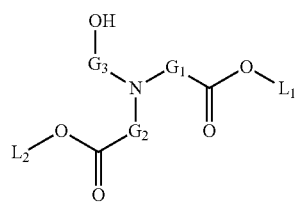

(2) a compound of formula (III), or an N-oxide, a solvate, a pharmaceutically acceptable salt, or a stereoisomer thereof, wherein $G_1$ is $C_{2-8}$ alkylene; $G_2$ is $C_{2-8}$ alkylene; $L_1$ is —C(O)O— or —OC(O)—; $L_2$ is —C(O)O— or —OC(O)—; $R_1$ is $C_{6-25}$ linear or branched alkyl; $R_2$ is $C_{6-25}$ linear or branched alkyl; $G_3$ is HO(CH$_2$)$_2$— or HO(CH$_2$)$_3$—; $G_4$ is HO(CH$_2$)$_2$— or HO(CH$_2$)$_3$—; L is (CH$_2$)$_2$—, —(CH$_2$)$_3$—, or —(CH$_2$)$_4$—;

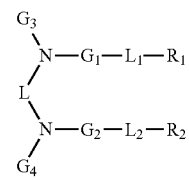

(3) a compound of formula (IV), or an N-oxide, a solvate, a pharmaceutically acceptable salt, or a stereoisomer thereof, wherein $G_1$ is C1-6 alkylene; $G_2$ is $C_{2-8}$ alkylene; $R_1$ is $C_{6-20}$ linear or branched alkyl; $R_2$ is $C_{12-25}$ branched alkyl; $G_3$ is HO(CH$_2$)$_2$N(CH$_3$)(CH$_2$)$_2$—, HO(CH$_2$)$_2$N(CH$_2$CH$_3$)(CH$_2$)$_2$—, (HO(CH$_2$)$_2$)$_2$N(CH$_2$)$_2$—, CH$_3$O(CH$_2$)$_2$N(CH$_3$)(CH$_2$)$_2$—, (CH$_3$)$_2$N(CH$_2$)$_3$SC(O)O(CH$_2$)$_2$—, (CH$_3$)$_2$N(CH$_2$)$_3$SC(O)—, CH$_3$NH(CH$_2$)$_2$N(CH$_3$)(CH$_2$)$_2$—, or CH$_3$CH$_2$NH(CH$_2$)$_2$—;

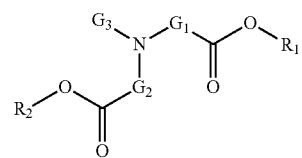

(4) a compound of formula (V), or an N-oxide, a solvate, a pharmaceutically acceptable salt, or a stereoisomer thereof, wherein $G_1$ is $C_{1-8}$ alkylene; $G_2$ is $C_{2-8}$ alkylene; $R_1$ is $C_{6-25}$ linear or branched alkyl; $R_2$ is $C_{12-25}$ linear or branched alkyl; $G_3$ is HO(CH$_2$)$_2$N(R$_3$)CH$_2$CH(OH)CH$_2$—, wherein $R_3$ is —CH$_3$, —CH$_2$CH$_3$, or —CH$_2$CH$_2$OH;

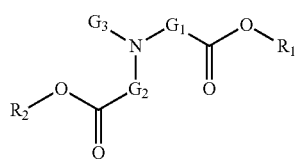

(5) a compound of formula (VI), or an N-oxide, a solvate, a pharmaceutically acceptable salt, or a stereoisomer thereof, wherein $G^1$ and $G^2$ are each independently unsubstituted $C_6$-$C_{10}$ alkylene; $G^3$ is unsubstituted $C_1$-$C_{12}$ alkylene; $R^1$ and $R^2$ are each independently $C_6$-$C_{24}$ alkyl or $C_6$-$C_{24}$ alkenyl; $R^3$ is $OR^5$, N, —C(=O)OR$^4$, —OC(=O)R$^4$, or —NR$^5$C(=O)R$^4$; $R^4$ is $C_1$-$C_{12}$ hydrocarbyl; and $R^5$ is H or $C_1$-$C_6$ hydrocarbyl;

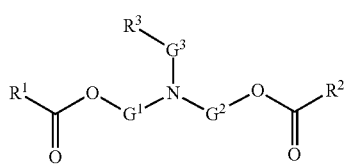

(IV)

(6) a compound of formula (VII), or an N-oxide, a solvate, a pharmaceutically acceptable salt, or a stereoisomer thereof, wherein $R_4$ is selected from —(CH$_2$)$_n$Q and —(CH$_2$)$_n$CHQR; Q is selected from the group consisting of —OR, —OH, —O(CH$_2$)$_n$N(R)$_2$, —OC(O)R, —CX$_3$, —CN, —N(R)C(O)R, —N(H)C(O)R, —N(R)S(O)$_2$R, —N(H)S(O)$_2$R, —N(R)C(O)N(R)$_2$, —N(H)C(O)N(R)$_2$, —N(H)C(O)N(H)(R), —N(R)C(S)N(R)$_2$, —N(H)C(S)N(R)$_2$, —N(H)C(S)N(H)(R), —N(R)S(O)$_2$R$_8$, and heterocycle; n is 1, 2, or 3;

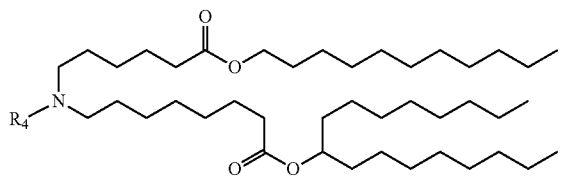

(VII)

(7) a compound of formula (VIII), or an N-oxide, a solvate, a pharmaceutically acceptable salt, or a stereoisomer thereof, (VIII)

In a preferred embodiment, the cationic lipid is selected from one or more of YK-009, YK-401, YK-305, ALC0315, SM102, or DLIN-MC3-DMA:

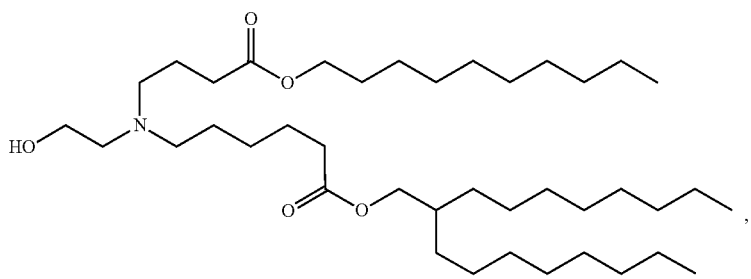

YK-009

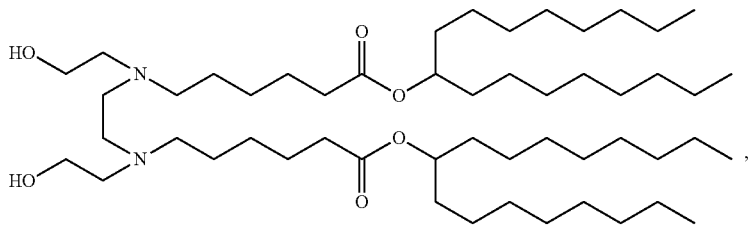

YK-401

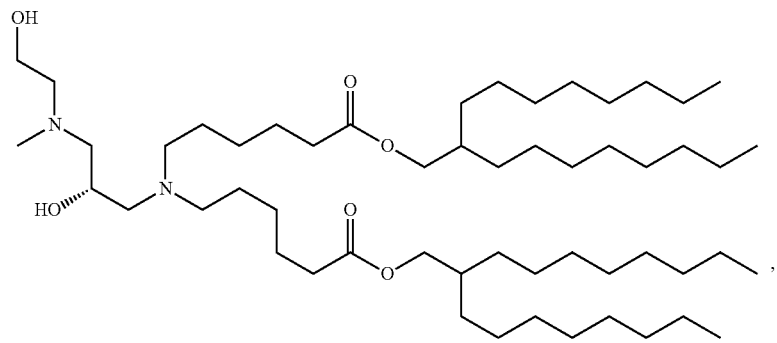

YK-305

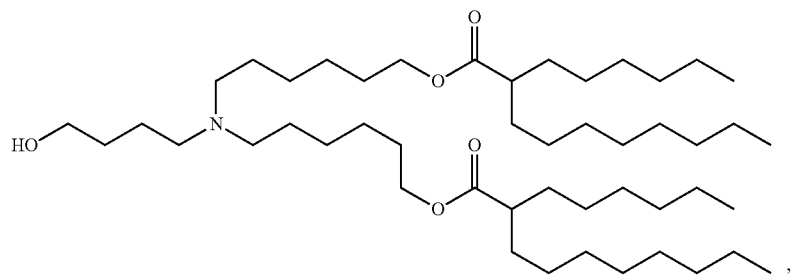

ALC-0315

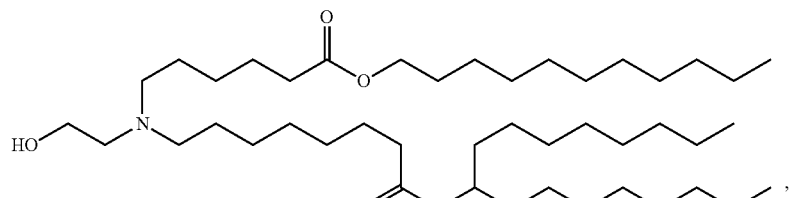

SM-102

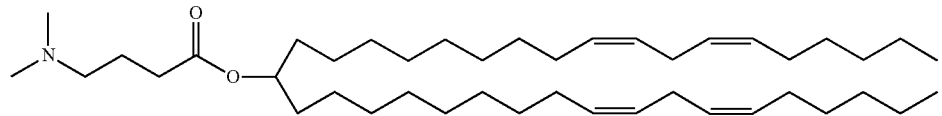

DLIN-MC3-DMA

In a more preferred embodiment, the cationic lipid is YK-009.

Neutral Lipid

The RNA delivery agent comprising the cationic lipid may further comprise a neutral lipid. In the present disclosure, the neutral lipid refers to an auxiliary lipid that is uncharged or exists in a zwitterionic form at a selected pH value. The neutral lipid may regulate the fluidity of nanoparticles into a lipid bilayer structure and improve efficiency by promoting lipid phase transition, and may also affect target organ specificity.

In one embodiment, the molar ratio of the cationic lipid to the neutral lipid is about 1:1 to 15:1, for example, about 14:1, 13:1, 12:1, 11:1, 10:1, 9:1, 8:1, 7:1, 6:1, 5:1, 4:1, 3:1, and 2:1. In a preferred embodiment, the molar ratio of the cationic lipid to the neutral lipid is about 4.5:1. In another preferred embodiment, the molar ratio of the cationic lipid to the neutral lipid is about 4.9:1.

For example, the neutral lipid may include one or more of phosphatidylcholine, phosphatidylethanolamine, sphingomyelin, ceramide, sterol, or derivatives thereof.

The RNA delivery agent comprising the cationic lipid may comprise one or more neutral lipids, i.e., phospholipids, such as one or more (poly)unsaturated lipids. The phospholipid can be assembled into one or more lipid bilayers.

Generally, the phospholipid may comprise a phospholipid moiety and one or more fatty acid moieties.

The neutral lipid moiety may be selected from the non-limiting group consisting of phosphatidylcholine, phosphatidylethanolamine, phosphatidylglycerol, phosphatidylserine, phosphatidic acid, 2-lysophosphatidylcholine, and sphingomyelin. The fatty acid moiety may be selected from the non-limiting group consisting of lauric acid, myristic acid, myristoleic acid, palmitic acid, palmitoleic acid, stearic acid, oleic acid, linoleic acid, α-linolenic acid, erucic acid, phytanic acid, arachidic acid, arachidonic acid, eicosapentaenoic acid, behenic acid, docosapentaenoic acid, and docosahexaenoic acid. Also contemplated are non-natural species which include natural species with modifications and substitutions including branching, oxidation, cyclization, and alkynes. For example, the phospholipid can be functionalized with or cross-linked with one or more alkynes (e.g., an alkenyl group in which one or more double bonds are replaced by a triple bond). Under appropriate reaction conditions, alkynyl groups may undergo copper-catalyzed cycloaddition reactions upon exposure to azides. These reactions can be used to functionalize the lipid bilayer of the composition to facilitate membrane penetration or cell recognition, or to couple the composition to useful components such as targeting or imaging moieties (e.g., dyes).

The neutral lipid for use in these compositions may be selected from the non-limiting group consisting of 1,2-dilinoleoyl-sn-glycero-3-phosphocholine (DLPC), 1,2-dimyristoyl-sn-glycero-phosphocholine (DMPC), 1,2-dioleoyl-sn-glycero-3-phosphocholine (DOPC), 1,2-dipalmitoyl-sn-glycero-3-phosphocholine (DPPC), 1,2-distearoyl-sn-glycero-3-phosphocholine (DSPC), 1,2-diundecanoyl-sn-glycero-phosphocholine (DUPC), 1-palmitoyl-2-oleoyl-sn-glycero-3-phosphocholine (POPC), 1,2-di-O-octadecenyl-sn-glycero-3-phosphocholine (18:0 Diether PC), 1-oleoyl-2-cholesterylhemisuccinoyl-sn-glycero-3-phosphocholine (OChemsPC), 1-hexadecyl-sn-glycero-3-phosphocholine (C16 Lyso PC), 1,2-dilinolenoyl-sn-glycero-3-phosphocholine, 1,2-diarachidonoyl-sn-glycero-3-phosphocholine, 1,2-didocosahexaenoyl-sn-glycero-3-phosphocholine, 1,2-dioleoyl-sn-glycero-3-phosphoethanolamine (DOPE), 1,2-diphytanoyl-sn-glycero-3-phosphoethanolamine (ME 16.0 PE), 1,2-distearoyl-sn-glycero-3-phosphoethanolamine, 1,2-dilinoleoyl-sn-glycero-3-phosphoethanolamine, 1,2-dilinolenoyl-sn-glycero-3-phosphoethanolamine, 1,2-diarachidonoyl-sn-glycero-3-phosphoethanolamine, 1,2-didocosahexaenoyl-sn-glycero-3-phosphoethanolamine, 1,2-dioleoyl-sn-glycero-3-phospho-rac-(1-glycerol) sodium salt (DOPG), dipalmitoyl phosphatidylglycerol (DPPG), palmitoyl oleoyl phosphatidylethanolamine (POPE), distearoyl-phosphatidyl-ethanolamine (DSPE), dipalmitoyl phosphatidylethanolamine (DPPE), dimyristoyl phosphoethanolamine (DMPE), 1-stearoyl-2-oleoyl-stearoylethanolamine (SOPE), 1-stearoyl-2-oleoyl-phosphatidylcholine (SOPC), sphingomyelin, phosphatidylcholine, phosphatidylethanolamine, phosphatidylserine, phosphatidylinositol, phosphatidic acid, palmitoyl oleoyl phosphatidylcholine, lysophosphatidylcholine, lysophosphatidylethanolamine (LPE), and mixtures thereof.

In some embodiments, the neutral lipid comprises DSPC. In certain embodiments, the neutral lipid comprises DOPE. In some embodiments, the neutral lipid comprises both DSPC and DOPE.

Structural Lipid

The RNA delivery agent comprising the cationic lipid may further comprise one or more structural lipids. In the present disclosure, the structural lipid refers to a lipid that enhances the stability of nanoparticles by filling the gaps between lipids.

In one embodiment, the molar ratio of the cationic lipid to the structural lipid is about 0.6:1 to 3:1, for example, about 1.0:1, 1.1:1, 1.2:1, 1.3:1, 1.4:1, 1.5:1, 1.6:1, 1.7:1, 1.8:1, 1.9:1, and 2.0:1.

The structural lipid may be selected from, but is not limited to, the group consisting of cholesterol, nonsterol, sitosterol, ergosterol, campesterol, stigmasterol, brassinosterol, tomatine, ursolic acid, α-tocopherol, corticosteroid, and mixtures thereof. In some embodiments, the structural lipid is cholesterol. In some embodiments, the structural lipid includes cholesterol, corticosteroid (e.g., prednisolone, dexamethasone, prednisone, and hydrocortisone), or a combination thereof.

Polymer-Conjugated Lipid

The RNA delivery agent comprising the cationic lipid may further comprise one or more polymer-conjugated lipids. The polymer-conjugated lipid mainly refers to a lipid modified with polyethylene glycol (PEG). Hydrophilic PEG stabilizes LNPs, regulates nanoparticle size by limiting lipid fusion, and increases nanoparticle half-life by reducing non-specific interactions with macrophages.

In one embodiment, the polymer-conjugated lipid is selected from one or more of PEG-modified phosphatidylethanolamine, PEG-modified phosphatidic acid, PEG-modified ceramide, PEG-modified dialkylamine, PEG-modified diacylglycerol, or PEG-modified dialkylglycerol. The molecular weight of PEG for the PEG modification is usually 350 to 5000 Da.

For example, the polymer-conjugated lipid is selected from one or more of distearoyl phosphatidylethanolamine polyethylene glycol 2000 (DSPE-PEG2000), dimyristoylglycero-3-methoxypolyethylene glycol 2000 (DMG-PEG2000), or methoxypolyethylene glycol ditetradecylacetamide (ALC-0159).

In one embodiment, the polymer-conjugated lipid is DMG-PEG2000.

In one embodiment, the RNA delivery agent comprises a neutral lipid, a structural lipid, and a polymer-conjugated lipid, wherein the molar ratio of the cationic lipid, the neutral lipid, the structural lipid, and the polymer-conjugated lipid is (25 to 75):(5 to 25):(15 to 65):(0.5 to 10), such as (35 to 49):(7.5 to 15):(35 to 55):(1 to 5).

In one embodiment, the RNA delivery agent comprises a neutral lipid, a structural lipid, and a polymer-conjugated lipid, wherein the molar ratio of the cationic lipid, the neutral lipid, the structural lipid, and the polymer-conjugated lipid is 49:10:39.5:1.5.

The embodiments of the present disclosure will be described in detail below in conjunction with examples, but it will be understood by those skilled in the art that the following examples are merely used to illustrate the present disclosure and should not be considered as limiting the scope of the present disclosure. The examples without indication of specific conditions follow the conventional conditions or those recommended by the manufacturer. The reagents or instruments used without indication of manufacturers are all commercially available conventional products.

The following abbreviations represent the following reagents:

IBX: 2-iodoxybenzoic acid; $BF_3 \cdot Et_2O$: boron trifluoride diethyl etherate; Allyltrimethylsilane: allyltrimethylsilane; TEA: triethylamine; $Ac_2O$: acetic anhydride; HOAc: acetic acid; conc $H_2SO_4$: concentrated sulfuric acid; BSA: N,O-bis(trimethylsilyl)acetamide; TMSOTf: trimethylsilyl trifluoromethanesulfonate; Toluene: toluene; MeOH: methanol; $Boc_2O$: di-tert-butyl dicarbonate; DIEA: N,N-diisopropylethylamine; DMAP: 4-dimethylaminopyridine; DMSO: dimethyl sulfoxide; HATU: 2-(7-azabenzotriazol-1-yl)-N,N,N',N'-tetramethyluronium hexafluorophosphate; THF: tetrahydrofuran; TBSCl: tert-butyldimethylsilyl chloride; Imidazole: imidazole; DMF: N,N-dimethylformamide; TBAF: tetrabutylammonium fluoride; TBSOTf: tert-butyldimethylsilyl trifluoromethanesulfonate; NMO: N-methylmorpholine-N-oxide; m-CPBA: m-chloroperoxybenzoic acid; DIAD: diisopropyl azodicarboxylate; NCS: N-chlorosuccinimide; $PO(MeO)_3$: trimethyl phosphate; PySSPy: 2,2'-dithiodipyridine; Imidazole: imidazole; $PPh_3$: triphenylphosphine; TEAP: triethylamine phosphate; TEAB: triethylamine bicarbonate; MTBE: methyl tert-butyl ether; DCM: dichloromethane; EA: ethyl acetate; DAST: diethylaminosulfur trifluoride; AcSH: thioacetic acid.

Example 1

1. Synthesis of Intermediate INT-I

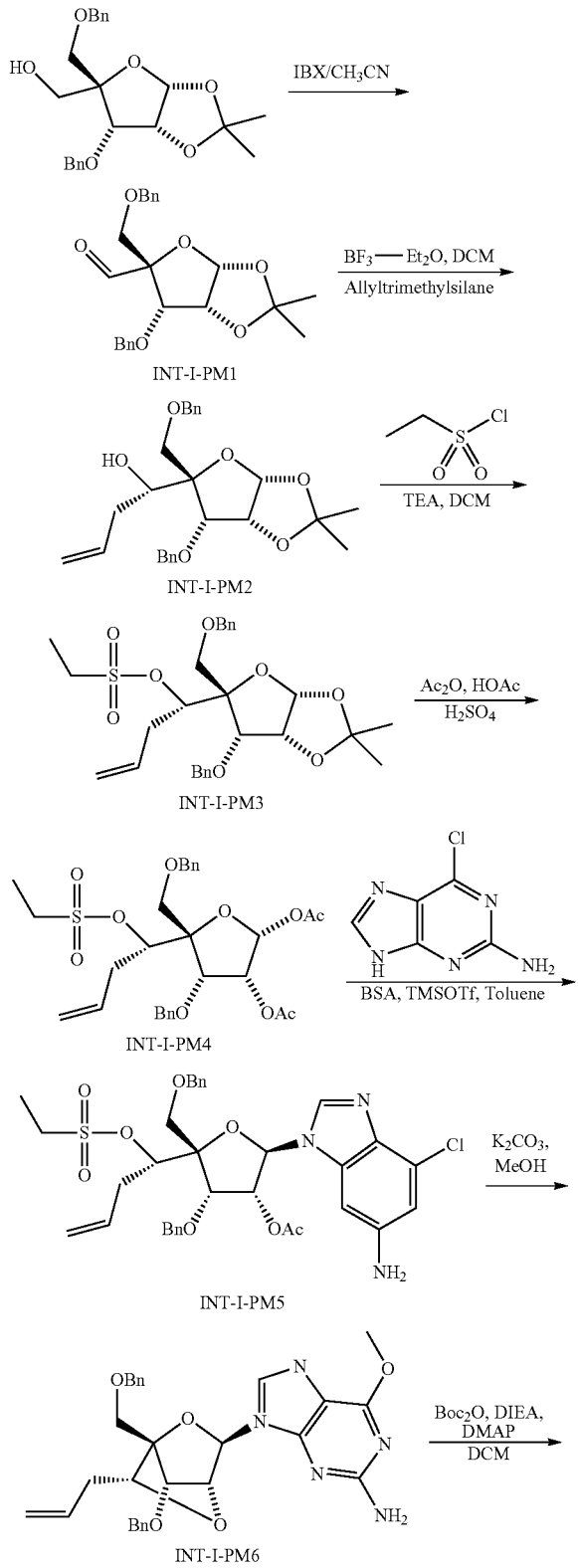

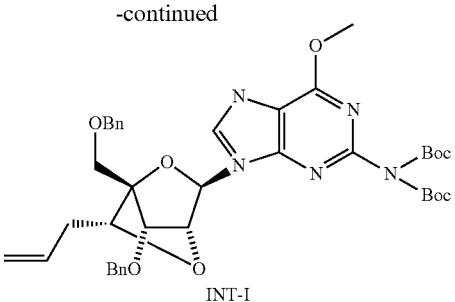

INT-I

Step 1: Synthesis of INT-I-PM1

3-O-benzyl-4-C-benzyloxymethyl-1,2-O-isopropylidene-A-D-ribofuranose (100.0 g, 0.25 mol) was dissolved in 500 mL of acetonitrile, and 2-iodoxybenzoic acid (104.9 g, 0.37 mol) was added thereto. The mixture was heated to 70° C., and stirred and reacted for 2 hours. TLC monitored that the reaction was complete. The reaction was terminated. The reaction mixture was cooled to room temperature, then filtered through diatomite, and the filter cake was rinsed with acetonitrile (500 mL). The filtrate was evaporated to dryness by rotary evaporation under reduced pressure and dried under vacuum to obtain INT-I-PM1 (102.1 g) as a light yellow liquid, which was directly used in the next step.

Step 2: Synthesis of INT-I-PM2

INT-I-PM1 (102.1 g, 0.25 mol) was dissolved in 400 mL of dichloromethane, and the mixture was cooled to −40° C. with stirring. Boron trifluoride diethyl etherate solution (50.82 g, 0.35 mol) was slowly added thereto, and the mixture was stirred and reacted for 5 minutes. Allyltrimethylsilane (52.9 mL, 0.33 mol) was added dropwise thereto, and the mixture was stirred and reacted for 2 hours. TLC monitored that the reaction was complete. The reaction mixture was quenched by slowly pouring into 1000 mL of saturated sodium bicarbonate aqueous solution. The phases were separated, and the aqueous phase was extracted with dichloromethane (500 mL×2). The organic phase was washed with saturated brine (500 mL×2), dried over anhydrous sodium sulfate, and evaporated to dryness by rotary evaporation. The residue was purified by normal-phase silica gel column chromatography to obtain INT-I-PM2 (103.0 g, 0.23 mol) as a light yellow liquid.

Step 3: Synthesis of INT-I-PM3

INT-I-PM2 (103.0 g, 0.23 mol) was dissolved in 500 mL of dichloromethane, then triethylamine (70.9 g, 0.70 mol) was added thereto, and ethanesulfonyl chloride (60.4 g, 0.47 mol) was added dropwise thereto in an ice bath. After the dropwise addition was completed, the ice bath was removed. The mixture was naturally warmed to room temperature, and stirred and reacted for 2 hours. TLC monitored that the reaction was complete. After the reaction was completed, the reaction mixture was quenched by pouring into 1000 mL of saturated sodium bicarbonate aqueous solution. The phases were separated, and the aqueous phase was extracted with dichloromethane (500 mL×2). The organic phases were combined, washed with saturated brine (1000 mL), dried over anhydrous sodium sulfate, and evaporated to dryness by rotary evaporation to obtain a brown viscous substance. The residue was purified by normal-phase silica gel column chromatography to obtain INT-I-PM3 (106.0 g, 0.20 mol, yield: 86.5%) as a light yellow liquid.

Step 4: Synthesis of INT-I-PM4

INT-I-PM3 (106.0 g, 0.20 mol) was dissolved in 200 mL of acetic acid. Acetic anhydride (125.6 g, 1.23 mol) was added thereto, then 2.4 mL of concentrated sulfuric acid was added dropwise thereto, and the mixture was stirred and reacted at room temperature for 1 hour. TLC monitored that the reaction was complete. After the reaction was completed, the reaction mixture was added with ethyl acetate (800 mL) and water (800 mL). The phases were separated, and the aqueous phase was extracted once with ethyl acetate (800 mL). The organic phases were combined, washed with water (800 mL×3), washed with saturated sodium bicarbonate aqueous solution, washed twice with saturated brine, dried over anhydrous sodium sulfate, and evaporated to dryness by rotary evaporation to obtain INT-I-PM4 (86.5 g, 0.15 mol, yield: 75.0%) as a light yellow liquid.

Step 5: Synthesis of INT-I-PM5

To a 1000 mL reaction flask were added 2-amino-6-chloropurine (30.50 g, 0.18 mol) and 250 mL of toluene, then N,O-bis(trimethylsilyl)acetamide (61.00 g, 0.30 mol) was added thereto, and the mixture was heated to 80° C. and stirred to dissolve. After cooling to room temperature, a solution of INT-I-PM4 (86.5 g, 0.15 mol) in 150 mL of toluene was added thereto, and the mixture was stirred for 5 minutes. A solution of trimethylsilyl trifluoromethanesulfonate (40.00 g, 0.18 mol) in 50 mL of toluene was then added dropwise thereto, and the mixture was rapidly heated to 110° C. and reacted for 3 hours. TLC monitored that the reaction was complete. The reaction was terminated. The reaction mixture was cooled to room temperature, then extracted with ethyl acetate (300 mL), washed with saturated sodium bicarbonate aqueous solution (500 mL), and filtered through diatomite to remove the precipitated solid. The phases of the filtrate were separated, and the aqueous phase was back-extracted with ethyl acetate (500 mL). The organic phases were combined, dried over anhydrous $Na_2SO_4$, and evaporated to dryness by rotary evaporation to remove the solvent. The residue was purified by normal-phase silica gel column chromatography to obtain INT-I-PM5 (103.02 g, 0.15 mol, yield: 100%). $C_{32}H_{36}ClN_5O_8S$, MS (ES): m/z (M+H$^+$) 686.2.

Step 6: Synthesis of INT-I-PM6

To a 1000 mL reaction flask were added INT-I-PM5 (103.00 g, 0.15 mol) and 500 mL of methanol, and the mixture was stirred to dissolve. Potassium carbonate (103.73 g, 0.75 mol) was added thereto, and the mixture was reacted at room temperature for 23 hours. TLC monitored that the reaction was complete. The reaction was terminated. The reaction mixture was filtered through diatomite, subjected to rotary evaporation under reduced pressure to remove the solvent, and extracted with ethyl acetate (800 mL) and water (500 mL). The phases were separated, and the aqueous phase was back-extracted with ethyl acetate (300 mL). The organic phases were combined, washed once with saturated sodium chloride aqueous solution (600 mL), dried over anhydrous sodium sulfate, and evaporated to dryness by rotary evaporation to remove the solvent to obtain a crude product, which was subjected to normal-phase silica gel column chromatography to obtain INT-I-PM6 (44.03 g, 0.083 mol, yield: 55.4%). $C_{29}H_{31}N_5O_5$, MS (ES): m/z (M+H$^+$) 530.2.

Step 7: Synthesis of INT-I

INT-I-PM6 (44.00 g, 0.083 mol) was dissolved in dichloromethane (500 mL), then N,N-diisopropylethylamine (32.15 g, 0.24 mol), 4-dimethylaminopyridine (1.01 g, 0.01 mol), and di-tert-butyl dicarbonate (54.45 g, 0.24 mol) were sequentially added thereto, and the reaction system was stirred at 30° C. overnight. TLC monitored that the reaction was almost complete. The solvent was removed by rotary evaporation under reduced pressure. The residue was purified by silica gel chromatography to obtain INT-I (49.81 g, 68.25 mmol, yield: 82.2%). $C_{39}H_{47}N_5O_9$, MS (ES): m/z (M+H$^+$) 730.2.

2. Synthesis of Intermediate INT-II

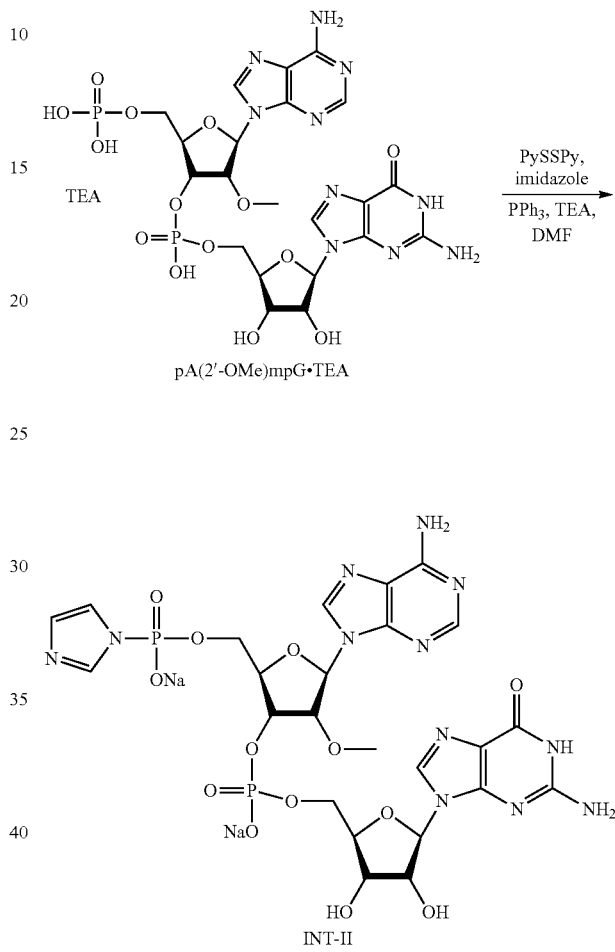

pA(2'-OMe)mpG·TEA (300.1 mg, 0.37 mmol), imidazole (347.2 mg, 5.10 mmol), dithiodipyridine (1123.6 mg, 5.10 mmol), and triethylamine (516.1 mg, 5.10 mmol) were dissolved in 2.0 mL of ultra-dry N,N-dimethylformamide, then triphenylphosphine (1337.7 mg, 5.10 mmol) was added thereto under nitrogen atmosphere, and the mixture was reacted at 25° C. for 4 hours. After the reaction was completed, the reaction mixture was slowly added to a pre-cooled acetone solution containing sodium iodide (598.1 mg, 3.99 mmol), crystallized at 25° C. for 30 minutes, and centrifuged to obtain INT-II (240.6 mg, 0.30 mmol, yield: 80.9%) as a white solid. $C_{24}H_{30}N_{12}O_{13}P_2$, MS (ES): m/z (M−H$^-$): 755.15.

3. Synthesis of YK-CAP-001
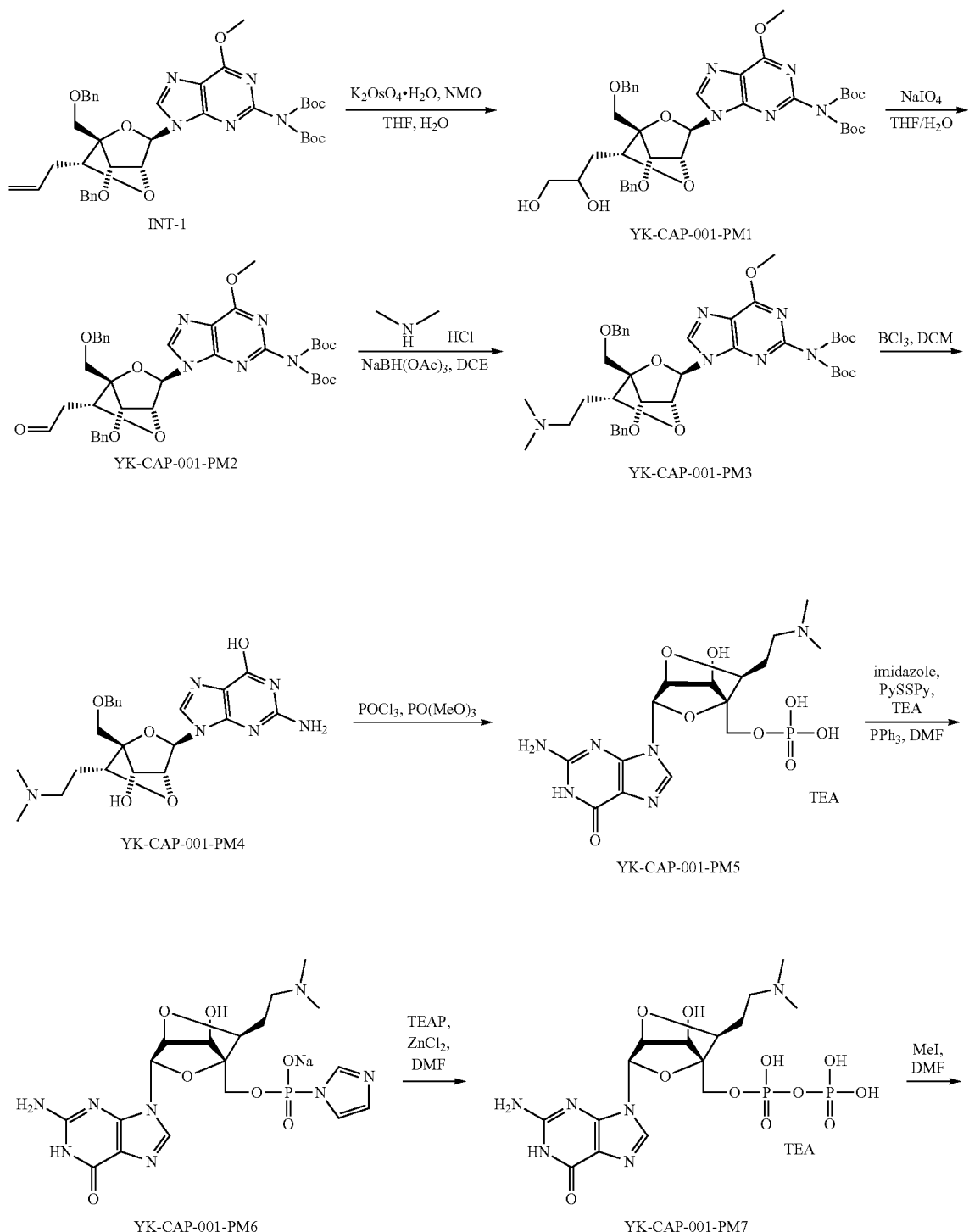

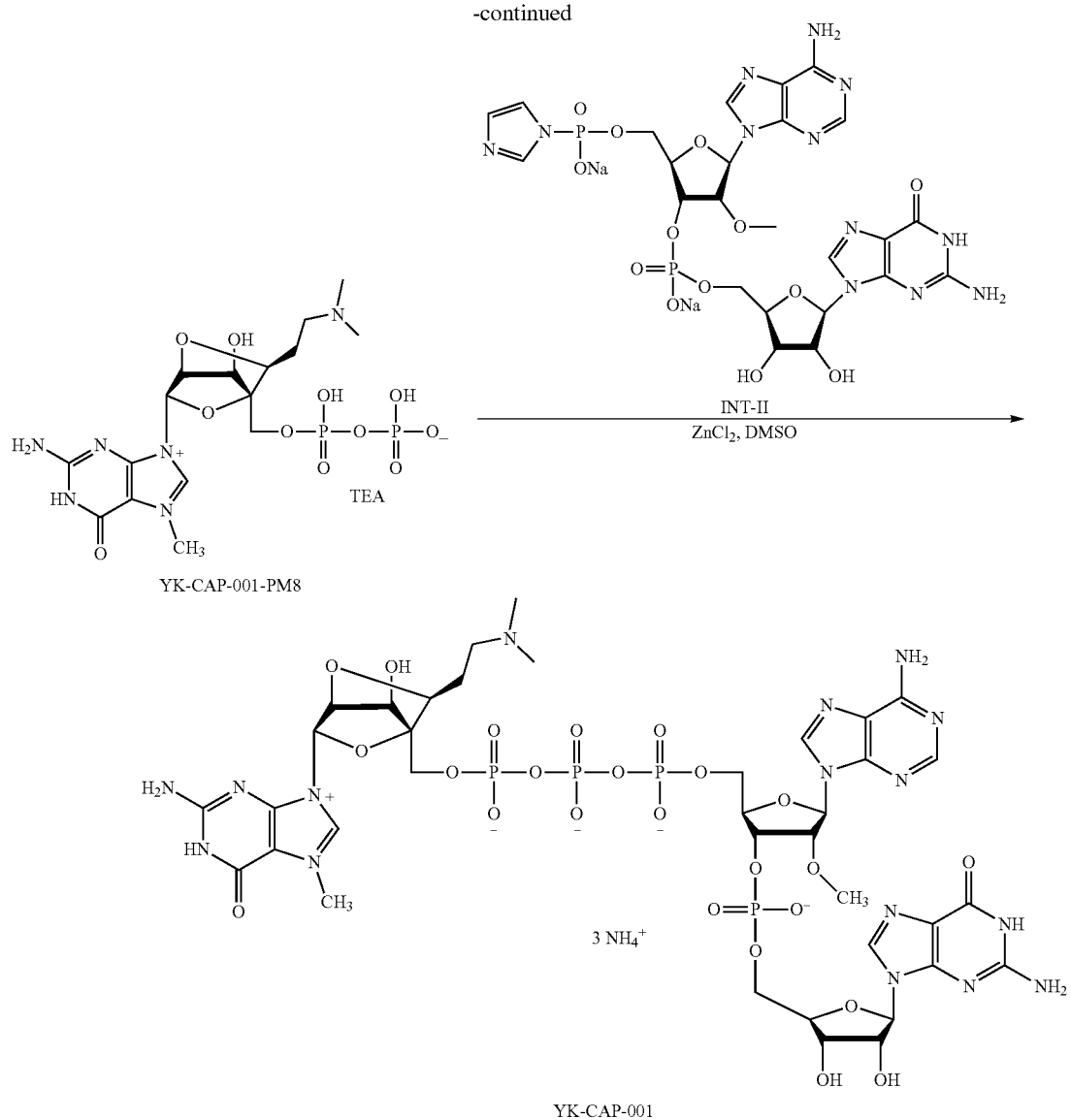

YK-CAP-001

Step 1: Synthesis of YK-CAP-001-PM1

INT-I (49.81 g, 68.25 mmol) was dissolved in tetrahydrofuran (400 mL) and water (100 mL). To the above mixture were sequentially added N-methylmorpholine oxide (12.00 g, 102.37 mmol) and potassium osmate dihydrate (1.26 g, 3.41 mmol). The reaction system was stirred at room temperature for 5 hours. TLC showed that the reaction was complete. The reaction mixture was quenched with saturated sodium sulfite, extracted with ethyl acetate (500 mL×2), and the organic phase was washed with 200 mL of saturated sodium chloride solution. Finally, the organic phase was dried over anhydrous sodium sulfate, filtered, and evaporated to dryness by rotary evaporation to obtain YK-CAP-001-PM1 (52.00 g, 68.08 mmol, yield: 99.8%). $C_{39}H_{49}N_5O_{11}$, MS (ES): m/z (M+H$^+$) 764.3.

Step 2: Synthesis of YK-CAP-001-PM2

YK-CAP-001-PM1 (52.00 g, 68.08 mmol) was dissolved in tetrahydrofuran (500 mL) and water (125 mL), then sodium periodate (21.84 g, 102.11 mmol) was weighed and added thereto, and the reaction system was warmed to 30° C. overnight. TLC showed that the reaction was complete. The reaction system was quenched with saturated sodium sulfite and extracted with ethyl acetate (500 mL×3). The organic phases were combined, washed with saturated brine, dried over anhydrous sodium sulfate, filtered, and evaporated to dryness by rotary evaporation to obtain YK-CAP-001-PM2 (45.5 g, 62.2 mmol, yield: 91.3%). $C_{38}H_{45}N_5O_{10}$, MS (ES): m/z (M+H$^+$) 732.3.

Step 3: Synthesis of YK-CAP-001-PM3

YK-CAP-001-PM2 (15.30 g, 20.90 mmol) and dimethylamine hydrochloride (8.52 g, 104.50 mmol) were dissolved in dichloroethane (300 mL), then sodium triacetoxyborohydride (22.16 g, 104.50 mmol) was slowly added thereto at room temperature, and the mixture was stirred and reacted at room temperature for 15 hours. LCMS monitored that the reaction was complete. The reaction system was diluted with 200 mL of dichloromethane and quenched with saturated ammonium chloride aqueous solution. The phases were separated, and the aqueous phase was extracted with dichloromethane (200 mL×2). The organic phases were combined, washed with 100 mL of saturated sodium chloride aqueous solution, dried over anhydrous sodium sulfate, filtered, and evaporated to dryness by rotary evaporation. The residue was purified by silica gel chromatography to obtain YK-CAP-001-PM3 (10.80 g, 14.19 mmol, yield: 67.9%). $C_{40}H_{52}N_6O_9$, MS (ES): m/z (M+H$^+$) 761.3.

Step 4: Synthesis of YK-CAP-001-PM4

YK-CAP-001-PM3 (10.60 g, 13.93 mmol) as starting material was dissolved in dichloromethane (300 mL). The above reaction system was cooled to −40° C. under nitrogen atmosphere, and a solution of boron trichloride (111.4 mL, 111.4 mmol) in dichloromethane was slowly added dropwise thereto. After the dropwise addition was completed, the reaction system was slowly warmed to 0° C. and stirred at the same temperature for 3 hours. TLC showed that the reaction was complete. The reaction system was re-cooled to −40° C., quenched with methanol, evaporated to dryness by rotary evaporation, and left at room temperature for 24 hours to obtain 5.5 g of a brown crude product. 1.5 g of the crude product was purified by preparative HPLC to obtain YK-CAP-001-PM4 (508.47 mg, 1.39 mmol). $C_{15}H_{22}N_6O_5$, MS (ES): m/z (M+H$^+$) 367.1.

$^1$H NMR (400 MHz, MeOD) δ 8.16 (s, 1H), 4.51 (s, 1H), 4.41 (s, 1H), 4.29-4.27 (m, 1H), 3.91 (s, 2H), 3.47-3.34 (m, 2H), 2.95 (s, 6H), 2.86-2.85 (m, 1H), 2.25-2.20 (m, 2H).

Step 5: Synthesis of Intermediate YK-CAP-001-PM5

Intermediate YK-CAP-001-PM4 (380.0 mg, 1.04 mmol) was dissolved in 4.0 mL of trimethyl phosphate and placed in an ice bath, then phosphorus oxychloride (1.69 g, 10.37 mmol) was slowly added dropwise thereto under nitrogen atmosphere, and the mixture was reacted at 0° C. for 4 hours. After the reaction was completed, 4.0 mL of purified water was slowly added thereto in an ice bath, and the mixture was stirred in an ice bath for 1 hour. The reaction mixture was then washed three times with dichloromethane (4 mL×3), and the aqueous phase was concentrated under reduced pressure to remove the organic solvent. The residue was dissolved in 200 mL of purified water and purified by gel column chromatography to obtain YK-CAP-001-PM5 triethylamine salt (260.0 mg, 0.47 mmol, yield: 45.8%) as a white solid. $C_{15}H_{23}N_6O_8P$, MS (ES): m/z (M−H$^−$) 445.13.

Step 6: Synthesis of Intermediate YK-CAP-001-PM6

YK-CAP-001-PM5 triethylamine salt (260.0 mg, 0.47 mmol), imidazole (384.0 mg, 5.64 mmol), dithiodipyridine (1242.5 mg, 5.64 mmol), and triethylamine (570.7 mg, 5.64 mmol) were dissolved in 2.0 mL of ultra-dry N,N-dimethylformamide, then triphenylphosphine (1479.3 mg, 5.64 mmol) was added thereto under nitrogen atmosphere, and the mixture was reacted at 25° C. for 4 hours. After the reaction was completed, the reaction mixture was slowly added to a pre-cooled acetone solution containing sodium iodide (704.5 mg, 4.7 mmol), crystallized at 25° C. for 30 minutes, and repeatedly centrifuged to obtain YK-CAP-001-PM6 (165 mg, 0.32 mmol, yield: 67.0%) as a white solid. $C_{18}H_{25}N_8O_7P$, MS (ES): m/z (M−H$^−$) 495.16.

Step 7: Synthesis of Intermediate YK-CAP-001-PM7

YK-CAP-001-PM6 (165 mg, 0.32 mmol), triethylamine phosphate (197.2 mg, 0.99 mmol), and zinc chloride (90.0 mg, 0.66 mmol) were dissolved in 2.0 mL of ultra-dry N,N-dimethylformamide, and the mixture was reacted at 25° C. for 16 hours. After the reaction was completed, the reaction mixture was added with methyl tert-butyl ether, stirred for 10 minutes, and allowed to stand. The supernatant was removed, and the lower turbid liquid was taken. After concentration under reduced pressure to remove the solvent, the residue was dissolved in 100 mL of purified water and purified by gel column chromatography to obtain YK-CAP-001-PM7 triethylamine salt (150.5 mg, 0.24 mmol, yield: 75.3%) as a white solid. $C_{15}H_{24}N_6O_{11}P_2$, MS (ES): m/z (M−H$^−$) 525.10.

Step 8: Synthesis of Intermediate YK-CAP-001-PM8

YK-CAP-001-PM7 triethylamine salt (150.5 mg, 0.24 mmol) and iodomethane (136.3 mg, 0.96 mmol) were dissolved in 1.5 mL of N,N-dimethylformamide, and the mixture was reacted at 40° C. for 16 hours. After the reaction was completed, the reaction mixture was added with 20 mL of purified water. The aqueous phase was washed three times with dichloromethane (20 mL×3) and taken. After concentration under reduced pressure to remove the solvent, the residue was dissolved in 100 mL of purified water and purified by gel column chromatography to obtain 320 mg of a white crude product. The resulting crude product was further purified by preparative liquid chromatography to obtain YK-CAP-001-PM8 triethylamine salt (75 mg, 0.12 mmol, yield: 48.7%) as a white solid. $C_{16}H_{26}N_6O_{11}P_2$, MS (ES): m/z (M−H$^−$) 539.11.

Step 9: Synthesis of YK-CAP-001

YK-CAP-001-PM8 triethylamine salt (75 mg, 0.12 mmol), INT-II (136.2 mg, 0.18 mmol), and $ZnCl_2$ (163.6 mg, 1.2 mmol) were dissolved in 0.4 mL of DMSO, and the mixture was reacted at 37° C. for 48 hours. After the reaction was completed, the reaction mixture was added with 0.1 M EDTA until clarified, diluted to 100 mL with water, and purified by gel column chromatography to obtain a white crude product (200.6 mg). The resulting crude product was further purified by preparative liquid chromatography to obtain YK-CAP-001 (16.9 mg, 13.20 mol, yield: 11.3%) as a white solid. C37H$_{52}$N$_{16}$O$_{24}$P$_4$, MS (ES): m/z (M−H$^−$) 1227.21.

$^1$H NMR (400 MHz, $D_2O$) δ 8.28 (s, 1H), 7.92 (s, 1H), 7.83 (s, 1H), 5.86 (d, J=6.0 Hz, 1H), 5.74 (d, J=6.0 Hz, 1H), 5.54 (s, 1H), 4.84-4.83 (m, 1H), 4.43-4.42 (m, 4H), 4.33-4.31 (m, 2H), 4.22-4.20 (m, 4H), 4.10-4.09 (m, 3H), 4.00-3.99 (m, 1H), 3.93-3.92 (m, 1H), 3.91 (s, 3H), 3.29 (s, 3H), 3.13-3.03 (m, 2H), 2.93 (s, 6H), 2.24-2.20 (m, 2H); $^{31}$P NMR ($D_2O$, 162 MHz) δ −0.92 (s, 1P), −11.11 (d, J=19.4 Hz, 1P), −11.59 (d, J=17.8 Hz, 1P), −22.91 (t, J=17.8 Hz, 1P).

4. Synthesis of YK-CAP-002

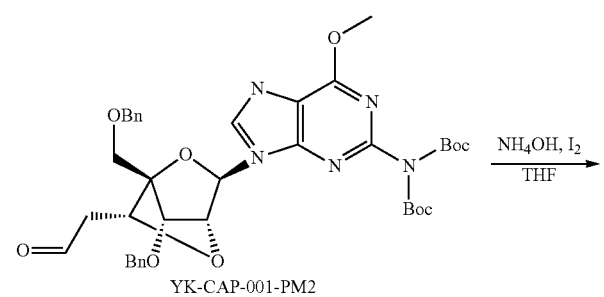
YK-CAP-001-PM2

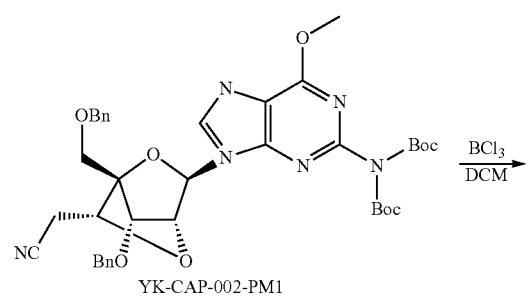
YK-CAP-002-PM1

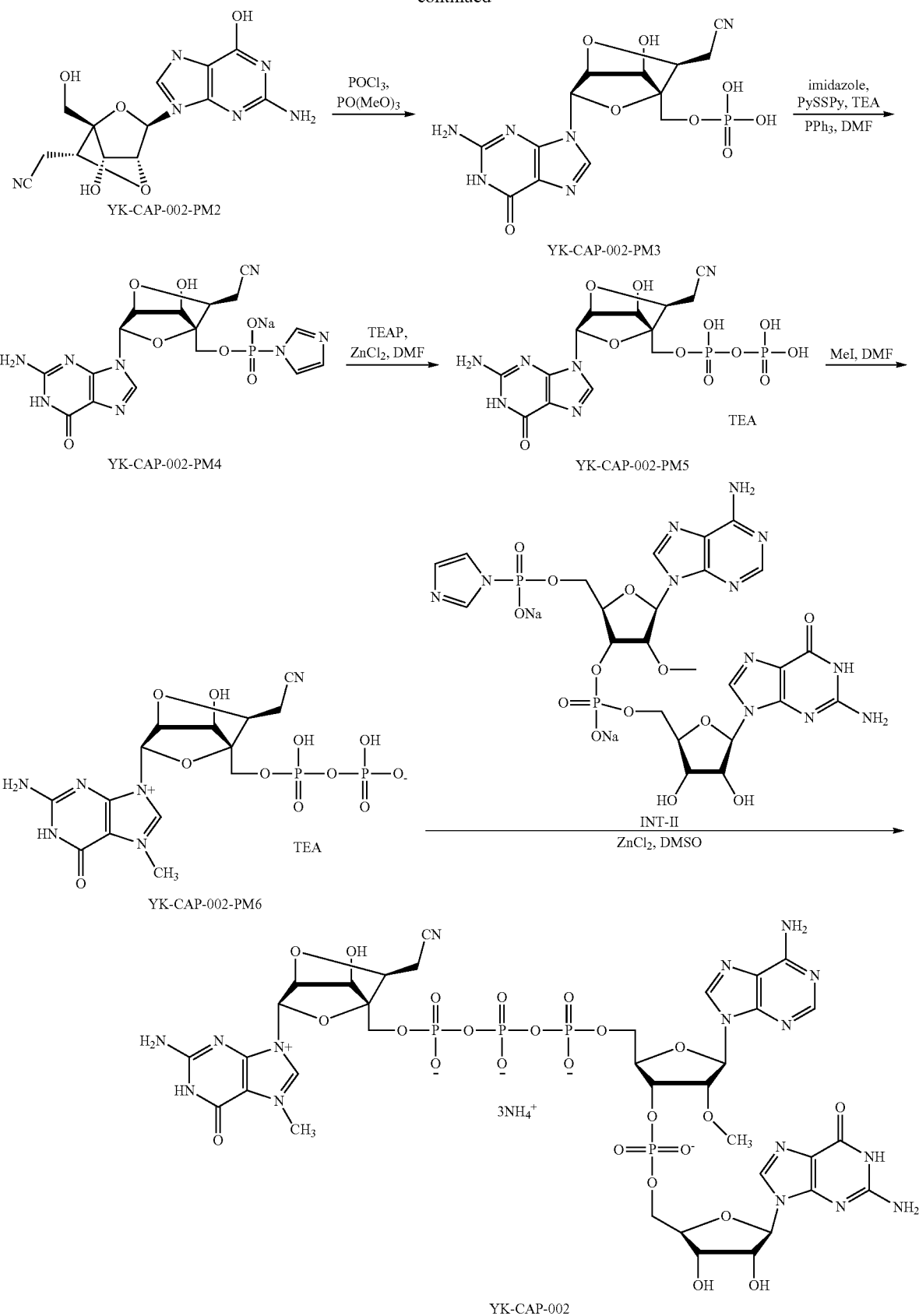

Step 1: Synthesis of YK-CAP-002-PM1

YK-CAP-001-PM2 (22.0 g, 30.06 mmol) was dissolved in 440 mL of tetrahydrofuran, and the mixture was cooled to −10° C. To the above system was added 26% ammonia water (250 mL). The mixture was stirred and reacted at −10° C. for 5 minutes, followed by the addition of iodine (23.0 g, 90.62 mmol), and stirred and reacted at the same temperature for another 2 hours. The reaction mixture was then warmed to room temperature, and stirred and reacted for another 15 minutes. The reaction mixture was quenched with saturated sodium thiosulfate solution and extracted with ethyl acetate. The organic phase was dried, evaporated to dryness by rotary evaporation, and purified by silica gel chromatography to obtain YK-CAP-002-PM1 (14.7 g, 20.17 mmol, yield: 67.1%) as a light yellow oily liquid. $C_{38}H_{44}N_6O_9$, MS (ES): m/z (M+H$^+$) 729.42.

Step 2: Synthesis of YK-CAP-002-PM2

YK-CAP-002-PM1 (4.0 g, 5.49 mmol) was dissolved in dichloromethane, and the mixture was cooled to −40° C. A 1 M solution of boron trichloride in dichloromethane (27.5 mL) was slowly added dropwise thereto under nitrogen atmosphere. After the dropwise addition was completed, the mixture was cooled from room temperature to 0° C. and reacted for 5 hours. The reaction system was then re-cooled to −40° C. and quenched with methanol. The reaction mixture was evaporated to dryness by rotary evaporation under reduced pressure to obtain a crude product, which was subjected to preparative high-pressure liquid chromatography to obtain YK-CAP-002-PM2 (490 mg, 1.47 mmol, yield: 26.8%). $C_{13}H_{14}N_6O_5$, MS (ES): m/z (M+H$^+$) 335.18.

$^1$H NMR (400 MHz, MeOD) δ 8.16 (s, 1H), 5.92 (s, 1H), 4.54 (s, 1H), 4.48-4.42 (m, 2H), 3.92 (s, 2H), 2.94-2.92 (m, 2H).

Step 3: Synthesis of Intermediate YK-CAP-002-PM3

According to the synthesis route of YK-CAP-001-PM5, YK-CAP-002-PM2 (490 mg, 1.47 mmol) was used as starting material to obtain YK-CAP-002-PM3 triethylamine salt (1.07 g, 2.08 mmol). $C_{13}H_{15}N_6O_8P$, MS (ES): m/z (M−H$^-$) 413.07.

Step 4: Synthesis of Intermediate YK-CAP-002-PM4

According to the synthesis route of YK-CAP-001-PM6, YK-CAP-002-PM3 triethylamine salt (1.07 g, 2.08 mmol) was used as starting material to obtain YK-CAP-002-PM4 (578.5 mg, 1.19 mmol). $C_{16}H_{17}N_8O_7P$, MS (ES): m/z (M−H$^-$) 463.10.

Step 5: Synthesis of Intermediate YK-CAP-002-PM5

According to the synthesis route of YK-CAP-001-PM7, YK-CAP-002-PM4 (578.5 mg, 1.19 mmol) was used as starting material to obtain YK-CAP-002-PM5 (391.9 mg, 0.66 mmol, yield: 55.3%). $C_{13}H_{16}N_6O_{11}P_2$, MS (ES): m/z (M−H$^-$) 493.04.

Step 6: Synthesis of Intermediate YK-CAP-002-PM6

According to the synthesis route of YK-CAP-001-PM8, YK-CAP-002-PM5 (391.9 mg, 0.66 mmol) was used as starting material to obtain YK-CAP-002-PM6 (58 mg, 0.1 mmol, yield: 14.5%). $C_{14}H_{18}N_6O_{11}P_2$, MS (ES): m/z (M−H$^-$) 507.05.

Step 7: Synthesis of YK-CAP-002

According to the synthesis route of YK-CAP-001, YK-CAP-002-PM6 (58 mg, 0.1 mmol) was used as starting material to obtain YK-CAP-002 (17.5 mg, 14.02 mol, yield: 14.7%). $C_{35}H_{44}N_{16}O_{24}P_4$, MS (ES): m/z (M−H$^-$) 1195.14.

$^1$H NMR (400 MHz, D$_2$O) δ 8.27 (s, 1H), 7.94 (s, 1H), 7.85 (s, 1H), 5.87 (d, J=6.0 Hz, 1H), 5.73 (d, J=6.0 Hz, 1H), 5.55 (s, 1H), 4.85-4.83 (m, 1H), 4.44-4.40 (m, 4H), 4.31-4.30 (m, 2H), 4.25-4.23 (m, 4H), 4.10-4.08 (m, 3H), 3.99-3.97 (m, 1H), 3.94-3.92 (m, 4H), 3.29 (s, 3H), 2.95-2.90 (m, 2H); $^{31}$P NMR (D$_2$O, 162 MHz) δ −0.93 (s, 1P), −11.14 (d, J=19.6 Hz, 1P), −11.60 (d, J=17.8 Hz, 1P), −22.93 (t, J=17.8 Hz, 1P).

5. Synthesis of YK-CAP-003

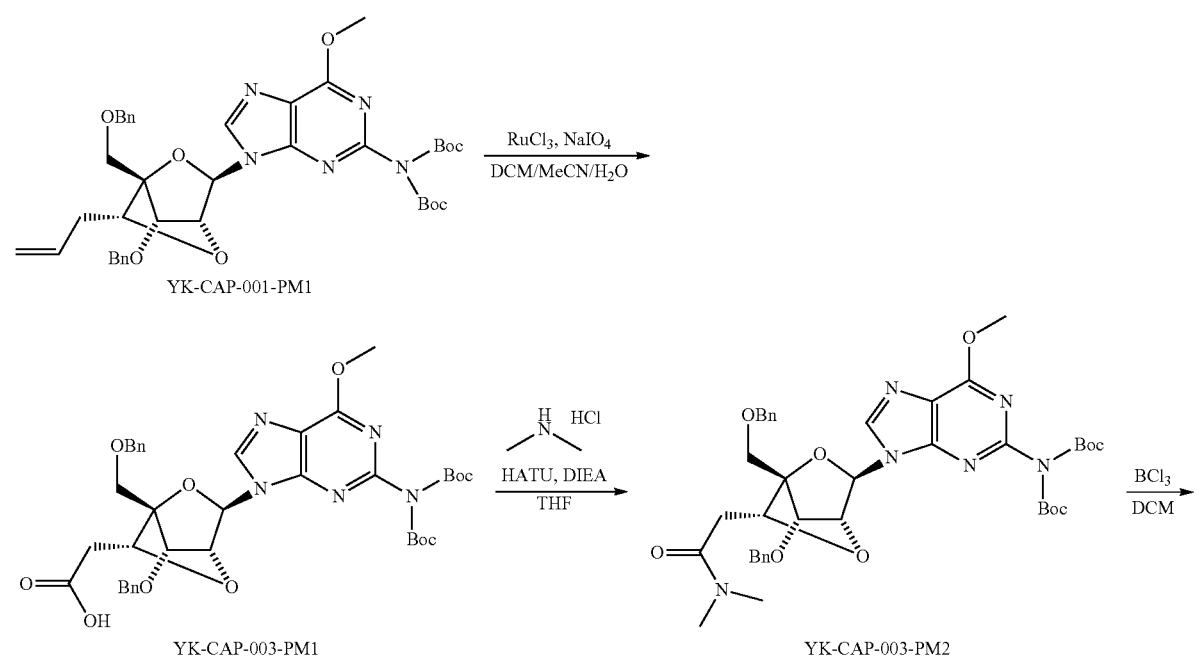

-continued
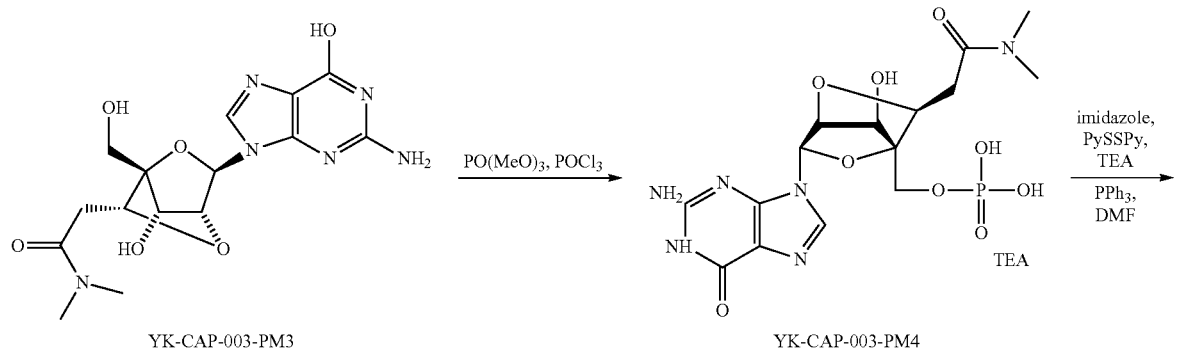
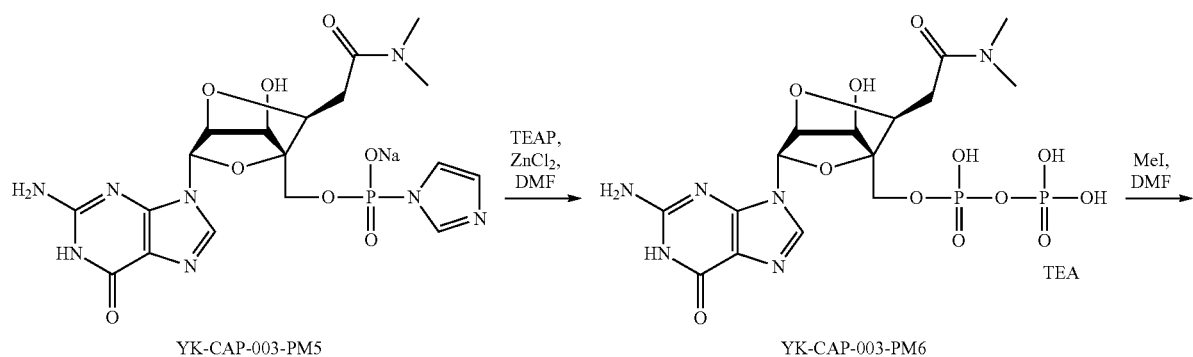
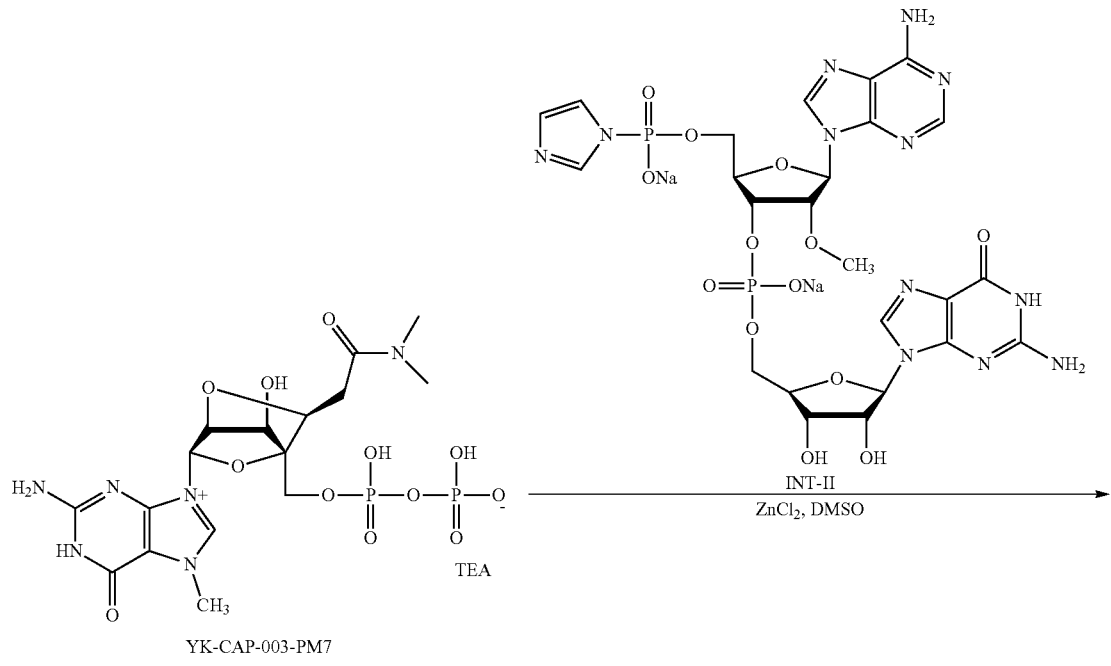

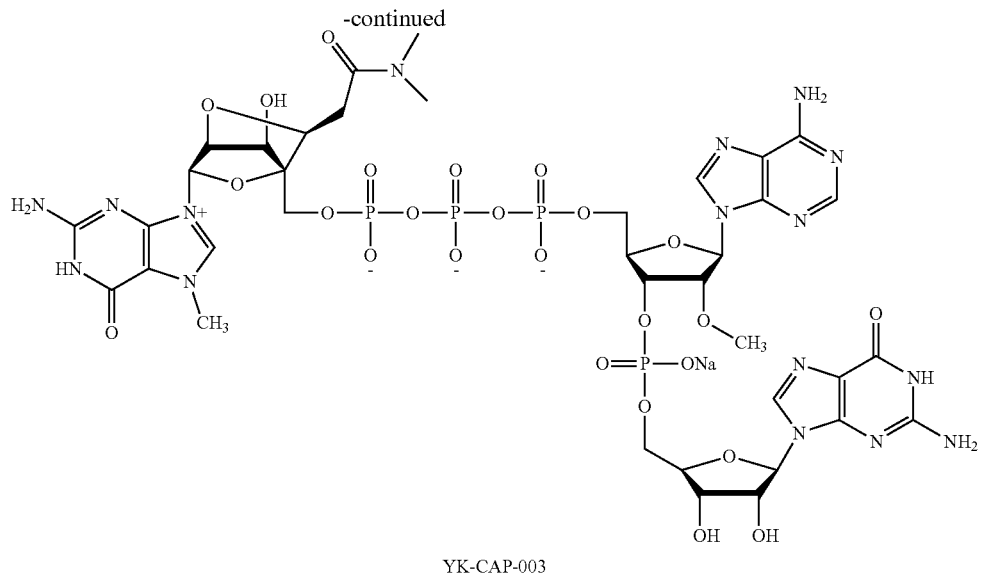

YK-CAP-003

Step 1: Synthesis of YK-CAP-003-PM1

YK-CAP-001-PM1 (22.00 g, 30.14 mmol) was dissolved in a mixture of dichloromethane (220 mL), acetonitrile (220 mL), and water (330 mL), then sodium periodate (52.06 g, 241.12 mmol) and ruthenium trichloride (250 mg, 1.21 mmol) were added thereto, and the mixture was stirred and reacted at 30° C. for 48 hours. After the reaction was completed, the reaction mixture was evaporated to dryness by rotary evaporation to remove the solvent. The residue was dissolved in ethyl acetate (400 mL), washed three times with purified water (120 mL×3), and the aqueous phase was back-extracted once with ethyl acetate (200 mL). The organic phases were combined, dried over anhydrous sodium sulfate, filtered, and the filtrate was evaporated to dryness by rotary evaporation under vacuum. The residue was purified by silica gel chromatography to obtain YK-CAP-003-PM1 (19.87 g, 26.58 mmol, yield: 88.2%). $C_{38}H_{45}N_5O_{11}$, MS (ES): m/z (M+H$^+$) 748.3.

Step 2: Synthesis of YK-CAP-003-PM2

YK-CAP-003-PM1 (19.87 g, 26.58 mmol) was dissolved in tetrahydrofuran (200 mL), then dimethylamine hydrochloride (2.38 g, 29.23 mmol), 2-(7-azabenzotriazol-1-yl)-N,N,N', N'-tetramethyluronium hexafluorophosphate (12.13 g, 31.90 mmol), and N,N-diisopropylethylamine (10.31 g, 79.74 mmol) were sequentially added thereto, and the mixture was stirred and reacted at room temperature overnight. After the reaction was completed, the reaction mixture was subjected to rotary evaporation to remove the solvent. The residue was dissolved in ethyl acetate (400 mL), washed with purified water (120 mL×3), and the aqueous phase was back-extracted once with ethyl acetate (200 mL). The organic phase was dried over anhydrous sodium sulfate, filtered, and the filtrate was concentrated under vacuum. The residue was purified by silica gel chromatography to obtain YK-CAP-003-PM2 (13.10 g, 16.91 mmol, yield: 63.6%). $C_{40}H_{50}N_6O_{10}$, MS (ES): m/z (M+H$^+$) 775.3.

Step 3: Synthesis of YK-CAP-003-PM3

YK-CAP-003-PM2 (13.0 g, 16.78 mmol) was dissolved in dichloromethane (195 mL), and a 1 M solution of boron trichloride in dichloromethane (134 mL, 134 mmol) was slowly added dropwise thereto at −40° C. After the dropwise addition was completed, the mixture was warmed to 0° C., and stirred and reacted for 6 hours. After the reaction was completed, the reaction mixture was cooled to −40° C., quenched with methanol (200 mL), subjected to rotary evaporation under vacuum to remove the solvent, and placed in a closed environment at room temperature for 24 hours to obtain crude YK-CAP-003-PM3. The crude product was added dropwise to 500 mL of dichloromethane, and the precipitated solid was filtered to obtain a total of 7.89 g of filter cake, 2.0 g of which was taken and purified by HPLC to obtain pure YK-CAP-003-PM3 (956.04 mg, 2.51 mmol). $C_{15}H_{20}N_6O_6$, MS (ES): m/z (M+H$^+$) 381.32.

$^1$H NMR (400 MHz, CD$_3$OD) δ 7.97 (s, 1H), 5.84 (s, 1H), 4.70-4.63 (m, 1H), 4.45-4.38 (m, 2H), 3.91-3.75 (m, 2H), 3.15 (s, 3H), 2.99-2.70 (m, 5H).

Step 4: Synthesis of Intermediate YK-CAP-003-PM4

According to the synthesis route of YK-CAP-001-PM5, YK-CAP-003-PM3 (956.04 mg, 2.51 mmol) was used as starting material to obtain YK-CAP-003-PM4 triethylamine salt (921.3 mg, 1.64 mmol, yield: 65.3%). $C_{15}H_{21}N_6O_9P$, MS (ES): m/z (M−H$^−$) 459.11.

Step 5: Synthesis of Intermediate YK-CAP-003-PM5

According to the synthesis route of YK-CAP-001-PM6, YK-CAP-003-PM4 triethylamine salt (921.3 mg, 1.64 mmol) was used as starting material to obtain YK-CAP-003-PM5 (510.3 mg, 0.96 mmol, yield: 58.4%). $C_{18}H_{23}N_8O_8P$, MS (ES): m/z (M−H$^−$) 509.12.

Step 6: Synthesis of Intermediate YK-CAP-003-PM6

According to the synthesis route of YK-CAP-001-PM7, YK-CAP-003-PM5 (510.3 mg, 0.96 mmol) was used as starting material to obtain YK-CAP-003-PM6 (853.8 mg, 1.33 mmol). $C_{15}H_{22}N_6O_{12}P_2$, MS (ES): m/z (M−H$^−$) 539.08.

Step 7: Synthesis of Intermediate YK-CAP-003-PM7

According to the synthesis route of YK-CAP-001-PM8, YK-CAP-003-PM6 (853.8 mg, 1.33 mmol) was used as starting material to obtain YK-CAP-003-PM7 (170.0 mg, 0.26 mmol). $C_{16}H_{24}N_6O_{12}P_2$, MS (ES): m/z (M−H$^−$) 553.09.

Step 8: Synthesis of YK-CAP-003

According to the synthesis route of YK-CAP-001, YK-CAP-003-PM7 (170.0 mg, 0.26 mmol) was used as starting material to obtain YK-CAP-003 (20.3 mg, 15.7 mol, yield: 6.0%). $C_{37}H_{50}N_{16}O_{25}P_4$, MS (ES): m/z (M–H⁻) 1241.19.
¹H NMR (400 MHz, $D_2O$) δ 8.31 (s, 1H), 7.97 (s, 1H), 7.89 (s, 1H), 5.91 (d, J=6.2 Hz, 1H), 5.77 (d, J=5.8 Hz, 1H), 5.56 (s, 1H), 4.87-4.85 (m, 1H), 4.46-4.43 (m, 4H), 4.33-4.31 (m, 2H), 4.23-4.20 (m, 4H), 4.13-4.10 (m, 3H), 4.05-4.03 (m, 1H), 3.96-3.93 (m, 1H), 3.91-3.74 (m, 5H), 3.31 (s, 3H), 3.15 (s, 3H), 2.96 (s, 3H); ³¹P NMR ($D_2O$, 162 MHz) δ –0.96 (s, 1P), –11.15 (d, J=19.4 Hz, 1P), –11.63 (d, J=17.7 Hz, 1P), –22.97 (t, J=17.8 Hz, 1P).
6. Synthesis of YK-CAP-004
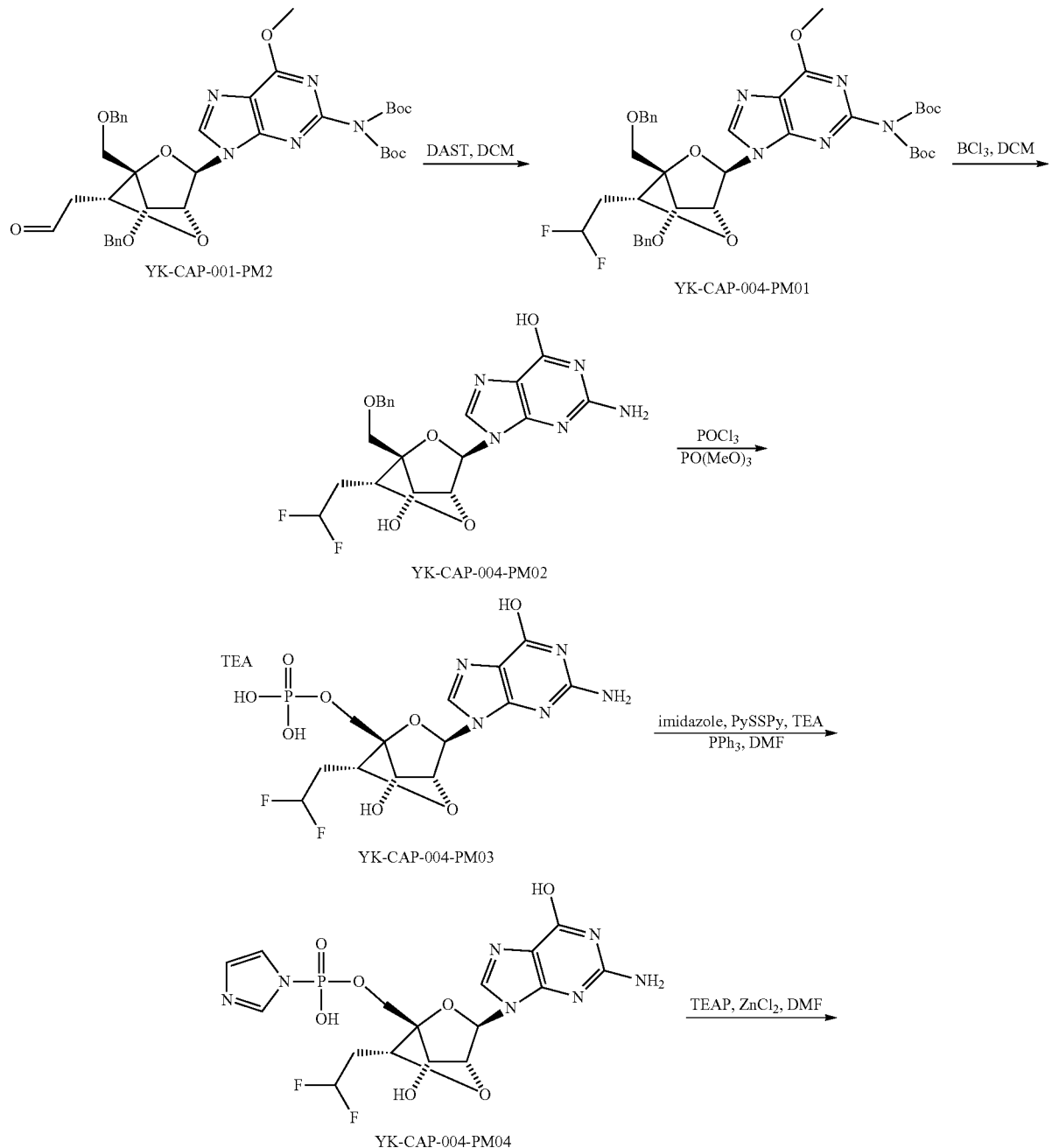

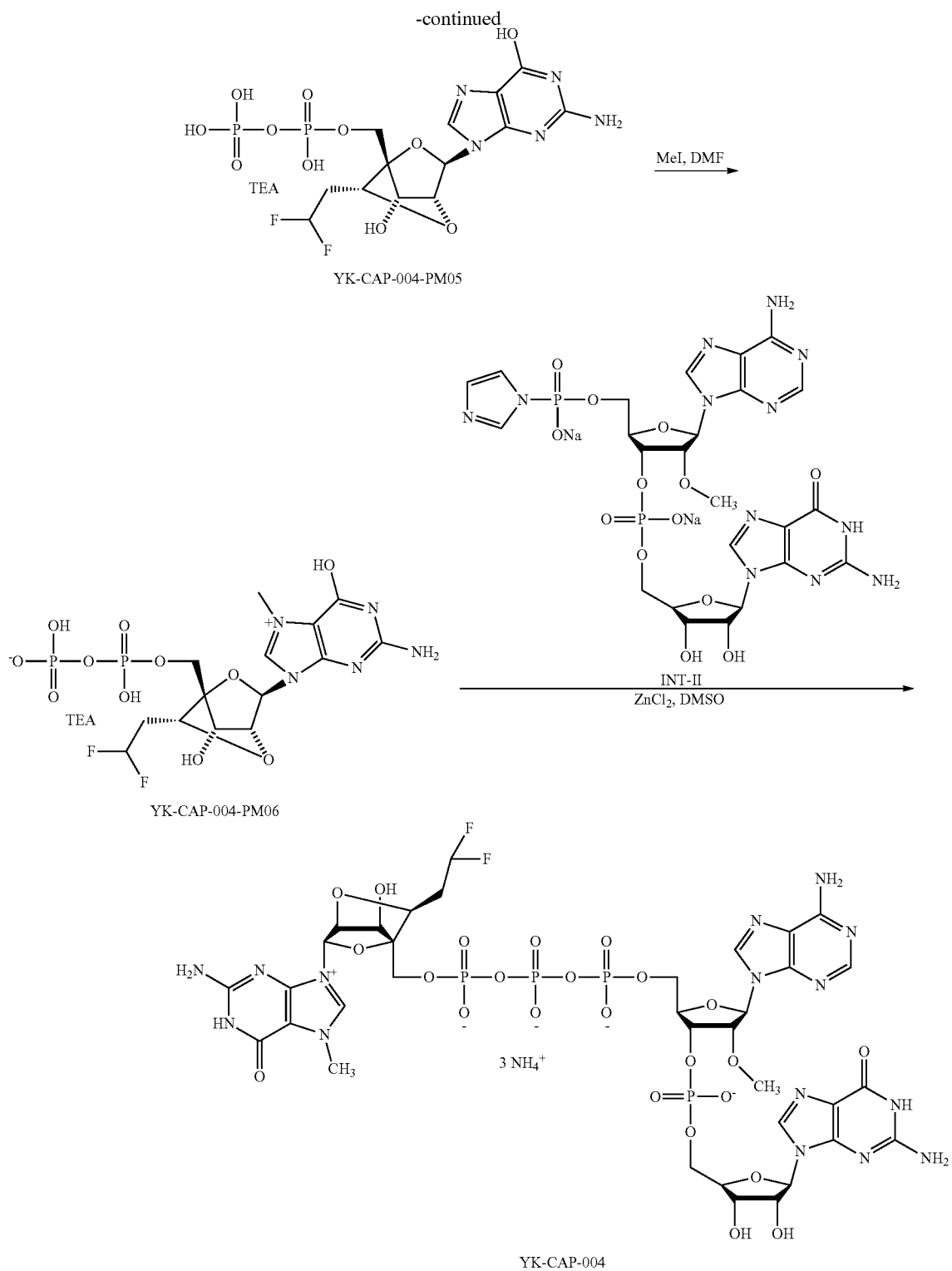

Step 1: Synthesis of YK-CAP-004-PM1

YK-CAP-001-PM2 (12.65 g, 17.29 mmol) was dissolved in dichloromethane (70 mL). The reaction system was cooled to −40° C., and a solution of diethylaminosulfur trifluoride (8.36 g, 51.86 mmol) in dichloromethane was slowly added dropwise thereto. After the dropwise addition was completed, the reaction system was returned to 0° C. and reacted for 4 hours. LCMS monitored that the reaction was complete. The reaction system was quenched with saturated sodium bicarbonate aqueous solution and extracted with dichloromethane (200 mL×3). The organic phases were combined, washed with 200 mL of saturated sodium chloride aqueous solution, dried over anhydrous sodium sulfate, filtered, and evaporated to dryness by rotary evaporation. The residue was purified by silica gel chromatography to obtain YK-CAP-004-PM1 (7.92 g, 10.51 mmol, yield: 60.8%). $C_{38}H_{45}F_2N_5O_9$, MS (ES): m/z (M+H$^+$) 754.3.

Step 2: Synthesis of YK-CAP-004-PM2

YK-CAP-004-PM1 (4.00 g, 5.31 mmol) as starting material was dissolved in dichloromethane (30 mL). The above reaction system was cooled to −40° C. under nitrogen atmosphere, and a 1 M solution of boron trichloride (26.53 mL, 26.53 mmol) in dichloromethane was slowly added dropwise thereto. After the dropwise addition was completed, the reaction system was slowly warmed to 0° C. and stirred at the same temperature for 4 hours. TLC monitored that the reaction was complete. The reaction system was re-cooled to −40° C., quenched with methanol, evaporated to dryness by rotary evaporation, left at room temperature for 24 hours, added with 200 mL of dichloromethane, and the precipitated solid was filtered to obtain 2.0 g of crude product. The crude product was purified by preparative HPLC to obtain YK-CAP-004-PM2 (926.34 mg, 2.58 mmol, yield: 48.8%). $C_{13}H_{15}F_2N_5O_5$, MS (ES): m/z (M+H$^+$) 360.1.

$^1$H NMR (400 MHz, MeOD) δ 7.94 (s, 1H), 6.34-5.94 (m, 1H), 5.86 (s, 1H), 4.62 (s, 1H), 4.44 (dd, J=24.2, 8.7 Hz, 3H), 3.99-3.84 (m, 2H), 2.48-2.08 (m, 2H).

Step 3: Synthesis of Intermediate YK-CAP-004-PM3

According to the synthesis route of YK-CAP-001-PM5, YK-CAP-004-PM2 (926.34 mg, 2.58 mmol) was used as starting material to obtain YK-CAP-004-PM3 triethylamine salt (1.48 g, 2.74 mmol). $C_{13}H_{16}F_2N_5O_8P$, MS (ES): m/z (M−H$^-$) 438.07.

Step 4: Synthesis of Intermediate YK-CAP-004-PM4

According to the synthesis route of YK-CAP-001-PM6, YK-CAP-004-PM3 triethylamine salt (1.48 g, 2.74 mmol) was used as starting material to obtain YK-CAP-004-PM4 (771.8 mg, 1.51 mmol). $C_{16}H_{18}F_2N_7O_7P$, MS (ES): m/z (M−H$^-$) 488.08.

Step 5: Synthesis of Intermediate YK-CAP-004-PM5

According to the synthesis route of YK-CAP-001-PM7, YK-CAP-004-PM4 (771.8 mg, 1.51 mmol) was used as starting material to obtain YK-CAP-004-PM5 (1.22 g, 1.97 mmol). $C_{13}H_{17}F_2N_5O_{11}P_2$, MS (ES): m/z (M−H$^-$) 518.04.

Step 6: Synthesis of Intermediate YK-CAP-004-PM6

According to the synthesis route of YK-CAP-001-PM8, YK-CAP-004-PM5 (1.22 g, 1.97 mmol) was used as starting material to obtain YK-CAP-004-PM6 (172.6 mg, 0.27 mmol). $C_{14}H_{19}F_2N_5O_{11}P_2$, MS (ES): m/z (M−H$^-$) 532.05.

Step 7: Synthesis of YK-CAP-004

According to the synthesis route of YK-CAP-001, YK-CAP-004-PM6 (172.6 mg, 0.27 mmol) was used as starting material to obtain YK-CAP-004 (22.3 mg, 17.5 μmol, yield: 6.4%). $C_{35}H_{42}F_2N_{15}O_{24}P_4$, MS (ES): m/z (M−H$^-$) 1220.15.

$^1$H NMR (400 MHz, D$_2$O) δ 8.32 (s, 1H), 7.98 (s, 1H), 7.87 (s, 1H), 6.35-5.95 (m, 1H), 5.91 (d, J=6.0 Hz, 1H), 5.76 (d, J=6.0 Hz, 1H), 5.57 (s, 1H), 4.85-4.82 (m, 1H), 4.47-4.45 (m, 4H), 4.38-4.32 (m, 2H), 4.36-4.25 (m, 4H), 4.24-4.15 (m, 3H), 4.01-3.99 (m, 1H), 3.94 (s, 2H), 3.31 (s, 3H), 2.48-2.08 (m, 2H); $^{31}$P NMR (D$_2$O, 162 MHz) δ −0.91 (s, 1P), −11.06 (d, J=19.1 Hz, 1P), −11.60 (d, J=18.3 Hz, 1P), −22.88 (t, J=17.8 Hz, 1P).

7. Synthesis of YK-CAP-005

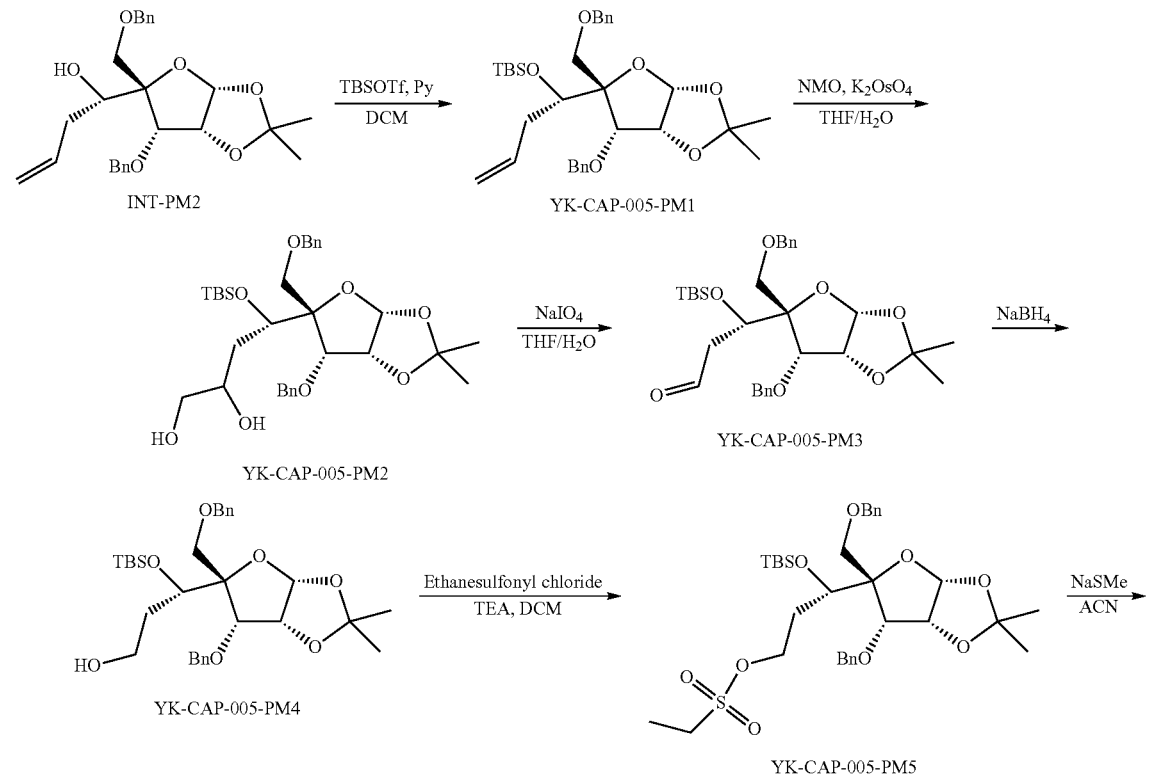

-continued
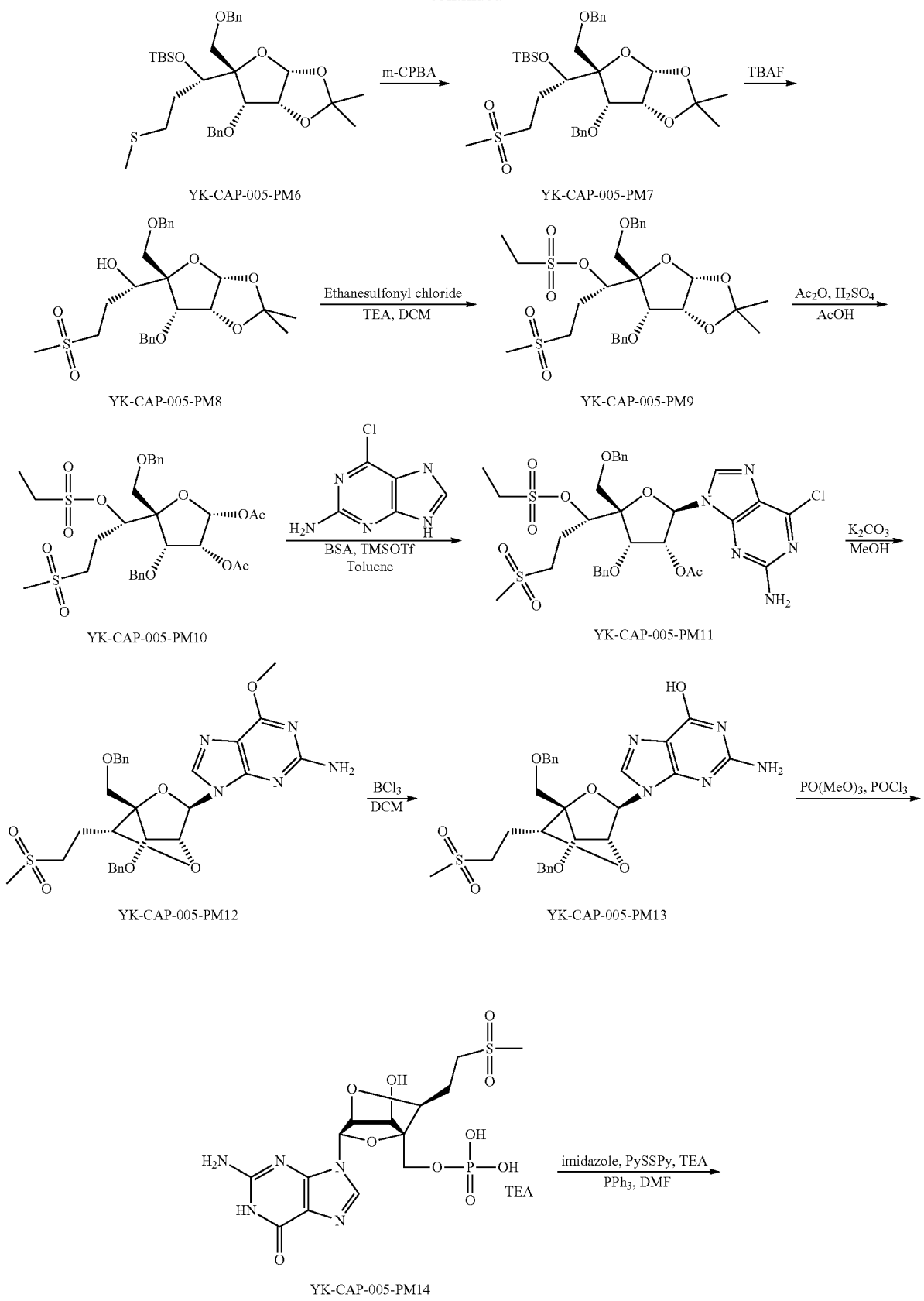

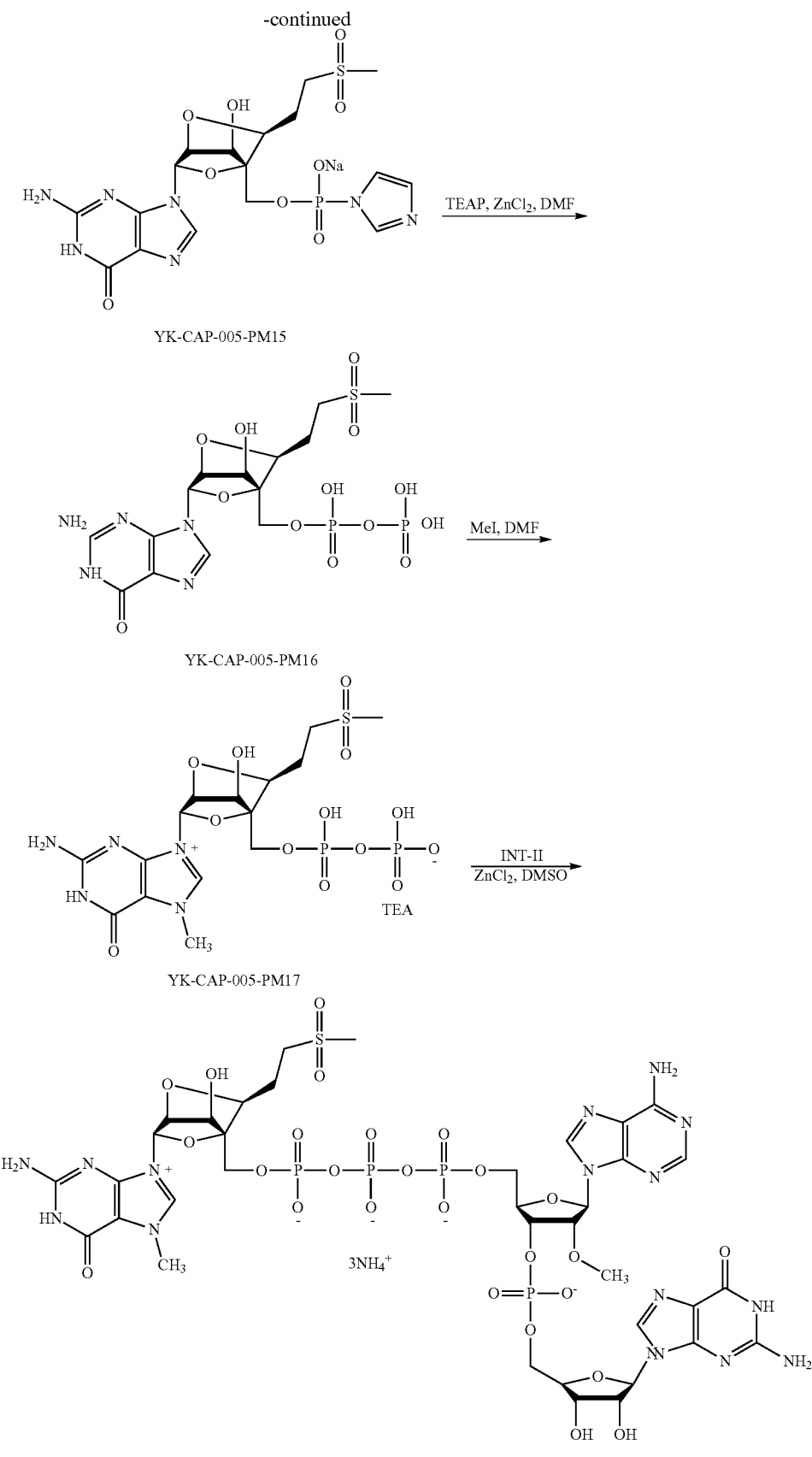

Step 1: Synthesis of YK-CAP-005-PM1

Compound INT-PM2 (44.0 g, 0.10 mol) was dissolved in 450 mL of dichloromethane, and the mixture was cooled to 0° C. with stirring under nitrogen atmosphere. Pyridine (23.9 g, 0.30 mol) was added thereto, and tert-butyldimethylsilyl trifluoromethanesulfonate (40.0 g, 0.15 mol) was added dropwise thereto. After the dropwise addition was completed, the mixture was warmed to room temperature and reacted. TLC monitored that the reaction was complete. The system was directly evaporated to dryness by rotary evaporation under reduced pressure and purified by flash column chromatography to obtain YK-CAP-005-PM1 (47.0 g, 84.72 mmol, yield: 84.82%) as a colorless liquid.

Step 2: Synthesis of YK-CAP-005-PM2

YK-CAP-005-PM1 (47.0 g, 84.72 mmol) was dissolved in a mixed solvent of tetrahydrofuran (470 mL) and water (47 mL), then N-methylmorpholine-N-oxide (14.9 g, 0.13 mol) and potassium osmate (1.3 g, 0.003 mol) were sequentially added thereto, and the mixture was reacted at room temperature for 5 hours. TLC monitored that the reaction was complete. The reaction mixture was slowly poured into 500 mL of saturated sodium sulfite aqueous solution, and the phases were separated. The aqueous phase was extracted with ethyl acetate (300 mL×2). The organic phases were combined, sequentially washed with saturated brine (300 mL), dried over anhydrous sodium sulfate, and evaporated to dryness by rotary evaporation under reduced pressure to obtain crude YK-CAP-005-PM2 (53.2 g, 90.35 mmol) as a light yellow liquid.

Step 3: Synthesis of YK-CAP-005-PM3

Crude YK-CAP-005-PM2 (53.2 g, 90.35 mmol) was dissolved in a mixed solvent of tetrahydrofuran (500 mL) and water (100 mL), then sodium periodate (29.0 g, 0.14 mol) was added thereto, and the mixture was reacted at room temperature for 3 hours. TLC monitored that the reaction was complete. The reaction mixture was slowly poured into 500 mL of saturated sodium sulfite aqueous solution, and the phases were separated. The aqueous phase was extracted with ethyl acetate (400 mL×2). The organic phases were combined, sequentially washed with saturated brine (400 mL), dried over anhydrous sodium sulfate, and evaporated to dryness by rotary evaporation under reduced pressure to obtain YK-CAP-005-PM3 (47.4 g, 85.13 mmol) as a yellow oil.

Step 4: Synthesis of YK-CAP-005-PM4

Compound YK-CAP-005-PM3 (47.4 g, 85.13 mmol) was dissolved in 500 mL of MeOH, and the mixture was cooled to 0° C. with stirring under nitrogen atmosphere. Sodium borohydride (3.86 g, 0.10 mol) was added thereto in batches. After the addition was completed, the mixture was reacted for 3 hours. TLC monitored that the reaction was complete. The reaction system was cooled to 0° C., quenched with saturated ammonium chloride aqueous solution (300 mL), and extracted with ethyl acetate (400 mL×3). The organic phases were combined, sequentially washed with saturated brine (400 mL), dried over anhydrous sodium sulfate, and evaporated to dryness by rotary evaporation under reduced pressure to obtain crude YK-CAP-005-PM4 (49.0 g, 0.088 mol) as a yellow oil.

Step 5: Synthesis of YK-CAP-005-PM5

Crude YK-CAP-005-PM4 (49.0 g, 0.088 mol) was dissolved in 500 mL of dichloromethane, then triethylamine (26.6 g, 0.26 mol) was added thereto, and the mixture was cooled to 0° C. with stirring under nitrogen atmosphere. Ethanesulfonyl chloride (22.5 g, 0.18 mol) was added dropwise thereto. After the dropwise addition was completed, the mixture was warmed to room temperature and reacted for 3 hours until the starting material disappeared. TLC monitored that the reaction was complete. The system was added with 500 mL of saturated sodium bicarbonate aqueous solution, and the phases were separated. The aqueous phase was extracted with dichloromethane (400 mL×2). The organic phase was washed with saturated brine (500 mL), dried over anhydrous sodium sulfate, and evaporated to dryness by rotary evaporation under reduced pressure to obtain crude YK-CAP-005-PM5 (58.0 g, 0.089 mol) as a light yellow oil.

Step 6: Synthesis of YK-CAP-005-PM6

Crude YK-CAP-005-PM5 (58.0 g, 0.089 mol) was dissolved in 400 mL of N,N-dimethylformamide, then sodium thiomethoxide (15.6 g, 0.22 mol) was added thereto, and the mixture was reacted at room temperature for 4 hours to complete the reaction. TLC monitored that the reaction was complete. The reaction mixture was slowly poured into 1500 mL of water, and the system was extracted with ethyl acetate (500 mL×3). The organic phases were combined, sequentially washed with saturated brine (1500 mL), dried over anhydrous sodium sulfate, and evaporated to dryness by rotary evaporation under reduced pressure to obtain YK-CAP-005-PM6 (50.0 g, 0.085 mol) as a brown oil.

Step 7: Synthesis of YK-CAP-005-PM7

YK-CAP-005-PM6 (50.0 g, 0.085 mol) was dissolved in 500 mL of N,N-dimethylformamide, and the mixture was cooled to 0° C. with stirring under nitrogen atmosphere. m-Chloroperoxybenzoic acid (33.7 g, 0.19 mol) was added thereto in batches. After the addition was completed, the mixture was warmed to room temperature and reacted for 3 hours until the starting material disappeared. TLC monitored that the reaction was complete. The reaction mixture was poured into saturated sodium bicarbonate aqueous solution (1500 mL) and extracted with ethyl acetate (500 mL×3). The organic phase was washed with saturated brine (1500 mL), dried over anhydrous sodium sulfate, and evaporated to dryness by rotary evaporation under reduced pressure to obtain YK-CAP-005-PM7 (52.6 g, 84.72 mmol, yield: 99.8%) as a yellow oil.

Step 8: Synthesis of YK-CAP-005-PM8

YK-CAP-005-PM7 (52.6 g, 84.72 mmol) was dissolved in 400 mL of N,N-dimethylformamide, then 1 M tetrabutylammonium fluoride (127 mL, 127 mmol) was added thereto, and the mixture was reacted at room temperature for 1 hour. TLC monitored that the reaction was complete. The system was added with 1000 mL of purified water and 800 mL of ethyl acetate, stirred for 5 minutes, and the phases were separated. The aqueous phase was extracted with ethyl acetate (500 mL×2). The organic phases were combined, sequentially washed with saturated brine (1000 mL), dried over anhydrous sodium sulfate, evaporated to dryness by rotary evaporation under reduced pressure, and purified by flash column chromatography to obtain YK-CAP-005-PM8 (43.2 g) as a yellow oil.

Step 9: Synthesis of YK-CAP-005-PM9

YK-CAP-005-PM8 (18.7 g, 36.91 mmol) was dissolved in 200 mL of dichloromethane, then triethylamine (11.2 g, 0.11 mol) was added thereto, and the mixture was cooled to 0° C. with stirring under nitrogen atmosphere. Ethanesulfonyl chloride (22.5 g, 0.18 mol) was added dropwise thereto. After the dropwise addition was completed, the mixture was warmed to room temperature and reacted for 3 hours. TLC monitored that the reaction was complete. The system was added with 400 mL of saturated sodium bicarbonate aqueous solution, and the phases were separated. The aqueous phase was extracted with dichloromethane (200 mL×2). The organic phase was washed with saturated brine (400 mL), dried over anhydrous sodium sulfate, evaporated to dryness by rotary evaporation under reduced pressure, and purified by flash column chromatography to obtain YK-CAP-005-PM9 (13.4 g, 22.38 mmol, yield: 60.6%) as a light yellow oil.

Step 10: Synthesis of YK-CAP-005-PM10

Compound YK-CAP-005-PM9 (13.4 g, 22.38 mmol) was dissolved in 130 mL of acetic acid, then acetic anhydride (13.7 g, 0.134 mol) was added thereto, and concentrated sulfuric acid (0.27 mL) was added dropwise thereto. After the dropwise addition was completed, the mixture was reacted at room temperature for 2 hours until the starting material disappeared. TLC monitored that the reaction was complete. The system was added with 400 mL of purified water and 400 mL of ethyl acetate, stirred for 5 minutes, and the phases were separated. The aqueous phase was extracted with ethyl acetate (300 mL×2). The organic phases were combined, sequentially added with saturated sodium bicarbonate aqueous solution to adjust the pH to alkalinity, then washed with saturated brine (1.0 L), dried over anhydrous sodium sulfate, and evaporated to dryness by rotary evaporation under reduced pressure to obtain YK-CAP-005-PM10 (13.4 g, 20.85 mmol, yield: 93.18%) as a yellow oil.

Step 11: Synthesis of YK-CAP-005-PM11

2-Amino-6-chloropurine (5.1 g, 30.08 mmol) was dissolved in toluene (100 mL), then N,O-bis(trimethylsilyl)acetamide (12.2 g, 0.06 mol) was added thereto, and the system was heated to 80° C. until clarified. The heating was removed, and the system was cooled to room temperature. A solution of compound YK-CAP-005-PM10 (12.8 g, 19.92 mmol) in toluene (50 mL) was added thereto with stirring, and trimethylsilyl trifluoromethanesulfonate (6.6 g, 0.03 mol) was added dropwise thereto. The system was heated to reflux, and stirred and reacted for 2 hours until the starting material disappeared. TLC monitored that the reaction was complete. The system was cooled to room temperature, quenched with saturated sodium bicarbonate solution (300 mL), then added with ethyl acetate (300 mL), and filtered through diatomite. The phases were separated, and the aqueous phase was extracted with ethyl acetate (200 mL×2). The organic phases were combined, sequentially washed with saturated brine (300 mL×1), dried over anhydrous sodium sulfate, and evaporated to dryness by rotary evaporation to obtain YK-CAP-005-PM11 (15.5 g, 20.60 mmol) as a yellow viscous substance.

Step 12: Synthesis of YK-CAP-005-PM12

Compound YK-CAP-005-PM11 (15.5 g, 20.60 mmol) was dissolved in 200 mL of anhydrous methanol, then anhydrous potassium carbonate (14.2 g, 0.10 mol) was added thereto, and the mixture was reacted at room temperature. TLC monitored that the reaction was complete. After the reaction was completed, the system was directly evaporated to dryness by rotary evaporation under reduced pressure and purified by flash column chromatography to obtain YK-CAP-005-PM12 (11.8 g, 19.81 mmol) as a yellow solid. $C_{29}H_{33}N_5O_7S$, MS (ES): m/z (M+H$^+$) 596.38.

Step 13: Synthesis of YK-CAP-005-PM13

Compound YK-CAP-005-PM12 (11.8 g, 19.81 mmol) was dissolved in 200 mL of dichloromethane, and the mixture was cooled to −40° C. under nitrogen atmosphere. A 1 M solution of boron trichloride in dichloromethane (167 mL) was added dropwise thereto. After the dropwise addition was completed, the system was warmed to 0° C. and reacted. LC-MS monitored that the reaction was complete. After the reaction was completed, the system was cooled to −40° C., and the reaction was quenched by dropwise addition of methanol (200 mL). The system was directly evaporated to dryness by rotary evaporation under reduced pressure, added with a 4 M solution of hydrochloric acid in 1,4-dioxane (120 mL), heated to 60° C., and reacted until complete. After the reaction was completed, the system was evaporated to dryness by rotary evaporation under reduced pressure, dissolved in methanol (40 mL), followed by dropwise addition of 800 mL of dichloromethane, and the precipitated solid was subjected to suction filtration and dried to obtain YK-CAP-005-PM13 (7.0 g, 17.44 mmol, yield: 88.1%) as a yellow solid. $C_{14}H_{19}N_5O_7S$, MS (ES): m/z (M+H$^+$) 402.18.

$^1$H NMR (400 MHz, DMSO-d$_6$) δ 10.93 (s, 1H), 8.15 (s, 1H), 6.79 (s, 1H), 5.71 (s, 1H), 4.28 (s, 2H), 4.16 (dd, J=9.0, 4.2 Hz, 1H), 3.75 (d, J=2.3 Hz, 2H), 3.36-3.14 (m, 2H), 3.02 (s, 3H), 2.11-1.85 (m, 2H).

Step 14: Synthesis of Intermediate YK-CAP-005-PM14

According to the synthesis route of YK-CAP-001-PM5, YK-CAP-005-PM13 (3.4 g, 8.47 mmol) was used as starting material to obtain YK-CAP-005-PM14 triethylamine salt (639.8 mg, 1.10 mmol, yield: 13.0%). $C_{14}H_{20}N_5O_{10}PS$, MS (ES): m/z (M−H$^-$) 480.07.

Step 15: Synthesis of Intermediate YK-CAP-005-PM15

According to the synthesis route of YK-CAP-001-PM6, YK-CAP-005-PM14 triethylamine salt (639.8 mg, 1.10 mmol) was used as starting material to obtain YK-CAP-005-PM15 (333.4 mg, 0.60 mmol, yield: 54.9%). $C_{17}H_{22}N_7O_9PS$, MS (ES): m/z (M−H$^-$) 530.08.

Step 16: Synthesis of Intermediate YK-CAP-005-PM16

According to the synthesis route of YK-CAP-001-PM7, YK-CAP-005-PM15 (333.4 mg, 0.60 mmol) was used as starting material to obtain YK-CAP-005-PM16 (528 mg, 0.80 mmol). $C_{14}H_{21}N_5O_{13}P_2S$, MS (ES): m/z (M−H$^-$) 560.03.

Step 17: Synthesis of Intermediate YK-CAP-005-PM17

According to the synthesis route of YK-CAP-001-PM8, YK-CAP-005-PM16 (528 mg, 0.80 mmol) was used as starting material to obtain YK-CAP-005-PM17 (74.7 mg, 0.11 mmol). $C_{15}H_{23}N_5O_{13}P_2S$, MS (ES): m/z (M−H$^-$) 574.05.

Step 18: Synthesis of YK-CAP-005

According to the synthesis route of YK-CAP-001, YK-CAP-005-PM17 (74.7 mg, 0.11 mmol) was used as starting material to obtain YK-CAP-005 (19.3 mg, 14.7 mol, 13.3%). $C_{36}H_{49}N_{15}O_{26}P_4S$, MS (ES): m/z (M−H$^-$) 1262.14.

$^1$H NMR (400 MHz, D$_2$O) δ 8.33 (s, 1H), 7.98 (s, 1H), 7.87 (s, 1H), 5.88 (d, J=6.1 Hz, 1H), 5.77 (d, J=6.3 Hz, 1H), 5.57 (s, 1H), 4.86-4.84 (m, 1H), 4.48-4.41 (m, 4H), 4.35-4.32 (m, 2H), 4.25-4.23 (m, 5H), 4.11-4.09 (m, 3H), 4.06-4.03 (m, 1H), 3.96 (s, 3H), 3.36-3.14 (m, 2H), 3.07 (s, 3H), 2.87 (s, 3H), 2.11-1.84 (m, 2H); $^{31}$P NMR (D$_2$O, 162 MHz) δ −0.94 (s, 1P), −11.13 (d, J=19.2 Hz, 1P), −11.64 (d, J=18.5 Hz, 1P), −22.95 (t, J=18.0 Hz, 1P).

8. Synthesis of YK-CAP-006
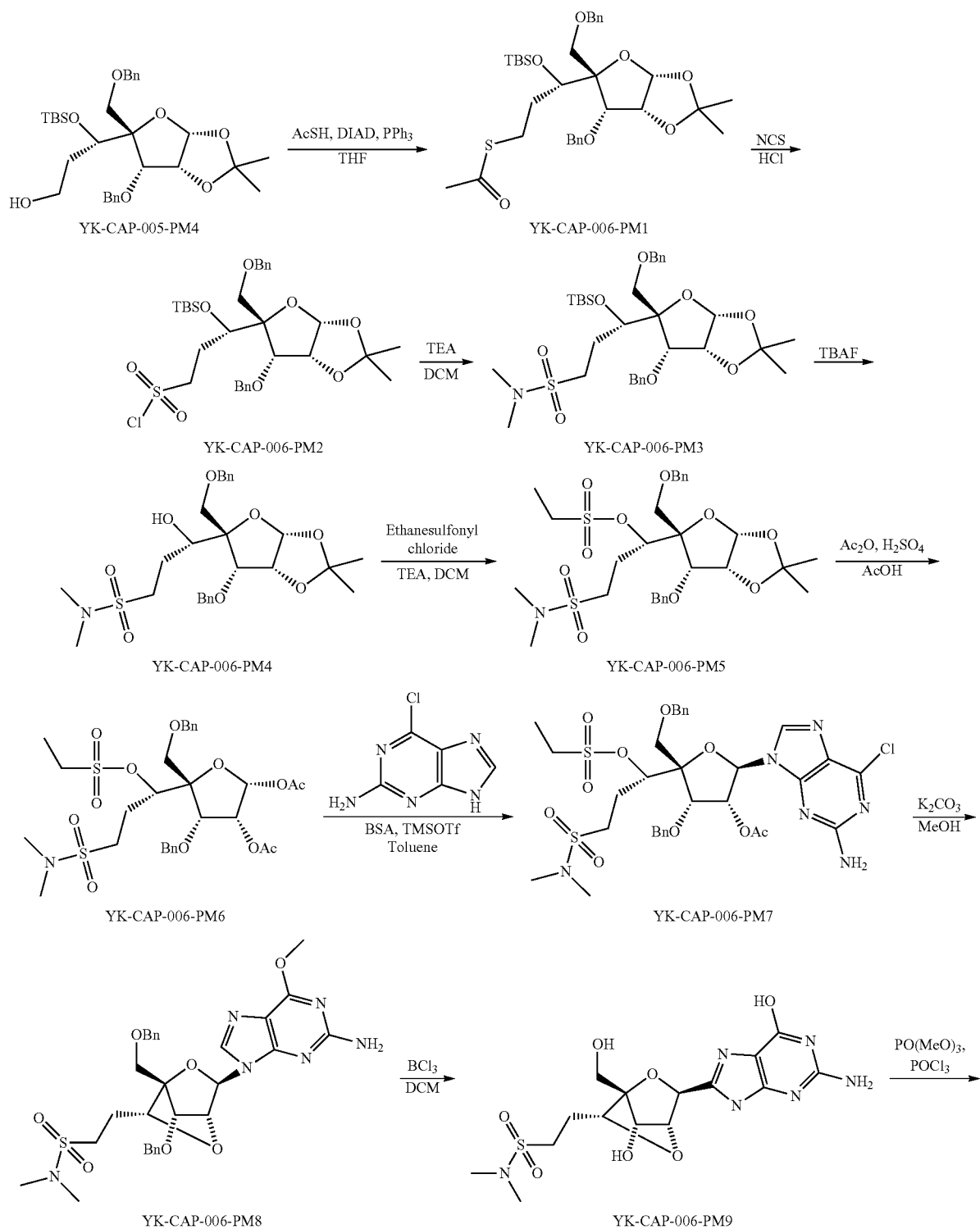

-continued

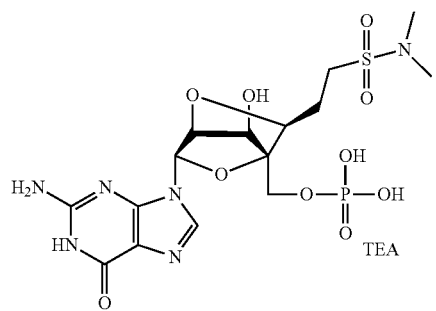
YK-CAP-006-PM10

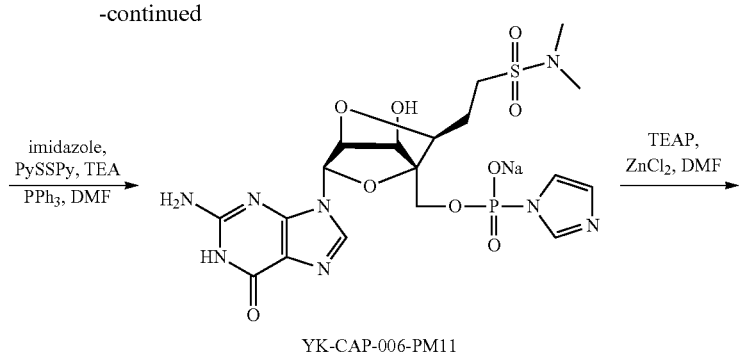
YK-CAP-006-PM11

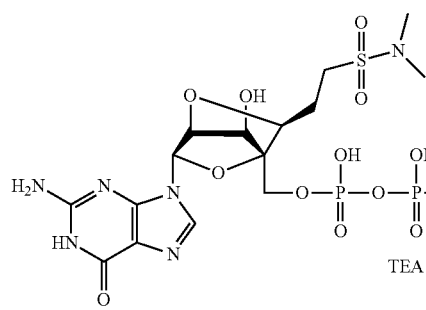
YK-CAP-006-PM12

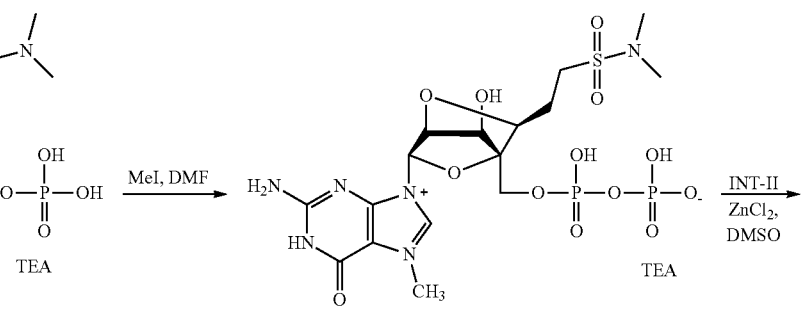
YK-CAP-006-PM13

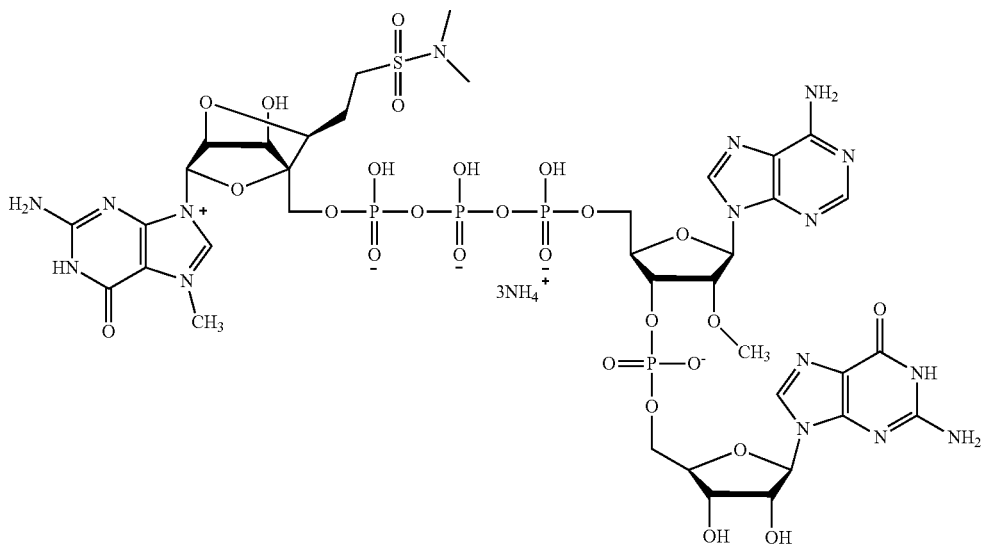
YK-CAP-006

Step 1: Synthesis of YK-CAP-006-PM1

Triphenylphosphine (11.27 g, 42.98 mmol) was dissolved in 150 mL of tetrahydrofuran, and the reaction system was cooled to 0° C. Diisopropyl azodicarboxylate (14.48 g, 71.64 mmol) was added thereto, and the mixture was stirred for 10 minutes. A solution of compound YK-CAP-005-PM4 (20.0 g, 35.79 mmol) in tetrahydrofuran was added thereto, and thioacetic acid (5.45 g, 71.64 mmol) was slowly added dropwise thereto. After the dropwise addition was completed, the mixture was slowly returned to room temperature, and stirred and reacted for 16 hours. TLC monitored that the reaction was complete. After the reaction was completed, the reaction was quenched with water, and the aqueous phase was extracted with ethyl acetate (200 mL×2). The organic phases were combined, washed with saturated sodium chloride, dried over anhydrous sodium sulfate, filtered, and evaporated to dryness by rotary evaporation. The residue was purified by flash column chromatography to obtain YK-CAP-006-PM1 (14.4 g, 23.34 mmol, yield: 65.2%) as a colorless oily liquid.

Step 2: Synthesis of YK-CAP-006-PM2

Compound N-chlorosuccinimide (12.48 g, 93.48 mmol) was dissolved in acetonitrile (100 mL) and 2 N hydrochloric acid aqueous solution (20 mL), then a solution of compound YK-CAP-006-PM1 (14.4 g, 23.34 mmol) in acetonitrile was slowly added dropwise thereto, and the mixture was reacted for 10 minutes. LCMS monitored that the reaction was complete. The reaction system was quenched with 30 mL of water, and the aqueous phase was extracted with ethyl acetate (100 mL×2). The organic phases were combined, washed with saturated sodium chloride, dried over anhydrous sodium sulfate, filtered, and evaporated to dryness by rotary evaporation to obtain YK-CAP-006-PM2 (13.4 g, 20.90 mmol, yield: 89.5%) as a colorless oily liquid.

Step 3: Synthesis of YK-CAP-006-PM3

Dimethylamine hydrochloride (2.05 g, 25.12 mmol) was weighed and dissolved in 100 mL of dichloromethane, and triethylamine (6.35 g, 62.79 mmol) was weighed and added thereto. The reaction system was cooled to 0° C., and a solution of compound YK-CAP-006-PM2 (13.40 g, 20.90 mmol) in dichloromethane was slowly added dropwise thereto. After the dropwise addition was completed, the system was reacted at 0° C. for 30 minutes. LCMS monitored that the reaction was complete. The system was directly evaporated to dryness by rotary evaporation under reduced pressure. The residue was dissolved in a small amount of dichloromethane and purified by flash column chromatography to obtain YK-CAP-006-PM3 (6.0 g, 9.23 mmol, yield: 44.2%) as a colorless liquid.

Step 4: Synthesis of YK-CAP-006-PM4

Compound YK-CAP-006-PM3 (6.0 g, 9.23 mmol) was dissolved in 400 mL of tetrahydrofuran, then tetrabutylammonium fluoride/tetrahydrofuran (11.09 mL, 11.09 mmol) was slowly added thereto, and the mixture was reacted at room temperature for 1 hour. TLC monitored that the reaction was complete. The reaction mixture was slowly poured into 100 mL of saturated sodium bicarbonate aqueous solution, and the phases were separated. The aqueous phase was extracted with ethyl acetate (100 mL×2). The organic phases were combined, sequentially washed with saturated brine (50 mL), dried over anhydrous sodium sulfate, evaporated to dryness by rotary evaporation under reduced pressure, and purified by flash column chromatography to obtain YK-CAP-006-PM4 (4.0 g, 7.47 mmol, yield: 80.8%) as a colorless liquid.

Step 5: Synthesis of YK-CAP-006-PM5

Compound YK-CAP-006-PM4 (4.0 g, 7.47 mmol) was dissolved in 200 mL of dichloromethane solution, and triethylamine (2.27 g, 22.41 mmol) was added thereto. The reaction system was cooled to 0° C., and a solution of ethanesulfonyl chloride (1.15 g, 8.96 mmol) in dichloromethane was slowly added dropwise thereto. After the dropwise addition was completed, the reaction system was reacted at 0° C. for 2 hours. TLC monitored that the reaction was complete. The reaction mixture was quenched by slowly pouring into 50 mL of saturated sodium bicarbonate aqueous solution, followed by addition of ethyl acetate for phase separation, and extracted with ethyl acetate (150 mL×2). The organic phases were combined, sequentially washed with saturated brine (500 mL), dried over anhydrous sodium sulfate, evaporated to dryness by rotary evaporation under reduced pressure, and purified by flash column chromatography to obtain YK-CAP-006-PM5 (4.4 g, 7.01 mmol, yield: 93.9%) as a colorless liquid.

Step 6: Synthesis of YK-CAP-006-PM6

Compound YK-CAP-006-PM5 (4.4 g, 7.01 mmol) was dissolved in 30 mL of acetic acid, and acetic anhydride (4.3 g, 42.12 mmol) was added thereto. Concentrated sulfuric acid (44 µL) was slowly added dropwise thereto with stirring at room temperature, and the mixture was stirred at room temperature for 1 hour. TLC monitored that the reaction was complete. The reaction mixture was slowly added dropwise to 500 mL of saturated sodium bicarbonate aqueous solution to adjust the pH to neutrality, and extracted with ethyl acetate (300 mL×3). The organic phases were combined, washed with 50 mL of saturated brine, dried over anhydrous sodium sulfate, filtered, and evaporated to dryness by rotary evaporation under reduced pressure to obtain YK-CAP-006-PM6 (3.1 g, 4.61 mmol, yield: 65.8%) as a colorless oil.

Step 7: Synthesis of YK-CAP-006-PM7

2-Amino-6-chloroguanine (862.6 mg, 5.08 mmol) was dissolved in 30 mL of toluene, and N, O-bis(trimethylsilyl)acetamide (2.07 g, 10.16 mmol) was weighed and added thereto. The reaction system was heated to 80° C. under nitrogen atmosphere and stirred until clarified. The heating was stopped, and the system was returned to room temperature. A solution of compound YK-CAP-006-PM6 (3.1 g, 4.61 mmol) in toluene was slowly added thereto, and trimethylsilyl trifluoromethanesulfonate (1.13 g, 5.08 mmol) was added thereto. The system was immediately heated to 110° C. and reacted for 2 hours. LCMS monitored that the reaction was complete. The reaction system was added with water (15 mL) and ethyl acetate (20 mL) to precipitate a solid, filtered through diatomite, and the mixture was extracted with ethyl acetate (80 mL×2). The organic phase was washed with saturated brine (20 mL), dried over anhydrous sodium sulfate, evaporated to dryness by rotary evaporation under reduced pressure, and purified by flash column chromatography to obtain YK-CAP-006-PM7 (3.0 g, 3.84 mmol, yield: 83.1%) as a colorless oil.

Step 8: Synthesis of YK-CAP-006-PM8

Compound YK-CAP-006-PM7 (3.0 g, 3.84 mmol) was dissolved in 20 mL of methanol, then potassium carbonate (15.6 g, 23.10 mmol) was added thereto, and the mixture was reacted at room temperature for 24 hours. LCMS monitored that the reaction was complete. After filtration, the filtrate was mixed with the sample and purified by flash column chromatography to obtain YK-CAP-006-PM8 (2.1 g, 3.36 mmol, yield: 87.5%) as a colorless oil.

Step 9: Synthesis of YK-CAP-006-PM9

YK-CAP-006-PM8 (2.1 g, 3.36 mmol) was dissolved in 25 mL of dichloromethane, and the mixture was cooled to 0° C. with stirring under nitrogen atmosphere. Boron trichloride (3.94 g, 33.60 mmol) was slowly added dropwise thereto. After the addition was completed, the mixture was reacted at 0° C. for 6 hours. LCMS monitored that the starting material disappeared. The reaction mixture was cooled to −40° C. and quenched with methanol. The reaction mixture was evaporated to dryness by rotary evaporation to obtain the target compound as monitored by LCMS. The product was dissolved in 20 mL of methanol and slowly added dropwise to 150 mL of dichloromethane with stirring. A white solid was precipitated to obtain 1.7 g of crude product. The crude product was subjected to preparative high-pressure liquid chromatography to obtain YK-CAP-006-PM9 (1.012 g, 2.35 mmol, yield: 69.94%) as a white solid.

$^1$H NMR (400 MHz, DMSO) δ 10.70 (s, 1H), 7.89 (s, 1H), 6.63 (s, 2H), 5.68 (s, 1H), 4.29 (d, J=18.9 Hz, 2H), 4.17 (dd, J=9.4, 3.5 Hz, 1H), 3.77 (d, J=13.2 Hz, 3H), 3.30-3.03 (m, 2H), 2.81 (s, 6H), 2.12-1.85 (m, 2H).

Step 10: Synthesis of YK-CAP-006-PM10

According to the synthesis route of YK-CAP-001-PM5, YK-CAP-006-PM9 (1.01 g, 2.35 mmol) was used as starting material to obtain YK-CAP-006-PM10 triethylamine salt (1.05 g, 1.72 mmol, yield: 73.2%). $C_{15}H_{23}N_6O_{10}PS$, MS (ES): m/z (M−H$^-$) 509.09.

Step 11: Synthesis of YK-CAP-006-PM11

According to the synthesis route of YK-CAP-001-PM6, YK-CAP-006-PM10 triethylamine salt (1.05 g, 1.72 mmol) was used as starting material to obtain YK-CAP-006-PM11 (809.2 mg, 1.39 mmol, yield: 80.9%). $C_{18}H_{25}N_8O_9PS$, MS (ES): m/z (M−H$^-$) 559.10.

Step 12: Synthesis of YK-CAP-006-PM12

According to the synthesis route of YK-CAP-001-PM7, YK-CAP-006-PM11 (809.2 mg, 1.39 mmol) was used as starting material to obtain YK-CAP-006-PM12 triethylamine salt (475.5 mg, 0.69 mmol, yield: 49.5%). $C_{15}H_{24}N_6O_{13}P_2S$, MS (ES): m/z (M–H⁻) 589.06.

Step 13: Synthesis of YK-CAP-006-PM13

According to the synthesis route of YK-CAP-001-PM8, YK-CAP-006-PM12 triethylamine salt (475.5 mg, 0.69 mmol) was used as starting material to obtain YK-CAP-006-PM13 triethylamine salt (235 mg, 0.33 mmol, yield: 48.4%). $C_{16}H_{26}N_6O_{13}P_2S$, MS (ES): m/z (M–H⁻) 603.08.

Step 14: Synthesis of YK-CAP-006

According to the synthesis route of YK-CAP-001, YK-CAP-006-PM13 (235 mg, 0.33 mmol) was used as starting material to obtain YK-CAP-006 (32.0 mg, 23.8 mol, yield: 7.1%). $C_{37}H_{52}N_{16}O_{26}P_4S$, MS (ES): m/z (M–H⁻) 1291.17.

$^1$H NMR (400 MHz, $D_2O$) δ 8.33 (s, 1H), 7.97 (s, 1H), 7.90 (s, 1H), 5.89 (d, J=6.1 Hz, 1H), 5.79 (d, J=6.3 Hz, 1H), 5.59 (s, 1H), 4.90-4.84 (m, 1H), 4.47-4.43 (m, 4H), 4.35-4.33 (m, 2H), 4.29-4.26 (m, 4H), 4.14-4.08 (m, 4H), 3.98-3.95 (m, 1H), 3.93 (s, 3H), 3.36 (s, 3H), 3.33-3.00 (m, 2H), 2.83 (s, 6H), 2.00-1.93 (m, 2H); $^{31}$P NMR ($D_2O$, 202 MHz) δ −0.91 (s, 1P), −11.47 (m, 2P), −22.80 (t, J=17.8 Hz, 1P).

Example 2: In Vitro Transcription Yield of mRNA and Capping Rate

Compounds YK-CAP-001 to 006 of the present disclosure have chemical structures that are very similar. This series of compounds has some similarities and some significant differences in structure compared to the mRNA cap analogs disclosed in the prior art.

The locked nucleoside-modified cap analogs of the present disclosure show a significant difference in the in vitro transcription yield of mRNA and capping rate. For example, the transcription yield of YK-CAP-004 is 82.8% higher than that of YK-CAP-001, and the capping rate of YK-CAP-004 is 26.1% higher than that of YK-CAP-002. Compared to the locked nucleoside-modified cap analogs in the prior art, the locked nucleoside-modified cap analogs of the present disclosure show a significant increase in both in vitro transcription yield of mRNA and capping rate. For example, the transcription yield and capping rate of YK-CAP-004 are 35.0% and 18.8% higher than those of compound 14, respectively.

I. Structural Differences in Cap Analogs

TABLE 1

Structures of cap analogs

| Name | Structure | Remark |
|------|-----------|--------|
| YK-CAP-001 | 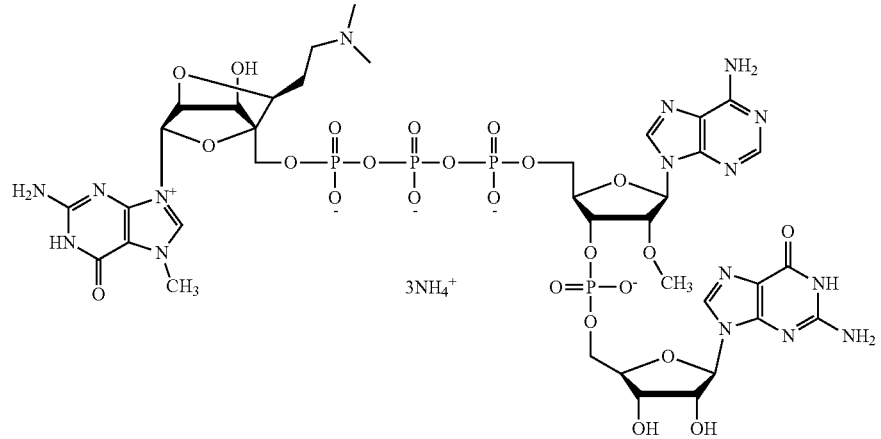 | Structure designed in the present disclosure, synthesized in Example 1 |
| YK-CAP-002 | 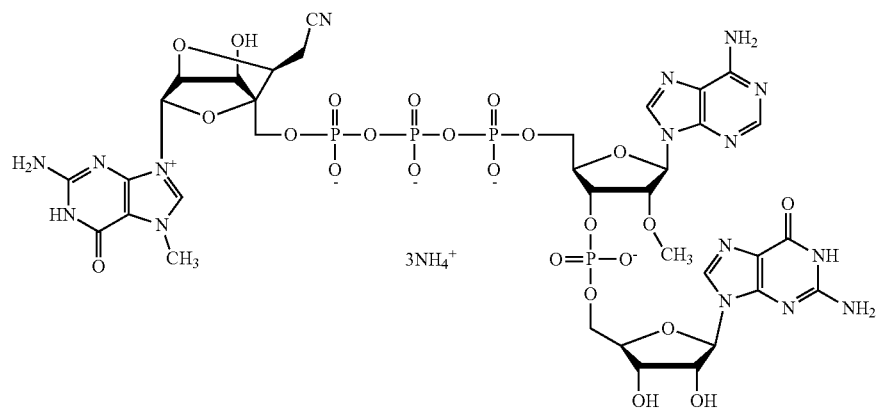 | Structure designed in the present disclosure, synthesized in Example 1 |

TABLE 1-continued
Structures of cap analogs
| Name | Structure | Remark |
|---|---|---|
| YK-CAP-003 | 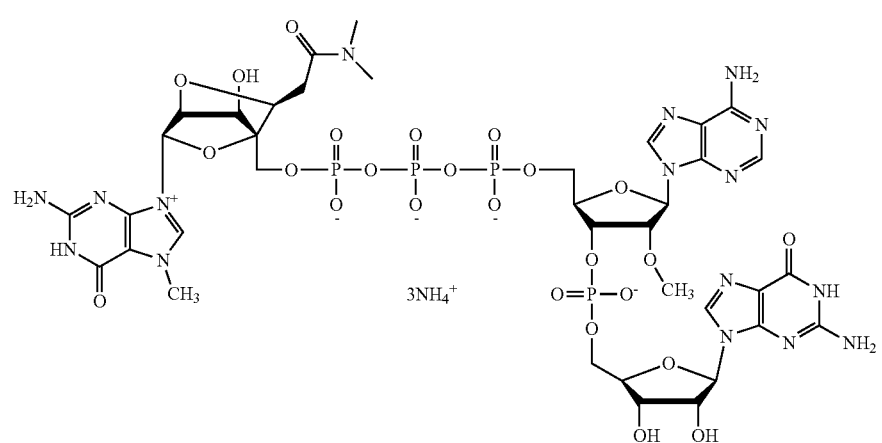 | Structure designed in the present disclosure, synthesized in Example 1 |
| YK-CAP-004 | 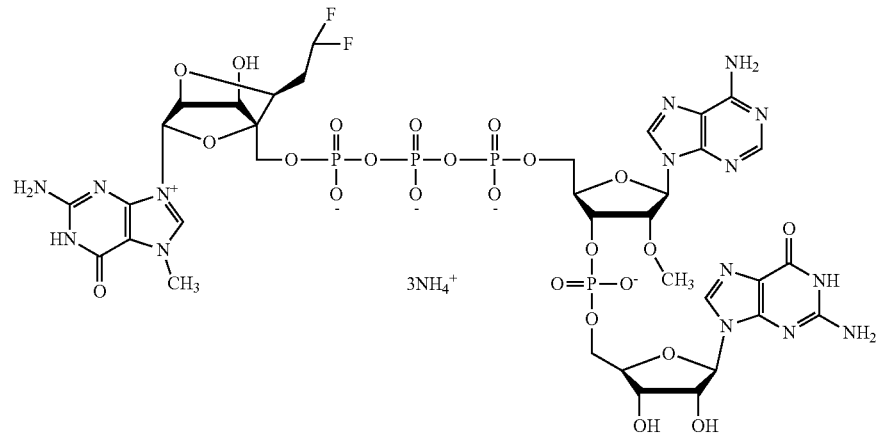 | Structure designed in the present disclosure, synthesized in Example 1 |
| YK-CAP-005 | 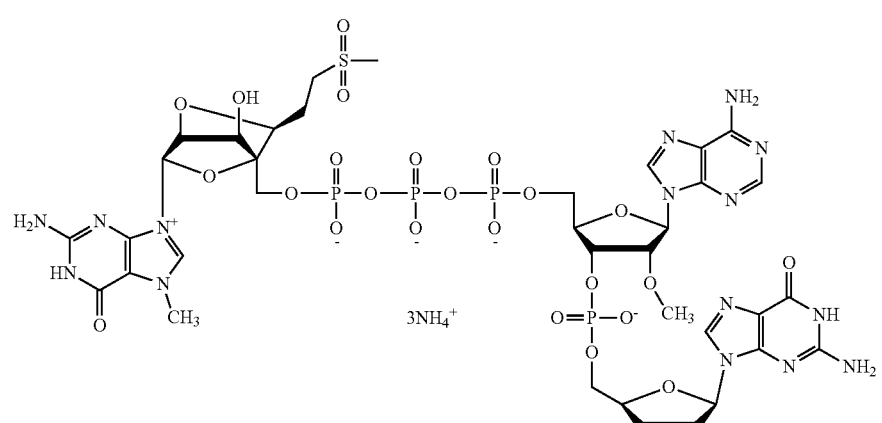 | Structure designed in the present disclosure, synthesized in Example 1 |

TABLE 1-continued

Structures of cap analogs

| Name | Structure | Remark |
| --- | --- | --- |
| YK-CAP-006 | | Structure designed in the present disclosure, synthesized in Example 1 |
| N-7413 | | Purchased from Jiangsu Synthgene Biotechnology Co., Ltd., compound in FIG. 10E on page 46 of CN108366604A |
| Compound 14 | | Purchased from Jiangsu Synthgene Biotechnology Co., Ltd., compound 14 on page 90 of CN115803333A |

TABLE 1-continued

Structures of cap analogs

| Name | Structure | Remark |
|---|---|---|
| HN3002 | 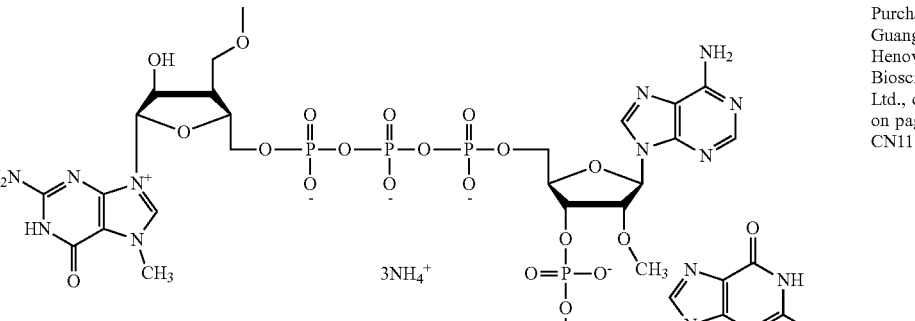 | Purchased from Guangzhou Henovcom Bioscience Co., Ltd., compound 3 on page 9 of CN115260264B |
| m6A | 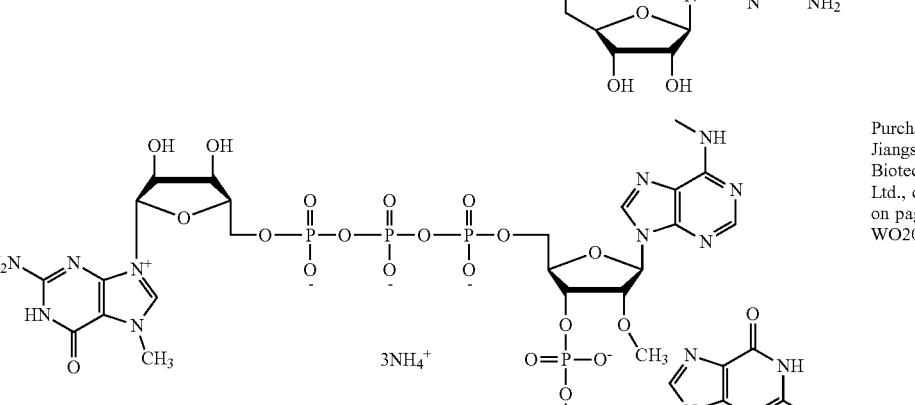 | Purchased from Jiangsu Synthgene Biotechnology Co., Ltd., compound 31 on page 21 of WO2023/147352A1 |

As can be seen from Table 1, compounds YK-CAP-001 to 006 of the present disclosure have chemical structures that are very similar. This series of compounds has some similarities and some significant differences in structure compared to the mRNA cap analogs disclosed in the prior art as shown below:

1. Compounds YK-CAP-001, YK-CAP-002, YK-CAP-003, YK-CAP-004, YK-CAP-005, and YK-CAP-006 of the present disclosure are very similar in structure, differing only in the group attached to the methylene bridge connecting the 2'-O and C4' positions of the ribose ring, i.e., the substituent at the C6' position is different. Specifically, the C6' substituent of YK-CAP-001 is dimethylaminoethyl, the C6' substituent of YK-CAP-002 is cyanomethyl, the C6' substituent of YK-CAP-003 is dimethylaminocarbonylmethyl, the C6' substituent of YK-CAP-004 is 2,2-difluoroethyl, the C6' substituent of YK-CAP-005 is methylsulfonyl ethyl, and the C6' substituent of YK-CAP-006 is dimethyl aminosulfonyl ethyl. The other structures are exactly identical.

2. Compounds YK-CAP-001 to 006 of the present disclosure are similar in structure to compound 14, except that there is no substituent on the methylene bridge connecting the 2'-O and C4' positions of the ribose ring of compound 14, i.e., there is no substituent at the C6' position.

3. Compounds YK-CAP-001 to 006 of the present disclosure differ greatly in structure from N-7413, HN3002, and m6A, specifically, there is no methylene bridge between the 2'-O and C4' positions of the ribose ring of these three compounds, and the second base of m6A, adenine, is methylated.

II. Measurement of In Vitro Transcription Yield of mRNA and Capping Rate

1. Experimental Methods (1) Capping synthesis using cap analogs

The plasmid was first linearized with plasmid linearizing enzyme, and then the linearized plasmid was purified.

(2) In vitro transcription and synthesis of mRNA

YK-CAP-001 to 006 and compound 14 in Table 1 were respectively used as cap analogs. The reaction system is shown in Table 2:

TABLE 2

| In vitro transcription reaction system | |
|---|---|
| System | Amount |
| T7 RNA polymerase | 50 U |
| 10X buffer | 2 µL |
| 100 mM ATP | 1 µL |
| 100 mM GTP | 1 µL |
| 100 mM CTP | 1 µL |
| 100 mM UTP | 1 µL |

TABLE 2-continued

In vitro transcription reaction system

| System | Amount |
|---|---|
| 100 mM cap analog | 1 μL |
| Nuclease inhibitor | 20 U |
| Inorganic pyrophosphatase | 0.05 U |
| Sterile enzyme-free water | Supplemented to 20 μL |
| DNA template | 1 μg |

During the experiment, the volume of materials required for the system was first calculated, and then sample addition was conducted. The system was first added with sterile enzyme-free water, followed by the sequential addition of 10× buffer, NTPs, and cap analogs, mixed well, and gently centrifuged. Nuclease inhibitors, inorganic pyrophosphatase, T7 RNA polymerase, and linearized DNA templates were then added thereto. The system was mixed well, gently centrifuged, and incubated at 37° C. After 2 hours of incubation, the system was added with 1 U of DNase I and incubated at 37° C. for another 30 minutes. The mRNA precipitate was then washed with 75% ethanol, and after the ethanol was briefly evaporated to dryness, the mRNA was redissolved in sterile enzyme-free water.

(3) The transcription product was purified, and the in vitro transcription yield of mRNA was recorded.

(4) The obtained mRNA was subjected to an annealing reaction with a probe.

The annealing reaction was performed in a PCR instrument: 95° C. for 5 minutes; 65° C. for 2 minutes; 55° C. for 2 minutes; 40° C. for 2 minutes; 22° C. for 2 minutes.

(5) Magnetic bead pretreatment and probe binding: 100 μL of magnetic beads was placed on a magnetic frame for pretreatment. The magnetic bead solution was added with 120 μL of sample and incubated at room temperature for 30 minutes with slow mixing.

(6) mRNA splicing and obtaining the 5' single-strand sequence bound to the probe The mixture was added with 20 μL of RNase H (5 U/μL) and incubated at 37° C. for 3 hours with mixing every half hour. After incubation, the magnetic beads were washed and then added with 100 μL of 75% methanol heated to 80° C. The mixture was heated to 80° C. on a heating plate, held for 3 minutes, then placed on a magnetic frame to aspirate the supernatant, and dried at room temperature for 45 minutes to a volume of 10 μL using a centrifugal evaporator. The sample was then resuspended in 50 μL of 100 μM EDTA/1% MeOH and ready for LC-MS analysis to determine the capping of RNA in the transcription reaction. Since there is a significant difference in molecular weight between capped and uncapped bases, the capping rate of mRNA transcription initiated by different cap analogs can be determined based on the difference in molecular mass.

2. Experimental Results

The measurement results of the in vitro transcription yield of mRNA and capping rate show that the locked nucleoside-modified cap analogs of the present disclosure have a significant difference in the in vitro transcription yield of mRNA and capping rate. For example, the transcription yield of YK-CAP-004 is 82.8% higher than that of YK-CAP-001, and the capping rate of YK-CAP-004 is 26.1% higher than that of YK-CAP-002. Compared to the locked nucleoside-modified cap analogs in the prior art, the locked nucleoside-modified cap analogs of the present disclosure show a significant increase in both in vitro transcription yield of mRNA and capping rate. For example, the transcription yield and capping rate of YK-CAP-004 are 35.0% and 18.8% higher than those of compound 14, respectively.

The specific in vitro transcription yield of mRNA and capping rate are shown in Table 3.

TABLE 3

In vitro transcription yield of mRNA and capping rate

| Name | Yield per unit template (μg) | Capping rate (%) |
|---|---|---|
| YK-CAP-001 | 89.3 | 73.1 |
| YK-CAP-002 | 103.1 | 70.2 |
| YK-CAP-003 | 151.0 | 94.8 |
| YK-CAP-004 | 163.2 | 96.3 |
| YK-CAP-005 | 152.6 | 95.2 |
| YK-CAP-006 | 153.1 | 95.1 |
| Compound 14 | 120.9 | 77.5 |

1) The locked nucleoside-modified cap analogs of the present disclosure show a significant difference in the in vitro transcription yield of mRNA and capping rate. YK-CAP-004 has the highest transcription yield and capping rate, with the transcription yield being 82.8% higher than that of YK-CAP-001 (the lowest) and the capping rate being 26.1% higher than that of YK-CAP-002 (the lowest).

As can be seen from Table 3, all the locked nucleoside-modified cap analogs of the present disclosure are capable of transcribing mRNA. There is a significant difference in the mRNA transcription activity among different locked nucleoside-modified cap analogs. YK-CAP-004 has the highest in vitro transcription yield of mRNA, which is 163.2 μg. YK-CAP-003, YK-CAP-005, and YK-CAP-006 also have a very high yield, all exceeding 150 g, with a yield of 151.0 μg, 152.6 μg, and 153.1 μg, respectively.

YK-CAP-001 has the lowest in vitro transcription yield of mRNA, which is only 89.3 g. YK-CAP-002 also has a very low yield of 103.1 μg. The transcription yield of YK-CAP-004 is 82.8% higher than that of YK-CAP-001 and 58.3% higher than that of YK-CAP-002, respectively, showing a significant increase (as shown in FIG. 1). YK-CAP-004 has the highest capping rate, which is 96.3%. YK-CAP-003, YK-CAP-005, and YK-CAP-006 also have a very high capping rate, all exceeding 90%, with a capping rate of 94.8%, 95.2%, and 95.1%, respectively.

Figure 2:
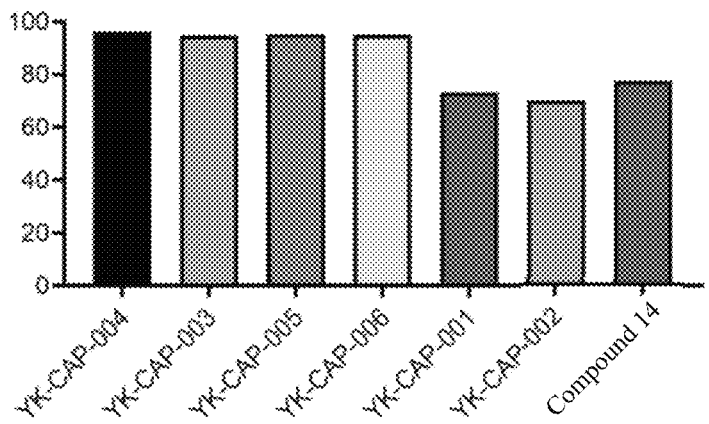
FIG. 2 shows the capping rate for the locked nucleoside-modified cap analogs YK-CAP-004, YK-CAP-003, YK-CAP-005, YK-CAP-006, YK-CAP-001, YK-CAP-002, and compound 14.

YK-CAP-002 has the lowest capping rate, which is only 70.2%. YK-CAP-001 also has a very low capping rate of 73.1%. The capping rate of YK-CAP-004 is 26.1% higher than that of YK-CAP-002 and 23.2% higher than that of YK-CAP-001, respectively, showing a significant increase (as shown in FIG. 2). 2) Compared to the locked nucleoside-modified cap analogs in the prior art, the locked nucleoside-modified cap analogs of the present disclosure show a significant increase in both in vitro transcription yield of mRNA and capping rate. For example, the transcription yield and capping rate of YK-CAP-004 are 35.0% and 18.8% higher than those of compound 14, respectively.

Compound 14 has an in vitro transcription yield of mRNA of 120.9 μg. The transcription yield of YK-CAP-004, YK-CAP-003, YK-CAP-005, and YK-CAP-006 in the present disclosure is 35.0%, 24.9%, 26.2%, and 26.6% higher than that of compound 14, respectively, showing a significant increase.

Compound 14 has a capping rate of 77.5%. The capping rate of YK-CAP-004, YK-CAP-003, YK-CAP-005, and YK-CAP-006 is 18.8%, 17.3%, 17.7%, and 17.6% higher than that of compound 14, respectively, showing a significant increase.

3) The locked nucleoside-modified cap analogs with similar structures vary greatly in the in vitro transcription yield of mRNA and capping rate.

The locked nucleoside-modified cap analogs designed in the present disclosure have structures that are very similar. This series of compounds is also very similar in structure to compound 14, but they vary greatly in the in vitro transcription yield of mRNA and capping rate.

For example, YK-CAP-004 differs from YK-CAP-001, YK-CAP-002, and compound 14 only in the group attached to the methylene bridge connecting the 2'-O and C4' positions of the ribose ring, i.e., the substituent at the C6' position is different. Specifically, the C6' substituent of YK-CAP-004 is 2,2-difluoroethyl, the C6' substituent of YK-CAP-001 is dimethylaminoethyl, the C6' substituent of YK-CAP-002 is cyanomethyl, and compound 14 has no substituent. The other structures are exactly identical. However, the in vitro transcription yield of mRNA of YK-CAP-004 is 82.8%, 58.3%, and 35.0% higher than that of YK-CAP-001, YK-CAP-002, and compound 14, respectively, and the capping rate of YK-CAP-004 is 23.2%, 26.1%, and 18.8% higher than that of YK-CAP-001, YK-CAP-002, and compound 14, respectively, showing a significant increase.

It can be seen that locked nucleoside-modified cap analogs with similar structures do not necessarily have similar mRNA transcription activities and capping rates. On the contrary, there may be a huge difference.

As can be seen from the in vitro transcription yield of mRNA and capping rate, the locked nucleoside-modified cap analogs YK-CAP-004, YK-CAP-003, YK-CAP-005, and YK-CAP-006 in the present disclosure show a significant increase in both in vitro transcription yield of mRNA and capping rate compared to both YK-CAP-001 and YK-CAP-002 in the present disclosure and compound 14 in the prior art.

For the locked nucleoside-modified cap analogs YK-CAP-004, YK-CAP-003, YK-CAP-005, and YK-CAP-006 in the present disclosure, the original furanose ring structure is replaced with a bridged ring structure, and 2,2-difluoroethyl (YK-CAP-004), dimethylaminocarbonylmethyl (YK-CAP-003), methylsulfonylethyl (YK-CAP-005), and dimethylaminosulfonylethyl (YK-CAP-006) are introduced into the methylene bridge connecting the 2'-O and C4' positions of the ribose ring, respectively. Since the bridged ring structure cannot serve as an initiation site for transcription, it exhibits excellent resistance to reverse transcription during in vitro transcription of mRNA, and can greatly enhance the binding ability of the cap structure to the capping enzyme, thereby increasing the capping rate of mRNA transcription.

Moreover, locked nucleoside-modified cap analogs with similar structures do not necessarily have similar mRNA transcription activities and capping rates. On the contrary, there may be a huge difference.

Example 3: Preparation and Characterization of Lipid Nanoparticles

1. Experimental Methods

Cationic lipid YK-009 (Beijing Youcare Kechuang Pharmaceutical Technology Co., Ltd.), DSPC (AVT (Shanghai) Pharmaceutical Technology Co., Ltd.), cholesterol (AVT (Shanghai) Pharmaceutical Technology Co., Ltd.), and DMG-PEG2000 were dissolved in ethanol at a molar ratio of 49:10:39.5:1.5, and the mRNA was diluted in 50 mM citrate buffer (pH=4). The ethanol lipid solution was mixed with the Fluc-mRNA aqueous solution prepared from different cap structures at a volume ratio of 1:3 using a microfluidic device at a flow rate of 10 mL/min to prepare LNPs at a weight ratio of total lipid to mRNA of approximately 15:1. The resulting liposomes were diluted to 10-fold volume with PBS, and then ultrafiltered with a 300 KDa ultrafiltration tube to remove ethanol. The volume was then fixed to a certain volume with PBS. Finally, the LNPs were filtered through a 0.2 μm sterile filter to obtain an LNP preparation encapsulating Fluc-mRNA using YK-009/DSPC/cholesterol/DMG-PEG2000 (at a molar ratio of 49:10:39.5:1.5).

The particle size and polydispersity index (PDI) were determined by dynamic light scattering using a Malvern laser particle size analyzer. 10 μL of the liposome solution was taken, diluted to 1 mL with RNase-free deionized water, and added to a sample pool. Each sample was measured in triplicate. The measurement conditions were: a scattering angle of 90° and a temperature of 25° C. The encapsulation efficiency of LNPs was determined using the Quant-iT RiboGreen RNA Quantification Kit (Thermo Fisher Scientific, UK) according to the manufacturer's instructions.

2. Experimental Results

The specific characterization data for lipid nanoparticles are shown in Table 4.

TABLE 4

Characterization of lipid nanoparticles

| Name | Particle size (nm) | PDI | EE (%) |
|---|---|---|---|
| YK-CAP-001 | 86.13 | 0.044 | 95.7 |
| YK-CAP-002 | 86.31 | 0.058 | 93.1 |
| YK-CAP-003 | 82.83 | 0.032 | 95.6 |
| YK-CAP-004 | 89.39 | 0.065 | 93.7 |
| YK-CAP-005 | 87.01 | 0.064 | 94.5 |
| YK-CAP-006 | 96.64 | 0.029 | 96.3 |
| N-7413 | 100.5 | 0.041 | 95.4 |
| Compound 14 | 102.2 | 0.018 | 96.8 |
| HN3002 | 91.03 | 0.032 | 94.8 |
| m6A | 89.99 | 0.047 | 94.2 |

As can be seen from Table 4, good lipid nanoparticles can be prepared from the Fluc-mRNA transcribed using the cap analogs YK-CAP-001 to 006 in the present disclosure and the cap analogs N-7413, compound 14, HN3002, and m6A disclosed in the prior art. All lipid nanoparticles have a particle size between 82 and 103 nm, a PDI value between 0.018 and 0.065, and an encapsulation efficiency of 90% or more.

Example 4: Translation Efficiency of Different Capped Luciferase mRNAs

The locked nucleoside-modified cap analogs of the present disclosure show a significant difference in translation efficiency of mRNA. YK-CAP-004 has the highest translation efficiency, which is 2 times that of YK-CAP-002 (the lowest). Compared to the locked nucleoside-modified cap analogs with similar or vastly different structures in the prior art, the locked nucleoside-modified cap analogs of the present disclosure show a significant increase in the translation efficiency of mRNA. For example, the translation efficiency of YK-CAP-004 is 4 times that of m6A.

1. Experimental Methods (1) HEK293T cells were cultured in DMEM medium containing 10% FBS and penicillin/streptomycin at 37° C. with 5% $CO_2$.

(2) Cells in the culture dish were digested and counted, then spread in a 96-well plate at 10,000 cells per well, and cultured overnight until the cells adhered to the wall.

(3) When the cell density reached approximately 80%, transfection was performed by adding 0.5 μg of mRNA sample and Lipofectamine MessengerMAX Transfection Reagent (Invitrogen) per well according to the manufacturer's instructions.

(4) After the transfected cells were cultured at 37° C. with 5% $CO_2$ for 24 hours, the growth medium was removed from the cells to be tested, and the cells were rinsed with PBS. After centrifugation to remove PBS, 50 μL of 1× lysis buffer was added. The cells and all liquid were transferred to a microcentrifuge tube and centrifuged.

(5) 20 μL of sample was taken and added to 100 μL of Dual-Lumi™ II Luciferase Assay Reagent pre-equilibrated to room temperature, and mixed appropriately.

(6) The mixture was incubated at room temperature (approximately 25° C.) for 5 minutes to stabilize the luminescence signal. Chemiluminescence was detected using a multifunctional microplate reader with a function for detecting chemiluminescence, and the data were recorded. The specific relative fluorescence readings of capped mRNAs are shown in Table 5.

2. Experimental Results

The relative fluorescence readings of capped mRNAs are shown in Table 5. The relative fluorescence intensity is proportional to the translation efficiency of mRNA.

TABLE 5

Relative fluorescence readings of capped mRNAs

| Name | Relative fluorescence intensity |
| --- | --- |
| YK-CAP-001 | 0.78 |
| YK-CAP-002 | 0.69 |
| YK-CAP-003 | 1.23 |
| YK-CAP-004 | 1.41 |
| YK-CAP-005 | 1.28 |
| YK-CAP-006 | 1.31 |
| N-7413 | 1.00 |
| HN3002 | 1.13 |
| m6A | 0.35 |

1) The locked nucleoside-modified cap analogs of the present disclosure show a significant difference in translation efficiency of mRNA. YK-CAP-004 has the highest translation efficiency, which is 2 times that of YK-CAP-002 (the lowest).

As can be seen from Table 5, the locked nucleoside-modified cap analogs of the present disclosure show a significant difference in relative fluorescence intensity (corresponding to the translation efficiency of mRNA). YK-CAP-004 has the highest intensity, with a relative fluorescence intensity of 1.41. YK-CAP-003, YK-CAP-005, and YK-CAP-006 also have a high relative fluorescence intensity of 1.23, 1.28, and 1.31, respectively.

Figure 3:
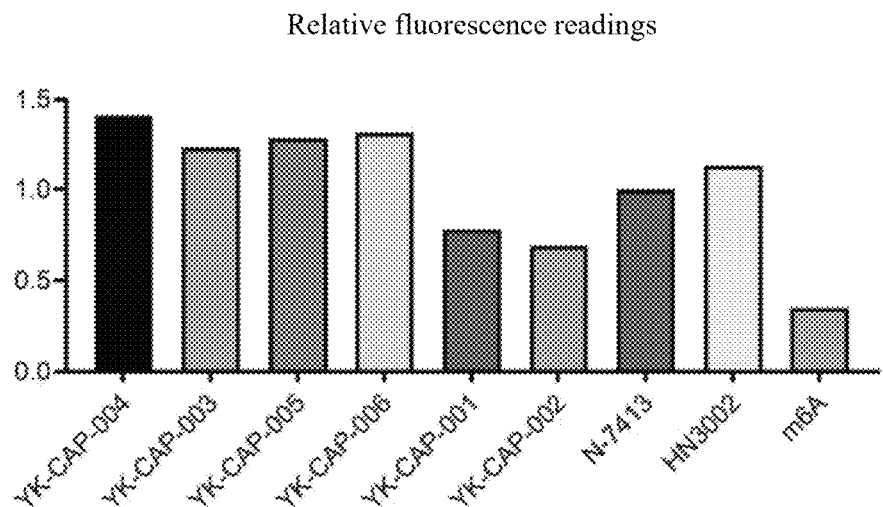
FIG. 3 shows the relative fluorescence intensity for the locked nucleoside-modified cap analogs YK-CAP-004, YK-CAP-003, YK-CAP-005, YK-CAP-006, YK-CAP-001, YK-CAP-002, N-7413, HN3002, and m6A.

YK-CAP-002 has the lowest relative fluorescence intensity, which is only 0.69. YK-CAP-001 also has a very low relative fluorescence intensity of 0.78. The relative fluorescence intensity of YK-CAP-004, YK-CAP-003, YK-CAP-005, and YK-CAP-006 is 2.0 times, 1.8 times, 1.9 times, and 1.9 times that of YK-CAP-002, respectively; and 1.8 times, 1.6 times, 1.6 times, and 1.7 times that of YK-CAP-001, respectively (as shown in FIG. 3). 2) Compared to the locked nucleoside-modified cap analogs in the prior art, the locked nucleoside-modified cap analogs of the present disclosure show a significant increase in the translation efficiency of mRNA. For example, the translation efficiency of YK-CAP-004 is 4 times that of m6A.

N-7413, HN3002, and m6A have a relative fluorescence intensity (corresponding to the translation efficiency of mRNA) of 1.00, 1.13, and 0.35, respectively. The relative fluorescence intensity of YK-CAP-004, YK-CAP-003, YK-CAP-005, and YK-CAP-006 is 1.4 times, 1.2 times, 1.3 times, and 1.3 times that of N-7413, respectively; 1.2 times, 1.1 times, 1.1 times, and 1.2 times that of HN3002, respectively; and 4.0 times, 3.5 times, 3.7 times, and 3.7 times that of m6A, respectively.

3) The locked nucleoside-modified cap analogs with similar structures vary greatly in the translation efficiency of mRNA.

The locked nucleoside-modified cap analogs designed in the present disclosure have structures that are very similar, but they vary greatly in the translation efficiency of mRNA.

For example, YK-CAP-004 differs from YK-CAP-001 and YK-CAP-002 only in the group attached to the methylene bridge connecting the 2'-O and C4' positions of the ribose ring, i.e., the substituent at the C6' position is different. Specifically, the C6' substituent of YK-CAP-004 is 2,2-difluoroethyl, the C6' substituent of YK-CAP-001 is dimethylaminoethyl, and the C6' substituent of YK-CAP-002 is cyanomethyl. The other structures are exactly identical. However, the translation efficiency of mRNA of YK-CAP-004 is 1.8 times and 2.0 times that of YK-CAP-001 and YK-CAP-002, respectively, showing a significant increase.

It can be seen that locked nucleoside-modified cap analogs with similar structures do not necessarily have similar translation efficiency of luciferase mRNA. On the contrary, there may be a huge difference.

As can be seen from the translation efficiency of different capped luciferase mRNAs, the locked nucleoside-modified cap analogs in the present disclosure, including YK-CAP-004, YK-CAP-003, YK-CAP-005, and YK-CAP-006, show a significant increase in the translation efficiency of mRNA compared to both locked nucleoside-modified cap analogs with similar structures (including YK-CAP-001 and YK-CAP-002 in the present disclosure) and locked nucleoside-modified cap analogs with vastly different structures (including N-7413, HN3002, and m6A). It indicates that the bridged nucleoside structures with substituents 2,2-difluoroethyl (YK-CAP-004), dimethylaminocarbonylmethyl (YK-CAP-003), methylsulfonylethyl (YK-CAP-005), and dimethylaminosulfonylethyl (YK-CAP-006) can stabilize the conformation of the furanose ring more effectively, making it easier for these structures to bind to the cap-binding protein (EIF4E), thereby enhancing the translation efficiency of the target mRNA.

Moreover, locked nucleoside-modified cap analogs with similar structures do not necessarily have similar translation efficiency of luciferase mRNA. On the contrary, there may be a huge difference.

Example 5: Decapping Enzyme Stability Test

The locked nucleoside-modified cap analogs of the present disclosure show a significant difference in decapping rate. YK-CAP-004 has the lowest decapping rate, which is 16.0% lower than that of YK-CAP-001 (the highest). Compared to the locked nucleoside-modified cap analogs with similar or vastly different structures in the prior art, the locked nucleoside-modified cap analogs of the present disclosure show a significant decrease in the decapping rate. For example, the decapping rate of YK-CAP-004 is 38.3% lower than that of N-7413.

1. Experimental Methods 30 pmol of RNAs purified by polyacrylamide gel electrophoresis (PAGE) was subjected to an enzymatic reaction with 50 U of mRNA decapping enzyme (New England Biolabs) and 1×MDE buffer at 37° C. for 45 minutes. The enzymatic reactants were subjected to PAGE and stained with SYBR Green II (Lonza), followed by observation of the post-electrophoresis gel image on a Typhoon FLA 7000 (GE Healthcare) instrument. The electrophoresis band intensity ratio of RNA capping to RNA decapping was counted using ImageQuant (GE Healthcare) software, and the decapping rate of the decapping enzyme was calculated (as shown in Table 6).

2. Experimental Results

TABLE 6

Decapping rate after treatment with decapping enzyme

| Name | Decapping rate (%) of DCP2 enzyme |
|---|---|
| YK-CAP-001 | 26.3 |
| YK-CAP-002 | 24.6 |
| YK-CAP-003 | 11.8 |
| YK-CAP-004 | 10.3 |
| YK-CAP-005 | 12.8 |
| YK-CAP-006 | 11.2 |
| N-7413 | 48.6 |
| Compound 14 | 28.8 |
| HN3002 | 23.2 |
| m6A | 27.5 |

1) The locked nucleoside-modified cap analogs of the present disclosure show a significant difference in decapping rate. YK-CAP-004 has the lowest decapping rate, which is 16.0% lower than that of YK-CAP-001 (the highest).

Figure 4:
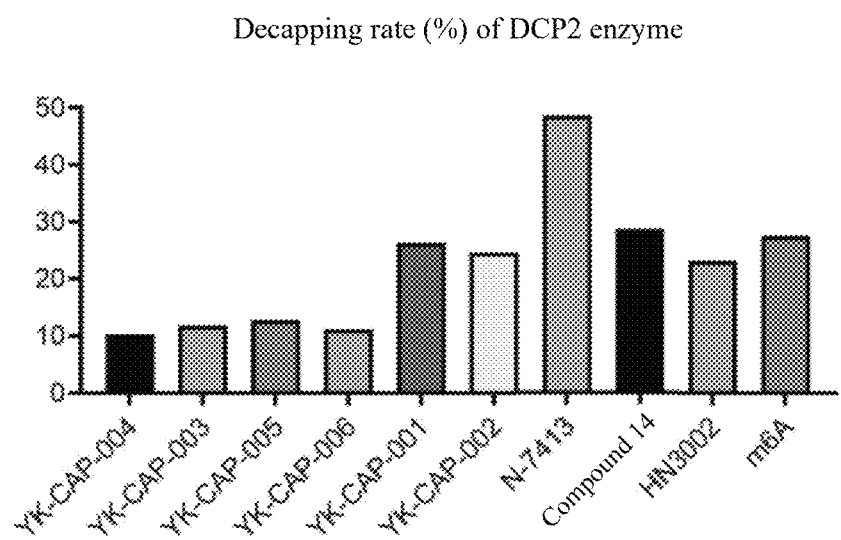
FIG. 4 shows the decapping rate of DCP2 enzyme for the locked nucleoside-modified cap analogs YK-CAP-004, YK-CAP-003, YK-CAP-005, YK-CAP-006, YK-CAP-001, YK-CAP-002, N-7413, compound 14, HN3002, and m6A.

As can be seen from the data in Table 6 and FIG. 4, the locked nucleoside-modified cap analogs YK-CAP-001, YK-CAP-002, YK-CAP-003, YK-CAP-004, YK-CAP-005, and YK-CAP-006 of the present disclosure vary greatly in the decapping rate. YK-CAP-004 has the lowest decapping rate, which is only 10.3%. YK-CAP-003, YK-CAP-005, and YK-CAP-006 also have a very low decapping rate of 11.8%, 12.8%, and 11.2%, respectively.

YK-CAP-001 has the highest decapping rate, which is 26.3%. YK-CAP-002 also has a high decapping rate of 24.6%. The decapping rate of YK-CAP-004, YK-CAP-003, YK-CAP-005, and YK-CAP-006 is 16.0%, 14.5%, 13.5%, and 15.1% lower than that of YK-CAP-001, respectively; and 14.3%, 12.8%, 11.8%, and 13.4% lower than that of YK-CAP-002, respectively.

2) Compared to the locked nucleoside-modified cap analogs with similar or vastly different structures in the prior art, the locked nucleoside-modified cap analogs of the present disclosure show a significant decrease in the decapping rate. For example, the decapping rate of YK-CAP-004 is 38.3% lower than that of N-7413.

N-7413, compound 14, HN3002, and m6A have a decapping rate of 48.6%, 28.8%, 23.2%, and 27.5%, respectively. The decapping rate of YK-CAP-004, YK-CAP-003, YK-CAP-005, and YK-CAP-006 in the present disclosure is 38.3%, 36.8%, 35.8%, and 37.4% lower than that of N-7413, respectively; 18.5%, 17.0%, 16.0%, and 17.6% lower than that of compound 14, respectively; 12.9%, 11.4%, 10.4%, and 12.0% lower than that of HN3002, respectively; and 17.2%, 15.7%, 14.7%, and 16.3% lower than that of m6A, respectively.

3) The locked nucleoside-modified cap analogs with similar structures vary greatly in the decapping rate.

The locked nucleoside-modified cap analogs designed in the present disclosure have structures that are very similar. This series of compounds is also very similar in structure to compound 14, but they vary greatly in the decapping rate.

For example, YK-CAP-004 differs from YK-CAP-001, YK-CAP-002, and compound 14 only in the group attached to the methylene bridge connecting the 2'-0 and C4' positions of the ribose ring, i.e., the substituent at the C6' position is different. Specifically, the C6' substituent of YK-CAP-004 is 2,2-difluoroethyl, the C6' substituent of YK-CAP-001 is dimethylaminoethyl, the C6' substituent of YK-CAP-002 is cyanomethyl, and compound 14 has no substituent. The other structures are exactly identical. However, the mRNA decapping rate of YK-CAP-004 is 16.0%, 14.3%, and 18.5% lower than that of YK-CAP-001, YK-CAP-002, and compound 14, respectively, showing a significant decrease.

It can be seen that locked nucleoside-modified cap analogs with similar structures do not necessarily have similar decapping rates. On the contrary, there may be a huge difference.

As can be seen from the decapping rate of DCP2 enzyme, the locked nucleoside-modified cap analogs in the present disclosure, including YK-CAP-004, YK-CAP-003, YK-CAP-005, and YK-CAP-006, show a significant decrease in the decapping rate of DCP2 enzyme compared to both locked nucleoside-modified cap analogs with similar structures (including YK-CAP-001 and YK-CAP-002 in the present disclosure as well as compound 14 in the prior art) and locked nucleoside-modified cap analogs with vastly different structures (including N-7413, HN3002, and m6A).

Moreover, locked nucleoside-modified cap analogs with similar structures do not necessarily have similar decapping rates. On the contrary, there may be a huge difference.

Example 6: Animal Experiments

In addition, the amount and duration of protein expression by Fluc-mRNAs prepared from different locked nucleoside-modified cap analogs in mice were also examined. The results show that the locked nucleoside-modified cap analogs of the present disclosure show a significant difference in the average radiation intensity (corresponding to the amount of protein expression) and duration of the protein expressed by mRNA in mice. YK-CAP-004 has the highest fluorescence expression intensity, which is 2.6 and 5.5 times that of YK-CAP-002 (the lowest) at 6 hours and 96 hours, respectively. Compared to the locked nucleoside-modified cap analogs with similar or vastly different structures in the prior art, the locked nucleoside-modified cap analogs of the present disclosure show a significant increase in the amount and duration of protein expression by mRNA in mice. For example, the average radiation intensity of YK-CAP-004 is 2.1 times that of m6A at 6 hours and 3.4 times that of m6A at 96 hours.

1. Experimental Methods

The LNP preparation containing 5 g of Fluc-mRNAs transcribed using the cap analogs YK-CAP-001 to 006 in the present disclosure and the cap analogs N-7413, compound 14, and m6A in the prior art was intramuscularly injected into female BALB/C mice aged 4 to 6 weeks and weighing 17 to 19 g. At specific time points after administration (6 hours, 12 hours, 24 hours, 48 hours, 96 hours, and 168 hours), the mice were intraperitoneally injected with fluorescence imaging substrate. The mice were then allowed to move freely for 5 minutes, followed by detection of the average radiation intensity (corresponding to the amount of protein expression) of the protein expressed by LNP-carrying mRNA in the mice using an IVIS Spectrum small-animal in vivo imaging system.

2. Experimental Results

Figure 5:
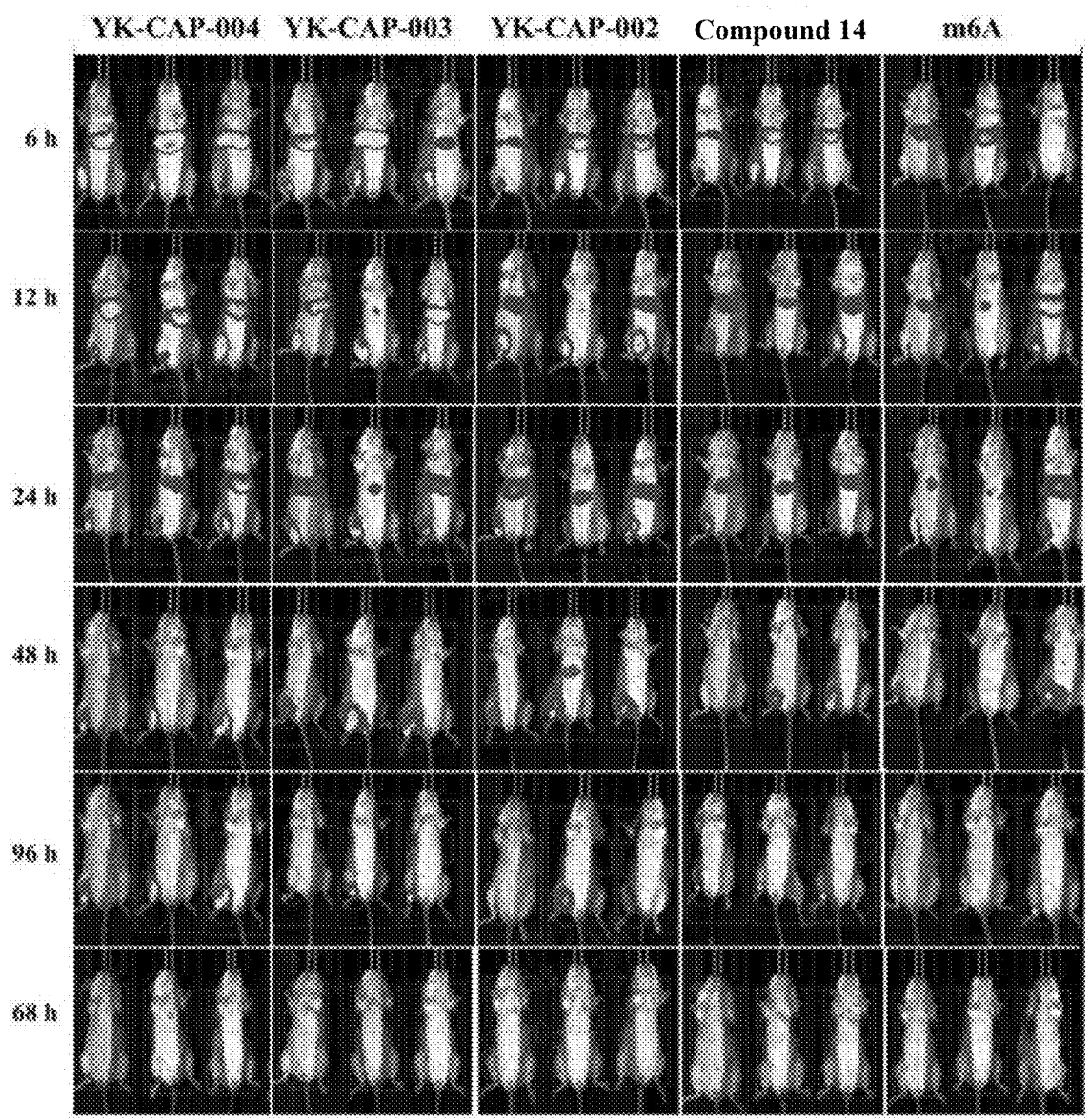
FIG. 5 shows the average radiation intensity of the protein expressed by LNP-carrying mRNA in mice for Fluc-mRNAs transcribed using the locked nucleoside-modified cap analogs YK-CAP-004, YK-CAP-003, YK-CAP-002, compound 14, and m6A.

The test results are shown in Table 7 and FIG. 5.

TABLE 7

Experimental data of in vivo imaging in mice

| Name | Average radiation intensity (p/s/cm$^2$/sr) | | | | | |
| --- | --- | --- | --- | --- | --- | --- |
|  | 6 h | 12 h | 24 h | 48 h | 96 h | 168 h |
| YK-CAP-001 | 1728300 | 985800 | 612430 | 578750 | 43485 | 10467 |
| YK-CAP-002 | 1466925 | 801300 | 278665 | 320725 | 20893 | 9768 |
| YK-CAP-003 | 3212750 | 2454750 | 1053625 | 700200 | 57893 | 19016 |
| YK-CAP-004 | 3856100 | 2836750 | 1159325 | 903025 | 114933 | 19785 |
| YK-CAP-005 | 3171000 | 2497200 | 998650 | 834250 | 110595 | 17807 |
| YK-CAP-006 | 3303900 | 2067750 | 976550 | 798075 | 75840 | 15660 |
| N-7413 | 2777750 | 1806125 | 906625 | 710545 | 68400 | 18233 |
| Compound 14 | 2589500 | 1622075 | 1099050 | 946675 | 57270 | 17828 |
| m6A | 1801200 | 702940 | 201585 | 238500 | 33586 | 12000 |

1) The locked nucleoside-modified cap analogs of the present disclosure show a significant difference in the average radiation intensity and duration of the protein expressed by mRNA in mice. YK-CAP-004 has the highest average radiation intensity, which is 2.6 and 5.5 times that of YK-CAP-002 (the lowest) at 6 hours and 96 hours, respectively.

As can be seen from the data in Table 7, the different locked nucleoside-modified cap analogs of the present disclosure vary greatly in the average radiation intensity of the protein expressed by mRNA in mice. YK-CAP-004 has the highest average radiation intensity, reaching 3856100 at 6 hours and still reaching 114933 at 96 hours. YK-CAP-003, YK-CAP-005, and YK-CAP-006 also have a very high average radiation intensity of in vivo imaging in mice, which is 3212750, 3171000, and 3303900 at 6 hours, respectively; and 57893, 110595, and 75840 at 96 hours, respectively.

YK-CAP-002 has the lowest average radiation intensity, which is 1466925 at 6 hours and only 20893 at 96 hours. YK-CAP-001 also has a low average radiation intensity, which is 1728300 at 6 hours and 43485 at 96 hours.

The average radiation intensity of YK-CAP-004 is 2.6 times that of YK-CAP-002 at 6 hours and 5.5 times that of YK-CAP-002 at 96 hours. The average radiation intensity of YK-CAP-003 is 2.2 times that of YK-CAP-002 at 6 hours and 2.8 times that of YK-CAP-002 at 96 hours. The average radiation intensity of YK-CAP-005 is 2.2 times that of YK-CAP-002 at 6 hours and 5.3 times that of YK-CAP-002 at 96 hours. The average radiation intensity of YK-CAP-006 is 2.3 times that of YK-CAP-002 at 6 hours and 3.6 times that of YK-CAP-002 at 96 hours.

The average radiation intensity of YK-CAP-004 is 2.2 times that of YK-CAP-001 at 6 hours and 2.6 times that of YK-CAP-001 at 96 hours. The average radiation intensity of YK-CAP-003 is 1.9 times that of YK-CAP-001 at 6 hours and 1.3 times that of YK-CAP-001 at 96 hours. The average radiation intensity of YK-CAP-005 is 1.8 times that of YK-CAP-001 at 6 hours and 2.5 times that of YK-CAP-001 at 96 hours. The average radiation intensity of YK-CAP-006 is 1.9 times that of YK-CAP-001 at 6 hours and 1.7 times that of YK-CAP-001 at 96 hours.

2) Compared to the locked nucleoside-modified cap analogs with similar or vastly different structures in the prior art, the locked nucleoside-modified cap analogs of the present disclosure show a significant increase in the average radiation intensity and duration of the protein expressed by mRNA in mice. For example, the average radiation intensity of YK-CAP-004 is 2.1 times that of m6A at 6 hours and 3.4 times that of m6A at 96 hours.

N-7413, compound 14, and m6A have an average radiation intensity of U.S. Pat. Nos. 2,777,750, 2,589,500, and 1,801,200 at 6 hours, respectively; and 68400, 57270, and 33586 at 96 hours, respectively.

The average radiation intensity of YK-CAP-004 in the present disclosure is 1.4 times, 1.5 times, and 2.1 times that of N-7413, compound 14, and m6A at 6 hours, respectively; and 1.7 times, 2.0 times, and 3.4 times that of N-7413, compound 14, and m6A at 96 hours, respectively.

The average radiation intensity of YK-CAP-003 is 1.2 times, 1.2 times, and 1.8 times that of N-7413, compound 14, and m6A at 6 hours, respectively; and 0.8 times, 1.0 times, and 1.7 times that of N-7413, compound 14, and m6A at 96 hours, respectively.

The average radiation intensity of YK-CAP-005 is 1.1 times, 1.2 times, and 1.8 times that of N-7413, compound 14, and m6A at 6 hours, respectively; and 1.6 times, 1.9 times, and 3.3 times that of N-7413, compound 14, and m6A at 96 hours, respectively.

The average radiation intensity of YK-CAP-006 is 1.2 times, 1.3 times, and 1.8 times that of N-7413, compound 14, and m6A at 6 hours, respectively; and 1.1 times, 1.3 times, and 2.3 times that of N-7413, compound 14, and m6A at 96 hours, respectively.

3) The locked nucleoside-modified cap analogs with similar structures vary greatly in the average radiation intensity and duration of the protein expressed by mRNA in mice.

The locked nucleoside-modified cap analogs designed in the present disclosure have structures that are very similar. This series of compounds is also very similar in structure to compound 14, but they vary greatly in the average radiation intensity and duration of the protein expressed by mRNA in mice.

For example, YK-CAP-004 differs from YK-CAP-001, YK-CAP-002, and compound 14 only in the group attached to the methylene bridge connecting the 2'-O and C4' positions of the ribose ring, i.e., the substituent at the C6' position is different. Specifically, the C6' substituent of YK-CAP-004 is 2,2-difluoroethyl, the C6' substituent of YK-CAP-001 is dimethylaminoethyl, the C6' substituent of YK-CAP-002 is cyanomethyl, and compound 14 has no substituent. The other structures are exactly identical. However, the average radiation intensity of YK-CAP-004 is 2.2 times, 2.6 times, and 1.5 times that of YK-CAP-001, YK- CAP-002, and compound 14 at 6 hours, respectively; and 2.6 times, 5.5 times, and 2.0 times that of YK-CAP-001, YK-CAP-002, and compound 14 at 96 hours, respectively, showing a significant increase.

As can be seen from the animal experiments, the locked nucleoside-modified cap analogs in the present disclosure, such as YK-CAP-004, YK-CAP-003, YK-CAP-005, and YK-CAP-006, show a significant increase in the amount and duration of protein expression by mRNA in mice compared to both locked nucleoside-modified cap analogs with similar structures (including YK-CAP-001 and YK-CAP-002 in the present disclosure as well as compound 14 in the prior art) and locked nucleoside-modified cap analogs with vastly different structures (including N-7413 and m6A).

In vivo experiments further demonstrate that the mRNA transcribed using YK-CAP-003, YK-CAP-004, YK-CAP-005, and YK-CAP-006 in the present disclosure can be effectively delivered into the body by LNP delivery vectors and efficiently and continuously expressed.

Moreover, Fluc-mRNAs prepared from locked nucleoside-modified cap analogs with similar structures do not necessarily have similar amount and duration of protein expression in mice. On the contrary, there may be a huge difference.

In summary, the locked nucleoside-modified cap analogs YK-CAP-004, YK-CAP-003, YK-CAP-005, and YK-CAP-006 in the present disclosure show a significant increase in the in vitro transcription yield of mRNA, capping rate, translation efficiency of mRNA, decapping enzyme stability, and amount and duration of protein expression in animals compared to the locked nucleoside-modified cap analogs in the prior art (including N-7413, compound 14, HN3002, and m6A). It indicates that the cap structures of YK-CAP-004, YK-CAP-003, YK-CAP-005, and YK-CAP-006 provided by the present disclosure can significantly enhance the resistance of locked nucleic acid structures to decapping enzymes as well as their binding affinity to capping enzymes, providing a novel and efficient locked nucleic acid-modified cap structure for in vitro transcription of mRNA.

1. The compounds of the present disclosure have chemical structures that are very similar. This series of compounds has some similarities and some significant differences in structure compared to the mRNA cap analogs disclosed in the prior art.

1) The compounds of the present disclosure are very similar in structure, differing only in the group attached to the methylene bridge connecting the 2'-O and C4' positions of the ribose ring, i.e., the substituent at the C6' position is different.

2) The compounds of the present disclosure are similar in structure to compound 14, except that there is no substituent on the methylene bridge (i.e., at the C6' position) connecting the 2'-O and C4' positions of the ribose ring of compound 14.

3) The compounds of the present disclosure differ greatly in structure from N-7413, HN3002, and m6A, specifically, there is no methylene bridge between the 2'-O and C4' positions of the ribose ring of these three compounds, and the second base of m6A, adenine, is methylated.

2. The locked nucleoside-modified cap analogs of the present disclosure show a significant difference in the in vitro transcription yield of mRNA and capping rate. Compared to the locked nucleoside-modified cap analogs in the prior art, the locked nucleoside-modified cap analogs of the present disclosure show a significant increase in both in vitro transcription yield of mRNA and capping rate.

1) The locked nucleoside-modified cap analogs of the present disclosure show a significant difference in the in vitro transcription yield of mRNA and capping rate. YK-CAP-004 has the highest transcription yield and capping rate, with the transcription yield being 82.8% higher than that of YK-CAP-001 (the lowest) and the capping rate being 26.1% higher than that of YK-CAP-002 (the lowest).

2) Compared to the locked nucleoside-modified cap analogs in the prior art, the locked nucleoside-modified cap analogs of the present disclosure show a significant increase in both in vitro transcription yield of mRNA and capping rate. For example, the transcription yield and capping rate of YK-CAP-004 are 35.0% and 18.8% higher than those of compound 14, respectively.

3) The locked nucleoside-modified cap analogs with similar structures vary greatly in the in vitro transcription yield of mRNA and capping rate. For example, the in vitro transcription yield of mRNA of YK-CAP-004 is 82.8%, 58.3%, and 35.0% higher than that of YK-CAP-001, YK-CAP-002, and compound 14, respectively, and the capping rate of YK-CAP-004 is 23.2%, 26.1%, and 18.8% higher than that of YK-CAP-001, YK-CAP-002, and compound 14, respectively.

3. The locked nucleoside-modified cap analogs of the present disclosure show a significant difference in translation efficiency of mRNA. Compared to the locked nucleoside-modified cap analogs in the prior art, the locked nucleoside-modified cap analogs of the present disclosure show a significant increase in the translation efficiency of mRNA.

1) The locked nucleoside-modified cap analogs of the present disclosure show a significant difference in translation efficiency of mRNA. YK-CAP-004 has the highest translation efficiency, which is 2 times that of YK-CAP-002 (the lowest).

2) Compared to the locked nucleoside-modified cap analogs with similar or vastly different structures in the prior art, the locked nucleoside-modified cap analogs of the present disclosure show a significant increase in the translation efficiency of mRNA. For example, the translation efficiency of YK-CAP-004 is 4 times that of m6A.

3) The locked nucleoside-modified cap analogs with similar structures vary greatly in the translation efficiency of mRNA. For example, the translation efficiency of mRNA of YK-CAP-004 is 1.8 times and 2.0 times that of YK-CAP-001 and YK-CAP-002, respectively.

4. The locked nucleoside-modified cap analogs of the present disclosure show a significant difference in decapping rate. Compared to the locked nucleoside-modified cap analogs with similar or vastly different structures in the prior art, the locked nucleoside-modified cap analogs of the present disclosure show a significant decrease in the decapping rate.

1) The locked nucleoside-modified cap analogs of the present disclosure show a significant difference in decapping rate. YK-CAP-004 has the lowest decapping rate, which is 16.0% lower than that of YK-CAP-001 (the highest).

2) Compared to the locked nucleoside-modified cap analogs with similar or vastly different structures in the prior art, the locked nucleoside-modified cap analogs of the present disclosure show a significant decrease in the decapping rate. For example, the decapping rate of YK-CAP-004 is 38.3% lower than that of N-7413.

3) The locked nucleoside-modified cap analogs with similar structures vary greatly in the decapping rate. For example, the mRNA decapping rate of YK-CAP-004 is 16.0%, 14.3%, and 18.5% lower than that of YK-CAP-001, YK-CAP-002, and compound 14, respectively.

5. The locked nucleoside-modified cap analogs of the present disclosure show a significant difference in the average radiation intensity (corresponding to the amount of protein expression) and duration of the protein expressed by mRNA in mice. Compared to the locked nucleoside-modified cap analogs with similar or vastly different structures in the prior art, the locked nucleoside-modified cap analogs of the present disclosure show a significant increase in the amount and duration of protein expression by mRNA in mice.

1) The locked nucleoside-modified cap analogs of the present disclosure show a significant difference in the average radiation intensity and duration of the protein expressed by mRNA in mice. YK-CAP-004 has the highest fluorescence expression intensity, which is 2.6 and 5.5 times that of YK-CAP-002 (the lowest) at 6 hours and 96 hours, respectively.

2) Compared to the locked nucleoside-modified cap analogs with similar or vastly different structures in the prior art, the locked nucleoside-modified cap analogs of the present disclosure show a significant increase in the average radiation intensity and duration of the protein expressed by mRNA in mice. For example, the average radiation intensity of YK-CAP-004 is 2.1 times that of m6A at 6 hours and 3.4 times that of m6A at 96 hours.

3) The locked nucleoside-modified cap analogs with similar structures vary greatly in the average radiation intensity and duration of the protein expressed by mRNA in mice. For example, the average radiation intensity of YK-CAP-004 is 2.2 times, 2.6 times, and 1.5 times that of YK-CAP-001, YK-CAP-002, and compound 14 at 6 hours, respectively; and 2.6 times, 5.5 times, and 2.0 times that of YK-CAP-001, YK-CAP-002, and compound 14 at 96 hours, respectively.

Finally, it should be noted that the above examples are only used to illustrate, but not limit, the technical solutions of the present disclosure. Although the present disclosure has been described in detail with reference to the foregoing examples, those of ordinary skill in the art should understand that it is still possible to modify the technical solutions recorded in the foregoing examples, or to replace some or all of the technical features with equivalent features. These modifications or replacements do not drive the essence of the corresponding technical solutions to depart away from the scope of the technical solutions of the examples of the present disclosure.

What is claimed is:

1. A compound or a pharmaceutically acceptable salt thereof, wherein the compound is YK-CAP-003, YK-CAP-004, YK-CAP-005, or YK-CAP-006 having a structure as shown below:

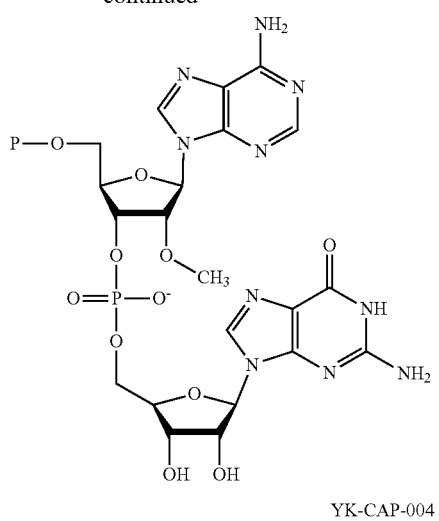

YK-CAP-004

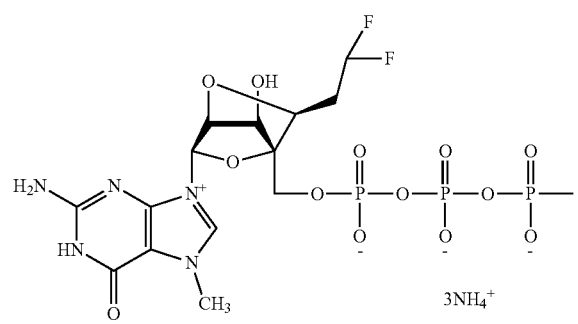

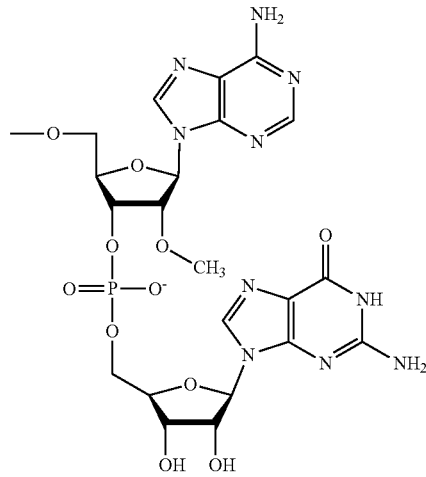

YK-CAP-005

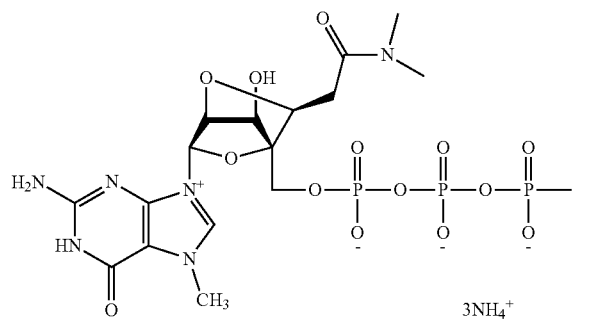

YK-CAP-003

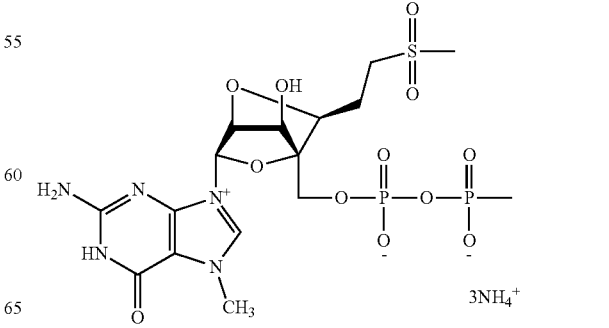

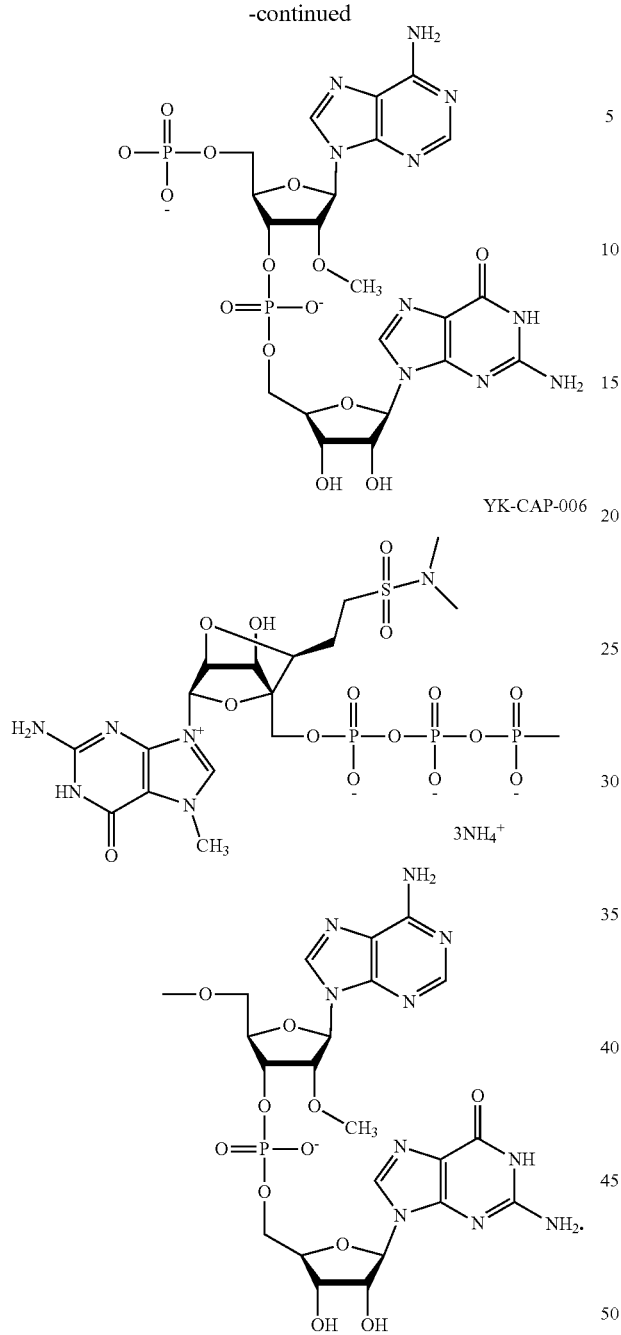

YK-CAP-006

2. An RNA molecule, comprising the compound or the pharmaceutically acceptable salt thereof according to claim 1 as a cap structure.

3. A pharmaceutical composition, comprising the RNA molecule according to claim 2.

4. The pharmaceutical composition according to claim 3, wherein the pharmaceutical composition further comprises at least one RNA delivery agent.

5. The pharmaceutical composition according to claim 4, wherein the at least one RNA delivery agent comprises at least one cationic lipid.

6. The pharmaceutical composition according to claim 4, wherein the at least one RNA delivery agent further comprises at least one neutral lipid.

7. The pharmaceutical composition according to claim 5, wherein the cationic lipid is selected from one or more of the following compounds:

(1) a compound of formula (II) or a pharmaceutically acceptable salt thereof, wherein $G_1$ is $C_{1-6}$ alkylene; $G_2$ is $C_{2-8}$ alkylene; $G_3$ is $C_{1-3}$ alkylene; $L_1$ is $C_{6-15}$ linear alkyl; $L_2$ is $C_{12-25}$ branched alkyl;

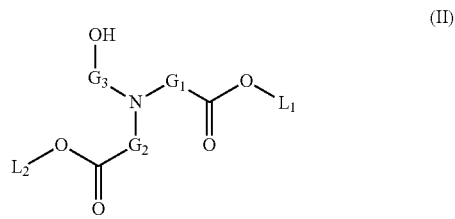

(II)

(2) a compound of formula (IV) or a pharmaceutically acceptable salt thereof, wherein $G_1$ is $C_{1-6}$ alkylene; $G_2$ is $C_{2-8}$ alkylene; $R_1$ is $C_{6-20}$ linear or branched alkyl; $R_2$ is $C_{12-25}$ branched $G_3$ alkyl; is $HO(CH_2)_2N(CH_3)(CH_2)_2$—, $HO(CH_2)_2N(CH_2CH_3)(CH_2)_2$—, $(HO(CH_2)_2)_2N(CH_2)_2$—, $CH_3O(CH_2)_2N(CH_3)(CH_2)_2$—, $(CH_3)_2N(CH_2)_3SC(O)O(CH_2)_2$—, $(CH3)_2N(CH_2)_3SC(O)$—, $CH_3NH(CH_2)_2N(CH_3)(CH_2)_2$—, or $CH_3CH_2NH(CH_2)_2$—;

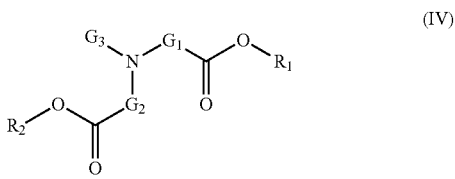

(IV)

(3) a compound of formula (V) or a pharmaceutically acceptable salt thereof, wherein $G_1$ is $C_{1-8}$ alkylene; $G_2$ is $C_{2-8}$ alkylene; $R_1$ is $C_{6-25}$ linear or branched alkyl; $R_2$ is $C_{12-25}$ linear or branched alkyl; $G_3$ is $HO(CH_2)_2N(R_3)CH_2CH(OH)CH_2$—, wherein $R_3$ is —$CH_3$, —$CH_2CH_3$, or —$CH_2CH_2OH$;

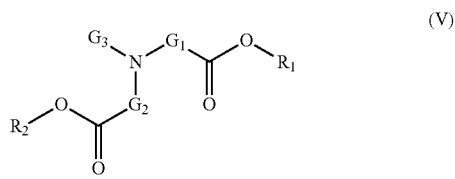

(V)

(4) a compound of formula (VI) or a pharmaceutically acceptable salt thereof, wherein $G^1$ and $G^2$ are each independently unsubstituted $C_6$-$C_{10}$ alkylene; $G^3$ is unsubstituted $C_1$-$C_{12}$ alkylene; $R^1$ and $R^2$ are each independently $C_6$-$C_{24}$ alkyl or $C_6$-$C_{24}$ alkenyl; $R^3$ is —$OR^5$, —$C(=O)OR^4$, —$OC(=O)R^4$, or —$NR^5C(=O)R^4$; $R^4$ is $C_1$-$C_{12}$ hydrocarbyl; and $R^5$ is H or $C_1$-$C_6$ hydrocarbyl;

(IV)
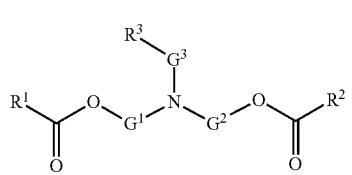
(5) a compound of formula (VII) or a pharmaceutically acceptable salt thereof, wherein $R_4$ is selected from $-(CH_2)_nQ$; Q is $-OH$ or $-CN$; n is 1, 2, or 3;
(VII)
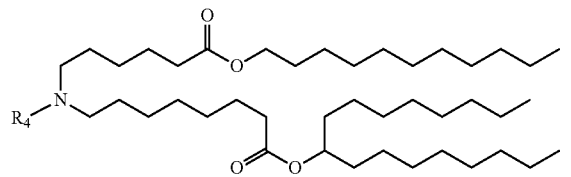
(6) a compound of formula (VIII) or a pharmaceutically acceptable salt thereof,
(VIII)
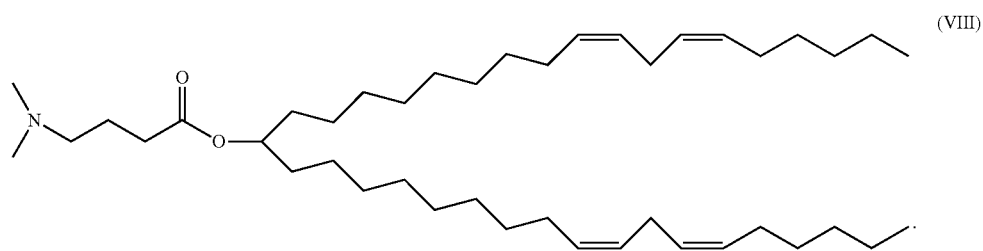 [SMILES: CCCCC/C=C\C/C=C\CCCCCCCCC(CCCCCCCC/C=C\C/C=C\CCCCC)OC(=O)CCCN(C)C]
8. The pharmaceutical composition according to claim 7, wherein the cationic lipid is selected from one or more of YK-009, YK-305, ALC0315, SM102, or DLIN-MC3-DMA:
YK-009
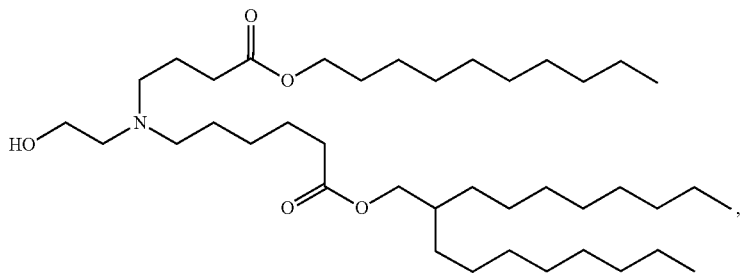
YK-305
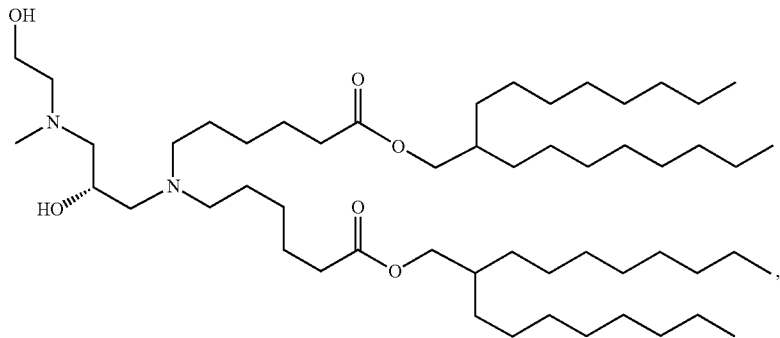
ALC-0315
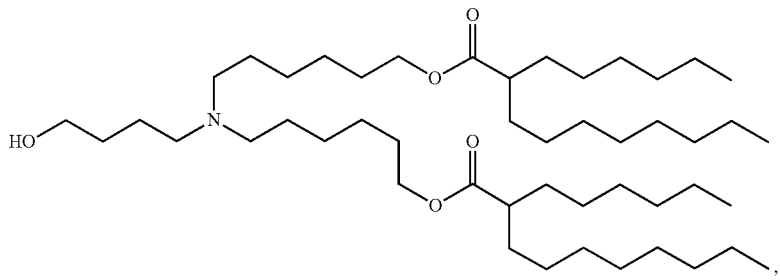

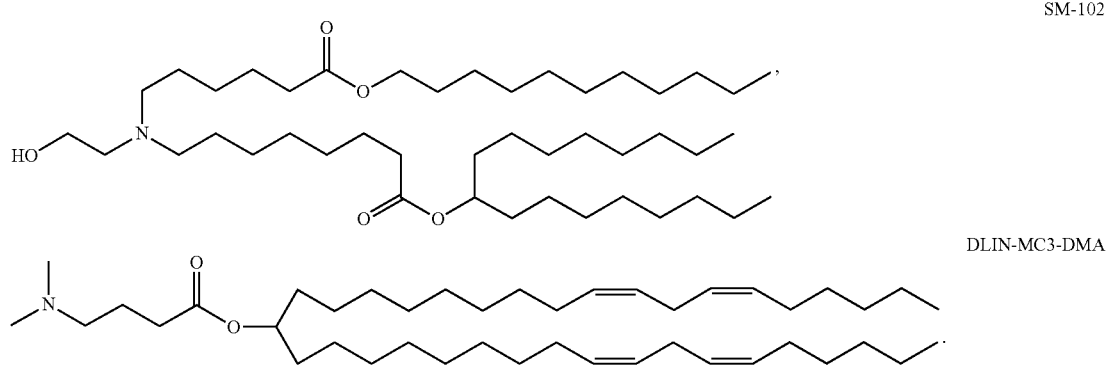

SM-102

DLIN-MC3-DMA

9. The pharmaceutical composition according to claim 8, wherein the cationic lipid is YK-009.

10. The pharmaceutical composition according to claim 6, wherein the neutral lipid comprises one or more of phosphatidylcholine, phosphatidylethanolamine, sphingomyelin, ceramide, sterol, and derivatives thereof.

11. The pharmaceutical composition according to claim 10, wherein the neutral lipid is selected from one or more of 1,2-dilinoleoyl-sn-glycero-3-phosphocholine (DLPC), 1,2-dimyristoyl-sn-glycero-phosphocholine (DMPC), 1,2-dioleoyl-sn-glycero-3-phosphocholine (DOPC), 1,2-dipalmitoyl-sn-glycero-3-phosphocholine (DPPC), 1,2-distearoyl-sn-glycero-3-phosphocholine (DSPC), 1,2-diundecanoyl-sn-glycero-phosphocholine (DUPC), 1-palmitoyl-2-oleoyl-sn-glycero-3-phosphocholine (POPC), 1,2-di-O-octadecenyl-sn-glycero-3-phosphocholine (18:0 Diether PC), 1-oleoyl-2-cholesterylhemisuccinoyl-sn-glycero-3-phosphocholine (OChemsPC), 1-hexadecyl-sn-glycero-3-phosphocholine (C16 Lyso PC), 1,2-dilinolenoyl-sn-glycero-3-phosphocholine, 1,2-diarachidonoyl-sn-glycero-3-phosphocholine, 1,2-didocosahexaenoyl-sn-glycero-3-phosphocholine, 1,2-dioleoyl-sn-glycero-3-phosphoethanolamine (DOPE), 1,2-diphytanoyl-sn-glycero-3-phosphoethanolamine (ME 16.0 PE), 1,2-distearoyl-sn-glycero-3-phosphoethanolamine, 1,2-dilinoleoyl-sn-glycero-3-phosphoethanolamine, 1,2-dilinolenoyl-sn-glycero-3-phosphoethanolamine, 1,2-diarachidonoyl-sn-glycero-3-phosphoethanolamine, 1,2-didocosahexaenoyl-sn-glycero-3-phosphoethanolamine, 1,2-dioleoyl-sn-glycero-3-phospho-rac-(1-glycerol) sodium salt (DOPG), dipalmitoyl phosphatidylglycerol (DPPG), palmitoyl oleoyl phosphatidylethanolamine (POPE), distearoyl-phosphatidyl-ethanolamine (DSPE), dipalmitoyl phosphatidylethanolamine (DPPE), dimyristoyl phosphoethanolamine (DMPE), 1-stearoyl-2-oleoyl-stearoylethanolamine (SOPE), 1-stearoyl-2-oleoyl-phosphatidylcholine (SOPC), sphingomyelin, phosphatidylcholine, phosphatidylethanolamine, phosphatidylserine, phosphatidylinositol, phosphatidic acid, palmitoyl oleoyl phosphatidylcholine, lysophosphatidylcholine, lysophosphatidylethanolamine (LPE), or mixtures thereof.

12. The pharmaceutical composition according to claim 11, wherein the neutral lipid is DOPE and/or DSPC.

13. The pharmaceutical composition according to claim 4, wherein the at least one RNA delivery agent further comprises a structural lipid.

14. The pharmaceutical composition according to claim 13, wherein the structural lipid is selected from one or more of cholesterol, nonsterol, sitosterol, ergosterol, campesterol, stigmasterol, brassinosterol, tomatine, ursolic acid, α-tocopherol, or corticosteroid.

15. The pharmaceutical composition according to claim 14, wherein the structural lipid is cholesterol.

16. The pharmaceutical composition according to claim 4, wherein the at least one RNA delivery agent further comprises a polymer-conjugated lipid.

17. The pharmaceutical composition according to claim 16, wherein the polymer-conjugated lipid is selected from one or more of distearoyl phosphatidylethanolamine polyethylene glycol 2000 (DSPE-PEG2000), dimyristoylglycero-3-methoxypolyethylene glycol 2000 (DMG-PEG2000), or methoxypolyethylene glycol ditetradecylacetamide (ALC-0159).

18. The pharmaceutical composition according to claim 4, wherein the pharmaceutical composition further comprises one or more cell-penetrating peptides.

19. A kit comprising:
(1) the compound or the pharmaceutically acceptable salt thereof according to claims 1; and
(2) a nucleotide triphosphate molecule and an RNA polymerase.

20. The kit according to claim 19, wherein the kit further comprises one or more of an RNAase inhibitor, an inorganic pyrophosphatase, $Mg^{2+}$, a crowding agent, a buffer, or any combination thereof.

* * * * *